(12) United States Patent
Sano et al.

(10) Patent No.: US 7,127,117 B2
(45) Date of Patent: Oct. 24, 2006

(54) IMAGE COMPRESSION METHOD AND APPARATUS FOR SUPPRESSING QUANTIZATION RATE IN PARTICULAR REGION, IMAGE EXPANSION METHOD AND APPARATUS THEREFOR, AND COMPUTER-READABLE STORAGE MEDIUM STORING PROGRAM FOR THE COMPRESSION OR EXPANSION

(75) Inventors: Yutaka Sano, Miyagi (JP); Hiroyuki Sakuyama, Tokyo (JP); Taku Kodama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 734 days.

(21) Appl. No.: 10/164,545

(22) Filed: Jun. 10, 2002

(65) Prior Publication Data

US 2003/0002742 A1 Jan. 2, 2003

(30) Foreign Application Priority Data

Jun. 11, 2001 (JP) ............................. 2001-175081
Jun. 13, 2001 (JP) ............................. 2001-178310

(51) Int. Cl.
*G06K 9/36* (2006.01)
*H04N 7/12* (2006.01)

(52) U.S. Cl. ................................ 382/240; 375/240.24
(58) Field of Classification Search ................ 382/240; 375/240.24

See application file for complete search history.

(56) References Cited

U.S. PATENT DOCUMENTS

| 5,724,097 | A | * | 3/1998 | Hibi et al. | ............. | 375/240.04 |
| 6,141,446 | A | * | 10/2000 | Boliek et al. | ............... | 382/233 |
| 6,208,693 | B1 | * | 3/2001 | Chen et al. | ............. | 375/240.24 |
| 6,549,674 | B1 | * | 4/2003 | Chui et al. | ................... | 382/240 |
| 6,658,158 | B1 | * | 12/2003 | Fukuhara et al. | ........... | 382/240 |
| 6,813,387 | B1 | * | 11/2004 | Berkner et al. | ............. | 382/240 |

FOREIGN PATENT DOCUMENTS

JP 09275561 A * 10/1997

OTHER PUBLICATIONS

"The JPEG2000 Still Image Coding System: an Overview," Charilaos Christopoulos, et al., IEEE Transactions on Consumer Electronics, vol. 46, No. 4, Nov. 2000, pp. 1103-1127.*
"JPEG 2000 Image coding system," ISO/IEC JTC 1/SC 29/WG 1. JPEG 2000, Mar. 16, 2000, hereafter referred as N1646.*
U.S. Appl. No. 10/164,545, filed Jun. 10, 2002, Sano et al.
U.S. Appl. No. 10/665,477, filed Sep. 22, 2003, Hara et al.
U.S. Appl. No. 10/716,429, filed Nov. 20, 2003, Nomizu et al.

(Continued)

*Primary Examiner*—Wenpeng Chen
(74) *Attorney, Agent, or Firm*—Oblon, Spivak, McClelland, Maier & Neustadt, P.C.

(57) ABSTRACT

An image compression apparatus includes a tile specifying section specifying rectangular tiles having an arbitrary size with respect to an image, an image dividing section dividing the image using the specified rectangular tiles, a bit-plane decomposing section decomposing each of the specified tiles dividing the image into bit-planes, a bit-plane ordering section ordering the bit-planes decomposing each of the specified tiles depending on a coding sequence, a layer forming section forming layers by the ordered bit-planes, and a suppressing section suppressing a quantization rate of a region low relative to other regions of the image.

45 Claims, 43 Drawing Sheets

OTHER PUBLICATIONS

U.S. Appl. No. 10/1716,463, filed Nov. 20, 2003, Kodama et al.
U.S. Appl. No. 10/703,509, filed Nov. 10, 2003, Nomizu et al.
U.S. Appl. No. 10/717,090, filed Nov. 28, 2003, Kodama et al.
U.S. Appl. No. 10/691,623, filed Oct. 24, 2003, Hara et al.
U.S. Appl. No. 10/682,121, filed Oct. 10, 2003, Hara et al.
U.S. Appl. No. 10/662,520, filed Sep. 16, 2003, Hara et al.
U.S. Appl. No. 10/659,349, filed Sep. 11, 2003, Nomizu et al.
U.S. Appl. No. 10/646,754, filed Aug. 25, 2003, Kodama et al.
U.S. Appl. No. 10/647,337, filed Aug. 26, 2003, Sakuyama et al.
U.S. Appl. No. 10/623,558, filed Jul. 22, 2003, Sakuyama et al.
U.S. Appl. No. 10/600,333, filed Jun. 23, 2003, Suino et al.
U.S. Appl. No. 10/420,887, filed Apr. 23, 2003, Sano.

* cited by examiner

Decomposition_Level_1

VERTICAL HIGH

| -3 | 3 | 0 | 3 | -3 | 6 | 4 | -3 | 3 | 0 | -1 | -5 | 1 | 2 | -3 | 1 | -2 | -3 | -2 |
|---|---|---|---|---|---|---|---|---|---|---|---|---|---|---|---|---|---|---|
| 0 | 1 | -1 | 1 | 0 | 2 | 3 | 5 | 2 | 3 | 2 | 1 | -1 | -2 | 1 | -1 | -1 | -2 | -1 |
| -5 | -2 | 4 | -2 | -5 | 0 | 3 | 2 | 0 | -1 | 3 | -4 | 0 | 3 | 3 | -2 | -6 | 4 | -6 |
| -2 | 3 | 2 | 3 | -2 | 2 | -1 | 0 | 1 | -2 | 6 | 20 | 8 | -6 | -12 | -5 | 8 | 2 | 8 |
| 0 | 0 | -1 | 0 | 0 | 2 | 1 | -3 | 3 | -3 | 3 | 1 | 1 | 10 | 6 | -2 | -3 | -4 | -3 |
| -2 | -3 | 0 | -3 | -2 | 0 | 2 | -1 | -1 | -9 | -3 | -6 | -4 | 2 | 3 | -4 | 4 | -2 | 4 |
| -2 | -2 | -1 | -2 | -2 | 1 | 1 | 0 | 2 | -5 | -6 | 2 | -1 | 1 | -2 | 0 | -1 | -3 | -1 |
| -1 | 2 | -2 | 2 | -1 | -2 | 0 | 2 | -2 | 1 | -4 | -8 | 3 | 1 | -1 | -2 | -7 | -3 | -7 |

FIG.11C  PRIOR ART

VERTICAL LOW

| -20 | -14 | -3 | -14 | -20 | -39 | -49 | -60 | -68 | -77 | -73 | -70 | -61 | -48 | -39 | -26 | -16 | -11 | -16 |
|---|---|---|---|---|---|---|---|---|---|---|---|---|---|---|---|---|---|---|
| -24 | -9 | -2 | -9 | -24 | -32 | -43 | -63 | -75 | -79 | -83 | -77 | -75 | -60 | -48 | -39 | -26 | -18 | -26 |
| -22 | -6 | 1 | -6 | -22 | -30 | -48 | -64 | -73 | -80 | -85 | -82 | -76 | -68 | -63 | -43 | -32 | -27 | -32 |
| -25 | -15 | -2 | -15 | -25 | -37 | -45 | -59 | -74 | -85 | -87 | -78 | -79 | -76 | -71 | -59 | -45 | -25 | -45 |
| -23 | -9 | 3 | -9 | -23 | -37 | -46 | -64 | -71 | -79 | -81 | -83 | -82 | -71 | -64 | -66 | -63 | -42 | -63 |
| -24 | -12 | -2 | -12 | -24 | -35 | -40 | -62 | -71 | -79 | -79 | -82 | -81 | -80 | -83 | -78 | -74 | -71 | -74 |
| -19 | -13 | -4 | -13 | -19 | -34 | -42 | -56 | -69 | -68 | -76 | -78 | -83 | -82 | -85 | -81 | -79 | -71 | -79 |
| -23 | -13 | -5 | -13 | -23 | -32 | -45 | -55 | -68 | -77 | -76 | -77 | -81 | -81 | -84 | -83 | -80 | -76 | -80 |

FIG.11D PRIOR ART

AFTER VERTICAL LOW, HORIZONTAL LOW 1LL

| -4 | -21 | -50 | -70 | -75 | -61 | -38 | -14 |
|---|---|---|---|---|---|---|---|
| 0 | -22 | -43 | -76 | -82 | -74 | -48 | -24 |
| 4 | -19 | -47 | -74 | -85 | -76 | -61 | -29 |
| -2 | -26 | -45 | -75 | -87 | -78 | -71 | -40 |
| 4 | -23 | -48 | -73 | -82 | -82 | -64 | -58 |
| -1 | -24 | -42 | -73 | -80 | -81 | -82 | -73 |
| -4 | -20 | -43 | -68 | -74 | -82 | -84 | -77 |
| -4 | -22 | -44 | -69 | -77 | -80 | -84 | -79 |

FIG.11E PRIOR ART

AFTER VERTICAL LOW, HORIZONTAL HIGH 1HL

| -2 | -4 | -1 | -6 | -3 | 2 | 2 | 5 |
|---|---|---|---|---|---|---|---|
| 4 | 2 | -4 | 0 | 2 | 2 | -2 | 8 |
| 5 | 5 | -3 | -1 | -1 | 2 | 5 | 5 |
| -1 | -2 | 1 | -4 | 5 | -1 | -1 | 20 |
| 1 | -2 | -5 | -3 | -1 | 2 | -2 | 21 |
| 1 | -3 | -6 | -4 | -2 | 2 | 1 | 3 |
| -1 | -3 | 0 | 5 | 2 | 2 | 1 | 8 |
| 1 | 2 | 2 | -5 | 2 | 2 | -1 | 4 |

FIG.11F  PRIOR ART

AFTER VERTICAL HIGH, HORIZONTAL LOW 1LH

| 3 | 0 | 4 | 1 | -2 | 1 | -1 | -1 |
|---|---|---|---|----|---|----|----|
| 0 | 1 | 4 | 3 | 3 | -1 | 0 | -1 |
| 4 | -5 | 4 | 0 | 1 | -1 | 4 | -3 |
| 4 | 0 | 0 | 0 | 8 | 10 | -14 | 6 |
| 0 | 1 | 0 | 0 | 1 | 3 | 7 | -4 |
| -1 | -2 | 2 | -3 | -5 | -4 | 2 | 1 |
| -1 | -1 | 1 | 1 | -5 | 1 | -1 | -1 |
| 0 | 0 | 1 | 0 | -5 | 1 | 0 | -5 |

FIG.11G  PRIOR ART

AFTER VERTICAL HIGH, HORIZONTAL HIGH 1HH

| 5 | 6 | -6 | -1 | -5 | 3 | 4 | -1 |
|---|---|----|----|----|---|---|----|
| 2 | 1 | 3 | 1 | 1 | -2 | -1 | -1 |
| -1 | 1 | 1 | -2 | -5 | 2 | 0 | 10 |
| 3 | 4 | 0 | -5 | 13 | -4 | -3 | -6 |
| 1 | 2 | -5 | -6 | -1 | 7 | -3 | -1 |
| -2 | 0 | -1 | -7 | -2 | 3 | -7 | -6 |
| 0 | 2 | -1 | -3 | 6 | 3 | 2 | -2 |
| 4 | -1 | 3 | 4 | -7 | 0 | 2 | 4 |

FIG.12A  PRIOR ART

INTERLEAVE
LL  HL
LH  HH

| -4 | -2 | -21 | -4 | -50 | -1 | -70 | -6 | -75 | -3 | -61 | 2 | -38 | 2 | -14 | 5 |
|---|---|---|---|---|---|---|---|---|---|---|---|---|---|---|---|
| 3 | 5 | 0 | 6 | 4 | -6 | 1 | -1 | -2 | -5 | 1 | 3 | -1 | 4 | -1 | -1 |
| 0 | 4 | -22 | 2 | -43 | -4 | -76 | 0 | -82 | 2 | -74 | 2 | -48 | -2 | -24 | 8 |
| 0 | 2 | 1 | 1 | 4 | 3 | 3 | 1 | 3 | 1 | -1 | -2 | 0 | -1 | -1 | -1 |
| 4 | 5 | -19 | 5 | -47 | -3 | -74 | -1 | -85 | -1 | -76 | 2 | -61 | 5 | -29 | 5 |
| 4 | -1 | -5 | 1 | 4 | 1 | 0 | -2 | 1 | -5 | -1 | 2 | 4 | 0 | -3 | 10 |
| -2 | -1 | -26 | -2 | -45 | 1 | -75 | -4 | -87 | 5 | -78 | -1 | -71 | -1 | -40 | 20 |
| 4 | 3 | 0 | 4 | 0 | 0 | 0 | -5 | 8 | 13 | 10 | -4 | -14 | -3 | 6 | -6 |
| 4 | 1 | -23 | -2 | -48 | -5 | -73 | -3 | -82 | -1 | -82 | 2 | -64 | -2 | -58 | 21 |
| 0 | 1 | 1 | 2 | 0 | -5 | 0 | -6 | 1 | -1 | 3 | 7 | 7 | -3 | -4 | -1 |
| -1 | 1 | -24 | -3 | -42 | -6 | -73 | -4 | -80 | -2 | -81 | 2 | -82 | 1 | -73 | 3 |
| -1 | -2 | -2 | 0 | 2 | -1 | -3 | -7 | -5 | -2 | -4 | 3 | 2 | -7 | 1 | -6 |
| -4 | -1 | -20 | -3 | -43 | 0 | -68 | 5 | -74 | 2 | -82 | 2 | -84 | 1 | -77 | 8 |
| -1 | 0 | -1 | 2 | 1 | -1 | 1 | -3 | -5 | 6 | 1 | 3 | -1 | 2 | -1 | -2 |
| -4 | 1 | -22 | 2 | -44 | 2 | -69 | -5 | -77 | 2 | -80 | 2 | -84 | -1 | -79 | 4 |
| 0 | 4 | 0 | -1 | 1 | 3 | 0 | 4 | -5 | -7 | 1 | 0 | 0 | 2 | -5 | 4 |

FIG.12B  PRIOR ART

AFTER FILTERING HORIZONTAL EVEN PIXELS,
FILTERING ODD PIXELS

| 0 | 3 | -3 | 6 | 4 | -3 | 3 | 0 | -1 | -5 | 1 | 2 | -3 | 1 | -2 | -3 |
|---|---|---|---|---|---|---|---|---|---|---|---|---|---|---|---|
| -3 | -14 | -20 | -39 | -49 | -60 | -68 | -77 | -73 | -70 | -61 | -48 | -39 | -26 | -16 | -11 |
| 0 | 3 | -3 | 6 | 4 | -3 | 3 | 0 | -1 | -5 | 1 | 2 | -3 | 1 | -2 | -3 |
| -2 | -9 | -24 | -32 | -43 | -63 | -75 | -79 | -83 | -77 | -75 | -60 | -48 | -39 | -26 | -18 |
| -1 | 1 | 0 | 2 | 3 | 5 | 2 | 3 | 2 | 1 | -1 | -2 | 1 | -1 | -1 | -2 |
| 1 | -6 | -22 | -30 | -48 | -64 | -73 | -80 | -85 | -82 | -76 | -68 | -63 | -43 | -32 | -27 |
| 4 | -2 | -5 | 0 | 3 | 2 | 0 | -1 | 3 | -4 | 0 | 3 | 3 | -2 | -6 | 4 |
| -2 | -15 | -25 | -37 | -45 | -59 | -74 | -85 | -87 | -78 | -79 | -76 | -71 | -59 | -45 | -25 |
| 2 | 3 | -2 | 2 | -1 | 0 | 1 | -2 | 6 | 20 | 8 | -6 | -12 | -5 | 8 | 2 |
| 3 | -9 | -23 | -37 | -46 | -64 | -71 | -79 | -81 | -83 | -82 | -71 | -64 | -66 | -63 | -42 |
| -1 | 0 | 0 | 2 | 1 | -3 | 3 | -3 | 3 | 1 | 1 | 10 | 6 | -2 | -3 | -4 |
| -2 | -12 | -24 | -35 | -40 | -62 | -71 | -79 | -79 | -82 | -81 | -80 | -83 | -78 | -74 | -71 |
| 0 | -3 | -2 | 0 | 2 | -1 | -1 | -9 | -3 | -6 | -4 | 2 | 3 | -4 | 4 | -2 |
| -4 | -13 | -19 | -34 | -42 | -56 | -69 | -68 | -76 | -78 | -83 | -82 | -85 | -81 | -79 | -71 |
| -1 | -2 | -2 | 1 | 1 | 0 | 2 | -5 | -6 | 2 | -1 | 1 | -2 | 0 | -1 | -3 |
| -5 | -13 | -23 | -32 | -45 | -55 | -68 | -77 | -76 | -77 | -81 | -81 | -84 | -83 | -80 | -76 |
| -2 | 2 | -1 | -2 | 0 | 2 | -2 | 1 | -4 | -8 | 3 | 1 | -1 | -2 | -7 | -3 |

FIG.12C  PRIOR ART

AFTER FILTERING VERTICAL EVEN PIXELS,
FILTERING ODD PIXELS

| -3 | -16 | -19 | -42 | -51 | -59 | -70 | -77 | -73 | -68 | -62 | -49 | -38 | -27 | -15 | -10 |
|---|---|---|---|---|---|---|---|---|---|---|---|---|---|---|---|
| -3 | -10 | -24 | -32 | -44 | -65 | -70 | -79 | -79 | -77 | -68 | -53 | -46 | -32 | -22 | -17 |
| -2 | -10 | -23 | -34 | -45 | -64 | -76 | -80 | -83 | -76 | -75 | -60 | -48 | -39 | -25 | -17 |
| -2 | -7 | -22 | -31 | -45 | -60 | -73 | -78 | -83 | -78 | -77 | -66 | -55 | -42 | -29 | -25 |
| 0 | -6 | -21 | -31 | -50 | -66 | -74 | -81 | -86 | -81 | -76 | -68 | -64 | -42 | -30 | -28 |
| 2 | -13 | -27 | -35 | -45 | -61 | -74 | -84 | -85 | -86 | -79 | -69 | -64 | -52 | -44 | -24 |
| -4 | -15 | -23 | -38 | -46 | -60 | -74 | -84 | -89 | -82 | -81 | -75 | -69 | -57 | -46 | -27 |
| 1 | -10 | -25 | -36 | -47 | -62 | -72 | -83 | -80 | -65 | -75 | -80 | -78 | -66 | -47 | -33 |
| 3 | -10 | -23 | -38 | -46 | -63 | -72 | -78 | -83 | -88 | -84 | -72 | -63 | -64 | -64 | -42 |
| -1 | -11 | -24 | -35 | -43 | -65 | -69 | -80 | -78 | -84 | -81 | -68 | -68 | -73 | -72 | -60 |
| -2 | -11 | -24 | -36 | -41 | -61 | -72 | -76 | -79 | -81 | -80 | -83 | -85 | -77 | -74 | -70 |
| -3 | -15 | -23 | -35 | -40 | -60 | -72 | -80 | -80 | -85 | -85 | -81 | -82 | -83 | -73 | -72 |
| -4 | -12 | -18 | -34 | -43 | -56 | -69 | -65 | -74 | -77 | -82 | -83 | -85 | -80 | -80 | -70 |
| -5 | -15 | -22 | -32 | -43 | -56 | -67 | -76 | -80 | -75 | -83 | -82 | -86 | -82 | -80 | -76 |
| -4 | -13 | -22 | -32 | -45 | -56 | -68 | -76 | -74 | -76 | -82 | -82 | -83 | -83 | -78 | -75 |
| -6 | -11 | -23 | -34 | -45 | -54 | -70 | -75 | -78 | -84 | -79 | -81 | -84 | -85 | -85 | -78 |

FIG.13 PRIOR ART

ERROR

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

VERTICAL HIGH

| | | | | | | | | | | | | | | | | | |
|---|---|---|---|---|---|---|---|---|---|---|---|---|---|---|---|---|---|
| -3 | 3 | 0 | 3 | -3 | 6 | 4 | -3 | 3 | 0 | -1 | -5 | 1 | 2 | -3 | 1 | -2 | -3 | -2 |
| 0 | 1 | -1 | 1 | 0 | 2 | 3 | 5 | 2 | 3 | 2 | 1 | -1 | -2 | 1 | -1 | -1 | -2 | -1 |
| -5 | -2 | 4 | -2 | -5 | 0 | 3 | 2 | 0 | -1 | 3 | -4 | 0 | 3 | 3 | -2 | -6 | 4 | -6 |
| -2 | 3 | 2 | 3 | -2 | 2 | -1 | 0 | 1 | -2 | 6 | 20 | 8 | -6 | -12 | -5 | 8 | 2 | 8 |
| 0 | 0 | -1 | 0 | 0 | 2 | 1 | -3 | 3 | -3 | 3 | 1 | 1 | 10 | 6 | -2 | -3 | -4 | -3 |
| -2 | -3 | 0 | -3 | -2 | 0 | 2 | -1 | -1 | -9 | -3 | -6 | -4 | 2 | 3 | -4 | 4 | -2 | 4 |
| -2 | -2 | -1 | -2 | -2 | 1 | 1 | 0 | 2 | -5 | -6 | 2 | -1 | 1 | -2 | 0 | -1 | -3 | -1 |
| -1 | 2 | -2 | 2 | -1 | -2 | 0 | 2 | -2 | 1 | -4 | -8 | 3 | 1 | -1 | -2 | -7 | -3 | -7 |

FIG.14C PRIOR ART

VERTICAL LOW

| | | | | | | | | | | | | | | | | | |
|---|---|---|---|---|---|---|---|---|---|---|---|---|---|---|---|---|---|
| -20 | -14 | -3 | -14 | -20 | -39 | -49 | -60 | -68 | -77 | -73 | -70 | -61 | -48 | -39 | -26 | -16 | -11 | -16 |
| -24 | -9 | -2 | -9 | -24 | -32 | -43 | -63 | -75 | -79 | -83 | -77 | -75 | -60 | -48 | -39 | -26 | -18 | -26 |
| -22 | -6 | 1 | -6 | -22 | -30 | -48 | -64 | -73 | -80 | -85 | -82 | -76 | -68 | -63 | -43 | -32 | -27 | -32 |
| -25 | -15 | -2 | -15 | -25 | -37 | -45 | -59 | -74 | -85 | -87 | -78 | -79 | -76 | -71 | -59 | -45 | -25 | -45 |
| -23 | -9 | 3 | -9 | -23 | -37 | -46 | -64 | -71 | -79 | -81 | -83 | -82 | -71 | -64 | -66 | -63 | -42 | -63 |
| -24 | -12 | -2 | -12 | -24 | -35 | -40 | -62 | -71 | -79 | -79 | -82 | -81 | -80 | -83 | -78 | -74 | -71 | -74 |
| -19 | -13 | -4 | -13 | -19 | -34 | -42 | -56 | -69 | -68 | -76 | -78 | -83 | -82 | -85 | -81 | -79 | -71 | -79 |
| -23 | -13 | -5 | -13 | -23 | -32 | -45 | -55 | -68 | -77 | -76 | -77 | -81 | -81 | -84 | -83 | -80 | -76 | -80 |

FIG.14D  PRIOR ART

AFTER VERTICAL LOW, HORIZONTAL LOW 1LL

| -4 | -20 | -48 | -68 | -72 | -60 | -36 | -12 |
| --- | --- | --- | --- | --- | --- | --- | --- |
| 0 | -20 | -40 | -76 | -80 | -72 | -48 | -24 |
| 4 | -16 | -44 | -72 | -84 | -76 | -60 | -28 |
| 0 | -24 | -44 | -72 | -84 | -76 | -68 | -40 |
| 4 | -20 | -48 | -72 | -80 | -80 | -64 | -56 |
| 0 | -24 | -40 | -72 | -80 | -80 | -80 | -72 |
| -4 | -20 | -40 | -68 | -72 | -80 | -84 | -76 |
| -4 | -20 | -44 | -68 | -76 | -80 | -84 | -76 |

FIG.14E  PRIOR ART

AFTER VERTICAL LOW, HORIZONTAL HIGH 1HL

| 0 | 0 | 0 | 0 | 0 | 0 | 0 | 0 |
| --- | --- | --- | --- | --- | --- | --- | --- |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG.14F   PRIOR ART

AFTER VERTICAL HIGH, HORIZONTAL LOW 1LH

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG.14G   PRIOR ART

AFTER VERTICAL HIGH, HORIZONTAL HIGH 1HH

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG.15A  PRIOR ART

INTERLEAVE
LL  HL
LH  HH

| LL | HL | LL | HL | LL | HL | LL | HL | LL | HL | LL | HL | LL | HL | LL | HL |
|---|---|---|---|---|---|---|---|---|---|---|---|---|---|---|---|
| -4 | 0 | -20 | 0 | -48 | 0 | -68 | 0 | -72 | 0 | -60 | 0 | -36 | 0 | -12 | 0 |
| 0 | 0 | 0 | 0 | 0 | 0 | 0 | 0 | 0 | 0 | 0 | 0 | 0 | 0 | 0 | 0 |
| 0 | 0 | -20 | 0 | -40 | 0 | -76 | 0 | -80 | 0 | -72 | 0 | -48 | 0 | -24 | 0 |
| 0 | 0 | 0 | 0 | 0 | 0 | 0 | 0 | 0 | 0 | 0 | 0 | 0 | 0 | 0 | 0 |
| 4 | 0 | -16 | 0 | -44 | 0 | -72 | 0 | -84 | 0 | -76 | 0 | -60 | 0 | -28 | 0 |
| 0 | 0 | 0 | 0 | 0 | 0 | 0 | 0 | 0 | 0 | 0 | 0 | 0 | 0 | 0 | 0 |
| 0 | 0 | -24 | 0 | -44 | 0 | -72 | 0 | -84 | 0 | -76 | 0 | -68 | 0 | -40 | 0 |
| 0 | 0 | 0 | 0 | 0 | 0 | 0 | 0 | 0 | 0 | 0 | 0 | 0 | 0 | 0 | 0 |
| 4 | 0 | -20 | 0 | -48 | 0 | -72 | 0 | -80 | 0 | -80 | 0 | -64 | 0 | -56 | 0 |
| 0 | 0 | 0 | 0 | 0 | 0 | 0 | 0 | 0 | 0 | 0 | 0 | 0 | 0 | 0 | 0 |
| 0 | 0 | -24 | 0 | -40 | 0 | -72 | 0 | -80 | 0 | -80 | 0 | -80 | 0 | -72 | 0 |
| 0 | 0 | 0 | 0 | 0 | 0 | 0 | 0 | 0 | 0 | 0 | 0 | 0 | 0 | 0 | 0 |
| -4 | 0 | -20 | 0 | -40 | 0 | -68 | 0 | -72 | 0 | -80 | 0 | -84 | 0 | -76 | 0 |
| 0 | 0 | 0 | 0 | 0 | 0 | 0 | 0 | 0 | 0 | 0 | 0 | 0 | 0 | 0 | 0 |
| -4 | 0 | -20 | 0 | -44 | 0 | -68 | 0 | -76 | 0 | -80 | 0 | -84 | 0 | -76 | 0 |
| 0 | 0 | 0 | 0 | 0 | 0 | 0 | 0 | 0 | 0 | 0 | 0 | 0 | 0 | 0 | 0 |

FIG.15B PRIOR ART

AFTER LOW FILTERING HORIZONTAL EVEN PIXELS,
HIGH FILTERING ODD PIXELS

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| −4 | −12 | −20 | −34 | −48 | −58 | −68 | −70 | −72 | −66 | −60 | −48 | −36 | −24 | −12 | −12 |
| 0 | 0 | 0 | 0 | 0 | 0 | 0 | 0 | 0 | 0 | 0 | 0 | 0 | 0 | 0 | 0 |
| 0 | −10 | −20 | −30 | −40 | −58 | −76 | −78 | −80 | −76 | −72 | −60 | −48 | −36 | −24 | −24 |
| 0 | 0 | 0 | 0 | 0 | 0 | 0 | 0 | 0 | 0 | 0 | 0 | 0 | 0 | 0 | 0 |
| 4 | −6 | −16 | −30 | −44 | −58 | −72 | −78 | −84 | −80 | −76 | −68 | −60 | −44 | −28 | −28 |
| 0 | 0 | 0 | 0 | 0 | 0 | 0 | 0 | 0 | 0 | 0 | 0 | 0 | 0 | 0 | 0 |
| 0 | −12 | −24 | −34 | −44 | −58 | −72 | −78 | −84 | −80 | −76 | −72 | −68 | −54 | −40 | −40 |
| 0 | 0 | 0 | 0 | 0 | 0 | 0 | 0 | 0 | 0 | 0 | 0 | 0 | 0 | 0 | 0 |
| 4 | −8 | −20 | −34 | −48 | −60 | −72 | −76 | −80 | −80 | −80 | −72 | −64 | −60 | −56 | −56 |
| 0 | 0 | 0 | 0 | 0 | 0 | 0 | 0 | 0 | 0 | 0 | 0 | 0 | 0 | 0 | 0 |
| 0 | −12 | −24 | −32 | −40 | −56 | −72 | −76 | −80 | −80 | −80 | −80 | −80 | −76 | −72 | −72 |
| 0 | 0 | 0 | 0 | 0 | 0 | 0 | 0 | 0 | 0 | 0 | 0 | 0 | 0 | 0 | 0 |
| −4 | −12 | −20 | −30 | −40 | −54 | −68 | −70 | −72 | −76 | −80 | −82 | −84 | −80 | −76 | −76 |
| 0 | 0 | 0 | 0 | 0 | 0 | 0 | 0 | 0 | 0 | 0 | 0 | 0 | 0 | 0 | 0 |
| −4 | −12 | −20 | −32 | −44 | −56 | −68 | −72 | −76 | −78 | −80 | −82 | −84 | −80 | −76 | −76 |
| 0 | 0 | 0 | 0 | 0 | 0 | 0 | 0 | 0 | 0 | 0 | 0 | 0 | 0 | 0 | 0 |

FIG.15C PRIOR ART

AFTER LOW FILTERING VERTICAL EVEN PIXELS,
HIGH FILTERING ODD PIXELS

| −4 | −12 | −20 | −34 | −48 | −58 | −68 | −70 | −72 | −66 | −60 | −48 | −36 | −24 | −12 | −12 |
|---|---|---|---|---|---|---|---|---|---|---|---|---|---|---|---|
| −2 | −11 | −20 | −32 | −44 | −58 | −72 | −74 | −76 | −71 | −66 | −54 | −42 | −30 | −18 | −18 |
| 0 | −10 | −20 | −30 | −40 | −58 | −76 | −78 | −80 | −76 | −72 | −60 | −48 | −36 | −24 | −24 |
| 2 | −8 | −18 | −30 | −42 | −58 | −74 | −78 | −82 | −78 | −74 | −64 | −54 | −40 | −26 | −26 |
| 4 | −6 | −16 | −30 | −44 | −58 | −72 | −78 | −84 | −80 | −76 | −68 | −60 | −44 | −28 | −28 |
| 2 | −9 | −20 | −32 | −44 | −58 | −72 | −78 | −84 | −80 | −76 | −70 | −64 | −49 | −34 | −34 |
| 0 | −12 | −24 | −34 | −44 | −58 | −72 | −78 | −84 | −80 | −76 | −72 | −68 | −54 | −40 | −40 |
| 2 | −10 | −22 | −34 | −46 | −59 | −72 | −77 | −82 | −80 | −78 | −72 | −66 | −57 | −48 | −48 |
| 4 | −8 | −20 | −34 | −48 | −60 | −72 | −76 | −80 | −80 | −80 | −72 | −64 | −60 | −56 | −56 |
| 2 | −10 | −22 | −33 | −44 | −58 | −72 | −76 | −80 | −80 | −80 | −76 | −72 | −68 | −64 | −64 |
| 0 | −12 | −24 | −32 | −40 | −56 | −72 | −76 | −80 | −80 | −80 | −80 | −80 | −76 | −72 | −72 |
| −2 | −12 | −22 | −31 | −40 | −55 | −70 | −73 | −76 | −78 | −80 | −81 | −82 | −78 | −74 | −74 |
| −4 | −12 | −20 | −30 | −40 | −54 | −68 | −70 | −72 | −76 | −80 | −82 | −84 | −80 | −76 | −76 |
| −4 | −12 | −20 | −31 | −42 | −55 | −68 | −71 | −74 | −77 | −80 | −82 | −84 | −80 | −76 | −76 |
| −4 | −12 | −20 | −32 | −44 | −56 | −68 | −72 | −76 | −78 | −80 | −82 | −84 | −80 | −76 | −76 |
| −4 | −12 | −20 | −32 | −44 | −56 | −68 | −72 | −76 | −78 | −80 | −82 | −84 | −80 | −76 | −76 |

ERROR

| -1 | 4 | -1 | 8 | 3 | 1 | 2 | 7 | 1 | 2 | 2 | 1 | 2 | 3 | 3 | -2 |
|----|----|----|----|----|----|----|----|----|----|----|----|----|----|----|----|
| 1 | -1 | 4 | 0 | 0 | 7 | -2 | 5 | 3 | 6 | 2 | -1 | 4 | 2 | 4 | -1 |
| 2 | 0 | 3 | 4 | 5 | 6 | 0 | 2 | 3 | 0 | 3 | 0 | 0 | 3 | 1 | -7 |
| 4 | -1 | 4 | 1 | 3 | 2 | -1 | 0 | 1 | 0 | 3 | 2 | 1 | 2 | 3 | -1 |
| 4 | 0 | 5 | 1 | 6 | 8 | 2 | 3 | 2 | 1 | 0 | 0 | 4 | -2 | 2 | 0 |
| 0 | 4 | 7 | 3 | 1 | 3 | 2 | 6 | 1 | 6 | 3 | -1 | 0 | 3 | 10 | -10 |
| 4 | 3 | -1 | 4 | 2 | 2 | 2 | 6 | 5 | 2 | 5 | 3 | 1 | 3 | 6 | -13 |
| 1 | 0 | 3 | 2 | 1 | 3 | 0 | 6 | -2 | -15 | -3 | 8 | 12 | 9 | -1 | -15 |
| 1 | 2 | 3 | 4 | -2 | 3 | 0 | 2 | 3 | 8 | 4 | 0 | -1 | 4 | 8 | -14 |
| 3 | 1 | 2 | 2 | -1 | 7 | -3 | 4 | -2 | 4 | 1 | -8 | -4 | 5 | 8 | -4 |
| 2 | -1 | 0 | 4 | 1 | 5 | 0 | 0 | -1 | 1 | 0 | 3 | 5 | 1 | 2 | -2 |
| 1 | 3 | 1 | 4 | 0 | 5 | 2 | 7 | 4 | 7 | 5 | 0 | 0 | 5 | -1 | -2 |
| 0 | 0 | -2 | 4 | 3 | 2 | 1 | -5 | 2 | 1 | 2 | 1 | 1 | 0 | 4 | -6 |
| 1 | 3 | 2 | 1 | 1 | 1 | -1 | 5 | 6 | -2 | 3 | 0 | 2 | 2 | 4 | 0 |
| 0 | 1 | 2 | 0 | 1 | 0 | 0 | 4 | -2 | -2 | 2 | 0 | -1 | 3 | 2 | -1 |
| 2 | -1 | 3 | 2 | 1 | -2 | 2 | 3 | 2 | 6 | -1 | -1 | 0 | 5 | 9 | 2 |

Decomposition_Level_1

Decomposition_Level_2

Code Block Number

Decomposition Level 1(1HL/ 1LH 1HH)

After Layer Restructuring (Conditional)

After Layer Restructuring (Shift in units of precincts)

Restructured Layer

Decomposition_Level_1

IMAGE COMPRESSION METHOD AND APPARATUS FOR SUPPRESSING QUANTIZATION RATE IN PARTICULAR REGION, IMAGE EXPANSION METHOD AND APPARATUS THEREFOR, AND COMPUTER-READABLE STORAGE MEDIUM STORING PROGRAM FOR THE COMPRESSION OR EXPANSION

BACKGROUND OF THE INVENTION

This application claims the benefit of Japanese Patent Applications No. 2001-175081 filed Jun. 11, 2001 and No. 2001-178310 filed Jun. 13, 2001, in the Japanese Patent Office, the disclosure of which is hereby incorporated by reference.

1. Field of the Invention

The present invention generally relates to image compression methods and apparatuses, image expansion methods and apparatuses, and storage media, and more particularly to an image compression method and apparatus, an image expansion method and apparatus, and a computer-readable storage medium which stores a program for causing a computer to carry out an image compression and/or an image expansion so as to suppress a quantization rate in a vicinity of a tile boundary.

2. Description of the Related Art

Due to improvements made in image input techniques and image output techniques, there are increased demands to improve the high definition property of color still images. One example of an image input apparatus is a digital camera (DC), and helped by reduced cost of high-performance charge coupled devices (CCDs) having 3,000,000 or more pixels, such high-performance CCDs are widely used for digital cameras in the popular price range. It is expected that products using CCDs having 5,000,000 or more pixels will be put on the market in the near future. Such high-performance input devices, typified by the CCDs, have been realized mainly due to improvements in silicon processes and device technologies, and have solved the tradeoff problem between miniaturizing the input device and suppressing signal-to-noise (S/N) ratio. This trend of increasing the number of pixels of the input device is expected to continue.

On the other hand, considerable improvements have also been made in image output devices and image display devices, such as hard-copy devices including laser printers, ink jet printers and thermal printers, and soft-copy devices including flat panel displays made of CRTs, liquid crystal displays (LCDs) and plasma display panels (PDPs). The high definition property of such image output devices and image display devices have improved considerably, and the cost has greatly been reduced.

Because of these high-performance and inexpensive image input devices and image output devices on the market, the use of high-definition still images have become popular. It is expected that the demands for high-definition still images will increase in the future in various fields. Actually, the developments in personal computers (PCs) and network-related technologies including the Internet have accelerated such trends. Especially in recent years, mobile equipments such as portable telephones and lap-top computers have become extremely popular, and there are more and more opportunities to transmit or receive high-definition images via a communication means. Consequently, it is expected that the demands to further improve the performance or function of the image compression and/or expansion techniques will increase so as to facilitate processing of the high-definition still images.

As one of image compression and expansion algorithms for facilitating the processing of such high-definition still images, the JPEG (Joint Photographic Experts Group) system is popularly used. In addition, the JPEG2000 which has become an international standard in 2001 uses an image compression and expansion algorithm with a high performance which is further improved compared to the JPEG. Hence, the JPEG2000 is extremely flexible and extendible with respect to various functions and various applications. Accordingly, there is much expectation on the JPEG2000 as a next-generation high-definition still image compression and expansion format which will succeed the JPEG.

FIG. 1 is a system block diagram for explaining the operating principle of the JPEG algorithm. The JPEG algorithm is realized by a color space transform and inverse transform section 40, a discrete cosine transform and inverse transform section 41, a quantization and inverse quantization section 42, and an entropy coding and decoding section 43. Normally, a non-independent-function is used in order to obtain a high compression rate, and the so-called lossless (or no-loss) compression and expansion will not be carried out. Although the original image data is not stored in their entirety, no problems will occur from the practical point of view. For this reason, the JPEG system can suppress the amount of memory capacity required to carry out the compression and expansion processes and to store the compressed image data. In addition, the JPEG system greatly contributes to reducing the time which is required for the data transmission and reception. Because of these advantages, the JPEG system is presently the most popularly used still image compression and expansion algorithm.

FIG. 2 is a system block diagram for explaining the operating principle of the JPEG2000 algorithm. The JPEG algorithm is realized by a color space transform and inverse transform section 50, a two-dimensional wavelet transform and inverse transform section 51, a quantization and inverse quantization section 52, an entropy coding and decoding section 53, and a tag processing section 54.

As described above, the JPEG system is the most popularly used still image compression and expansion system at the present. However, the demands to further improve the high definition properties of still images continue to increase, and the technical limits of the JPEG system are beginning to surface. For example, block noise and mosquito noise appearing in the image were not conspicuous in the past, but are gradually becoming more conspicuous as the high definition property of the original image improves. In other words, the image deterioration of the JPEG file which did not cause problems in the past are now becoming notable and no longer negligible from the practical point of view. As a result, image quality improvement at the low bit rate, that is, in the high compression rate region, is recognized as the most important problem to be solved for the algorithm. The JPEG2000 was developed as an algorithm capable of eliminating this problem, and it is expected that the JPEG2000 system will be used concurrently with the existing JPEG system.

When FIGS. 1 and 2 are compared, it may be seen that the transformation method is one of the largest differences between the JPEG and the JPEG2000. The JPEG system employs the discrete cosine transform (DCT), while the JPEG2000 system employs the discrete wavelet transform (DWT). Compared to the DCT, the DWT has an advantage in that the image quality is good in the high compression region, which is the main reason for employing the DWT in the JPEG2000 system.

Another large difference between the JPEG and the JPEG2000 is that the JPEG2000 additionally uses a functional block called the tag processing section 54 at the last stage for forming codes. The tag processing section 54 generates the compressed data as a code stream at the time of the compression operation, and interprets the code stream necessary for the expansion at the time of the expansion operation. The JPEG2000 can realize various convenient functions by the code stream. For example, FIG. 3 is a diagram showing an example of a subband at each decomposition level for a case where the decomposition level is 3. It is possible to freely stop the still image compression and expansion operation at an arbitrary level corresponding to the octave division in the DWT of the block base shown in FIG. 3.

At the original image input and output sections shown in FIGS. 1 and 2, the color space transform and inverse transform sections 40 and 50 are connected in most cases. For example, a transformation from the RGB colorimetric system made up of red (R), green (G) and blue (B) components of the primary color system or, from the YMC colorimetric system made up of yellow (Y), magenta (M) and cyan (C) components of the complementary color system, to the YUV or YCrCb colorimetric system or, an inverse transformation, is carried out in the color space transform and inverse transform sections 40 and 50.

Next, a description will be given of the JPEG2000 algorithm. The technical terms related to the JPEG2000 are in conformance with the JPEG2000 Final Draft International Standard (FDIS). Typical technical terms are defined as follows.

1. "Bit-Plane": A two-dimensional array of bits. In this Recommendation International Standard a bit-plane refers to all the bits of the same magnitude in all coefficients or samples. This could refer to a bit-plane in a component, tile-component, code-block, region of interest, or other.
2. "Code-Block": A rectangular grouping of coefficients from the same subband of a tile-component.
3. "Decomposition Level": A collection of wavelet subbands where each coefficient has the same spatial impact or span with respect to the source component samples. These include the HL, LH, and HH subbands of the same two-dimensional subband decomposition. For the last decomposition level the LL subband is also included.
4. "Layer": A collection of compressed image data from coding pass of one, or more, code-blocks of a tile-component. Layers have an order for encoding and decoding and decoding that must be preserved.
5. "Precinct": A one rectangular region of a transformed tile-component, within each resolution level, used for limiting the size of packets.

FIG. 4 is a diagram showing an example of each component of a color image divided into tiles. Generally, each of components 70, 71 and 72 (RGB primary color system in this case) of the original image is divided into rectangular regions (tiles) $70_t$, $71_t$ and $72_t$ in the color image as shown in FIG. 4. Each of the tiles, such as R00, R01, ..., R15, G00, G01, ..., G15, B00, B01, ..., B15, becomes a basic unit for executing the compression and expansion process. Accordingly, the compression and expansion operation is independently carried out for every component and for every tile. At the time of the coding, the data of each tile of each component is input to the color space transform and inverse transform section 50 and subjected to a color space transform, and is thereafter subjected to a two-dimensional wavelet transform (forward transform) in the two-dimensional wavelet transform section 51 and spatially divided into frequency bands.

FIG. 3 described above shows the subband at each decomposition level for the case where the decomposition level is 3. In other words, the two-dimensional wavelet transform is carried out with respect to the tile original image (0LL) (decomposition level 0 (60)) obtained by the tile-division of the original image, so as to separate the subbands (1LL, 1HL, 1LH, 1HH) indicated by the decomposition level 1 (61). The two-dimensional wavelet transform is then carried out with respect to the low-frequency component 1LL at this level, so as to separate the subbands (2LL, 2HL, 2LH, 2HH) indicated by the decomposition level 2 (62). Similarly thereafter, the two-dimensional wavelet transform is also carried out with respect to the low-frequency component 2LL, so as to separate the subbands (3LL, 3HL, 3LH, 3HH) indicating the decomposition level 3 (63).

Furthermore, in FIG. 3, the color of the subband which is the target of the coding at each decomposition level is indicated by gray. For example, when the decomposition level is 3, the subbands (3HL, 3LH, 3HH, 2HL, 2LH, 2HH, 1HL, 1LH, 1HH) indicated by gray are the coding targets, and the 3LL subband is not coded.

Next, the bits which are the coding targets are determined in the specified coding order, and context is generated from the peripheral bits of the target bit in the quantization and inverse quantization section 52.

The wavelet coefficients after the quantization process ended are divided into non-overlapping rectangular regions called precincts, for each of the individual subbands. The precincts are introduced to efficiently utilize the memory upon implementation.

FIG. 5 is a diagram for explaining one example of the relationship of the precinct and the code block. An original image 80 is divided into 4 tiles $80_{t0}$, $80_{t1}$, $80_{t2}$ and $80_{t3}$ at the decomposition level 1. As shown in FIG. 5, a precinct $80_{p4}$, for example, is made up of 3 spatially matching rectangular regions, and the same holds true for a precinct $80_{p6}$. Furthermore, each precinct is divided into non-overlapping rectangular blocks called code blocks. In this particular example, each precinct is divided into 12 code blocks 0 to 11, and for example, a code block $80_{b1}$ indicates a code block number 1. The code block becomes a basic unit when carrying out the entropy coding.

The coefficients after the wavelet transform may be quantized and coded as they are. However, in order to improve the coding efficiency, the JPEG2000 decomposes the coefficient values into bit-plane units, and the bit-planes may be ordered for every pixel or code block.

FIG. 6 is a diagram for explaining the procedure for ordering the bit-planes. In the particular example shown in FIG. 6, an original image 90 (32×32 pixels) is divided into 4 tiles $90_{t0}$, $90_{t1}$, $90_{t2}$ and $90_{t3}$ each having 16×16 pixels. The sizes of the code block and the precinct at the decomposition level 1 respectively are 4×4 pixels and 8×8 pixels. The numbers of the precincts and the code blocks are assigned in a raster sequence. In this particular example, numbers 0 to 3 are assigned to the precincts, and numbers 0 to 3 are assigned to the code blocks. A mirroring method is used for the pixel expansion with respect to the outside of the tile boundary, and the wavelet transform is carried out by a independent-function (5, 3) integer transform filter to obtain the wavelet coefficients of the decomposition level 1.

In addition, FIG. 6 also generally shows the typical layer structure for the tile $90_{t0}$ (tile 0) precinct $90_{p3}$ (precinct 3)

and the code block $90_{b3}$ (code block 3). A code block $90_{w3}$ after the transform is obtained by subjecting the code block $90_{b3}$ to the wavelet transform by the independent-function (5, 3) integer transform filter and obtaining the wavelet coefficient values of the decomposition level 1. The code block $90_{w3}$ after the transform is vided into the subbands (1LL, 1HL, 1LH, 1HH), and the wavelet coefficient values are allocated to each of the subbands.

The layer structure is easier to understand when the wavelet coefficient values are viewed from a horizontal direction (bit-plane direction). One layer is made up of an arbitrary number of bit-planes. In this example, each of the layers 0, 1, 2 and 3 is made up of 3 bit-planes 1, 3 and 1. The layer which includes a bit-plane closer to the LSB becomes the quantizing target earlier, and the layer including the bit-plane closer to the MSB becomes the quantizing target later and remains unquantized to the last. The method of discarding the layer closer to the LSB is called truncation, and the quantization rate can finely be controlled by this truncation.

In the entropy coding section 53 shown in FIG. 2, the coding with respect to the tiles of each of the components is carried out by probability estimation from the context and target bits. Hence, the coding process is carried out in units of tiles for all of the components of the original image.

Finally, the tag processing section 54 carries out a process of connecting all code data from the entropy coding section 53 into one code stream and adding a tag to this code stream. FIG. 7 is a simplified diagram showing an example of the code stream structure. As shown in FIG. 7, tag information called a header is added to the head of the code stream and to the head of the partial tile forming each tile. A main header 100 is added to the head of the code stream, and a tile-part header 101 is added to the head of the partial file. The coded data (bit stream 102) of each tile follows the tile-part header 101. An end tag 103 is also added to the end of the code stream.

On the other hand, at the time of the decoding, contrary to that at the time of the coding, the image data is generated from the code stream of each tile of each component, as will now be described briefly in conjunction with FIG. 2. In this case, the tag processing section 54 interprets the tag information added to the code stream which is input from the outside, decomposes the code stream into the code stream of each tile of each component, and carries out the decoding process for every code stream of each tile of each component. The position of the bit which is the target of the decoding is determined by the order based on the tag information within the code stream, and the quantization and inverse quantization section 52 generates the context from the arrangement of the peripheral bits (which have already been decoded) of the target bit position. The entropy coding and decoding section 53 carries out a decoding according to the probability estimation from the context and the code stream to generate the target bit, and the target bit is written at the target bit position.

The data decoded in this manner has been spatially divided for every frequency band. Hence, the decoded data is subjected to a two-dimensional wavelet inverse transform in the two-dimensional wavelet transform and inverse transform section 51, so as to restore each tile of each component of the image data. The restored data is transformed into the original colorimetric system data by the color space transform and inverse transform section 50.

In the case of the conventional JPEG compression and expansion system, the tile used in the JPEG2000 may be regarded as a square block having each side made up of 8 pixels and used for the two-dimensional discrete cosine transform.

The description given heretofore relates to the general still image. However, the technique described above may be extended to the moving (or dynamic) image. In other words, each frame of the moving image may be formed by one still image, and the still images may be displayed at an optimum frame rate for the application so as to obtain the moving image. Video data is obtained by coding the original still image or decoding compressed still image data, continuously, and thus, the compression and expansion operation is basically the same as that for the still image. Such an compression and expansion operation is sometimes also referred to as a motion still image compression and expansion process. This function of carrying out the motion still image compression and expansion process does not exist in the MPEG system video file which is presently used popularly for the moving image. Since this function of carrying out the motion still image compression and expansion process has an advantage in that high-quality still images can be edited in units of frames, there is much attention on this function for business use in broadcasting stations or the like. Hence, this function has the possibility of eventually being used by the general consumers.

The specification required of the motion still image compression and expansion algorithm but greatly differs from that required of the general still image compression and expansion algorithm is the processing speed (or rate). This is because the processing speed determines the frame rate which greatly affects the quality of the moving image. Because of the need to carry out the process in real-time, the method of realizing the motion still image compression and expansion algorithm is limited to methods having a high dependency on the hardware such as ASIC and DSP. Although it may eventually become possible in the future to realize a sufficiently high speed process by software, it seems necessary until then to wait for further progress in the fields such as semiconductor process and device techniques and software parallel compiler techniques.

However, according to the conventional techniques, there is a problem in that the tile boundary becomes conspicuous when the compression and expansion process is carried out under a high compression rate condition. The amount of data of the image becomes extremely large when the original image which is the target of the compression and expansion process is spatially large in area or includes large number of gradation levels for each of the color components. The concept of using tiles was developed to simultaneously cope with the demands to improve the high-definition still image described above and the technical problem of increasing amount of image data.

If the original image having an extremely large amount of data is processed as it is, an extremely large memory region is required to provide a working area for processing the image data and to provide an area for holding the processed result. In addition, the processing time required for the compression or expansion becomes extremely long. In order to avoid such problems, the original image is divided into units called tiles (blocks in the case of the JPEG) which are rectangular regions, and the compression and expansion process is normally carried out for each of such regions. By employing this concept of spatially dividing the original image into tiles, it has become possible to suppress the increase in the required memory capacity and processing time to a practical level.

However, the division of the original image into tiles has introduced a new problem, namely, the conspicuous tile boundary described above. This phenomenon of conspicuous tile boundary occurs when the compressed image data which is generated under a high compression rate condition by nonreversibly compressing (lossy encoding) the original image is expanded (decoded) back to the original image. Particularly when displaying a high-definition still image having a large area or moving image frequently using a high compression rate, the conspicuous tile boundary subjectively causes considerable effects even if the image quality within the tile is maintained satisfactory. Hence, this conspicuous tile boundary may cause serious consequences in the future with respect to one advantage of the JPEG2000, that is, the reduced image quality deterioration under the high compression rate.

FIG. 8 is a diagram showing an example of an image which is obtained by compressing the original image to 1/75 by a lossless (no-loss) compression and thereafter expanding the compressed image. FIG. 9 is a diagram showing an example of an error image between the original image and the image after expansion. In FIGS. 8 and 9, portions indicated by arrows 110a and 111a correspond to boundaries of the mutually adjacent tiles. It may be seen that a conspicuous discontinues line exists at these portions 110a and 111a.

When the image is compressed at a high compression rate and then expanded, it may be regarded that the two-dimensional wavelet transform process causes the conspicuous tile boundary. In other words, when the lowpass filter and highpass filter in the horizontal direction and the lowpass filter and highpass filter in the vertical direction carry out the respective filtering operations, the region which is the target of the operations extends outside the tile where the image data does not exist. The rate at which the operation target region extends outside the tile increases as the decomposition level increases.

According to the JPEG2000 format, various filters such as the non-independent-function (9, 7) floating point transform filter and the independent-function (5, 3) integer transform filter are recommended for use as the wavelet filter. For the sake of convenience, the detailed operation of the wavelet transform and the reason why the tile boundary appears will now be described for a case where the independent-function (5, 3) integer transform filter is used as the wavelet filter.

FIG. 10 is a diagram showing a pixel expansion using the mirroring method. As shown in FIG. 10, a case will be considered where characters "RICOH" are arranged in one row of a target tile 112. It is assumed that each character corresponds to the value of 1 pixel, and the first character "R" is the kth pixel and the last character "H" is the mth pixel. When carrying out the wavelet transform with respect to this tile 112, several pixels before the kth pixel and several pixels after the mth pixel become necessary. Hence, it is necessary to extend the pixels outside a tile boundary 112a according to the mirroring method, as shown in FIG. 10. Expanded pixels are denoted by a reference numeral 113.

In the (5, 3) independent-function wavelet filter, the values of the odd numbered pixels and the wavelet coefficient values of the even numbered pixels are respectively calculated according to formulas (1) and (2), where C(2i+1), C(2i), . . . are wavelet coefficient values and P(2i+1), P(2i), . . . are pixel values.

$$C(2i+1)=P(2i+1)-\lfloor(P(2i)+P(2i+2))/2\rfloor \text{ for } k-1\leq 2k+1<m+1 \tag{1}$$

$$C(2i)=O(2i)+\lfloor(C(2I-1)+C(2I+1)+2)/4\rfloor \text{ for } k\leq 2I<m+1 \tag{2}$$

Figure 11A:
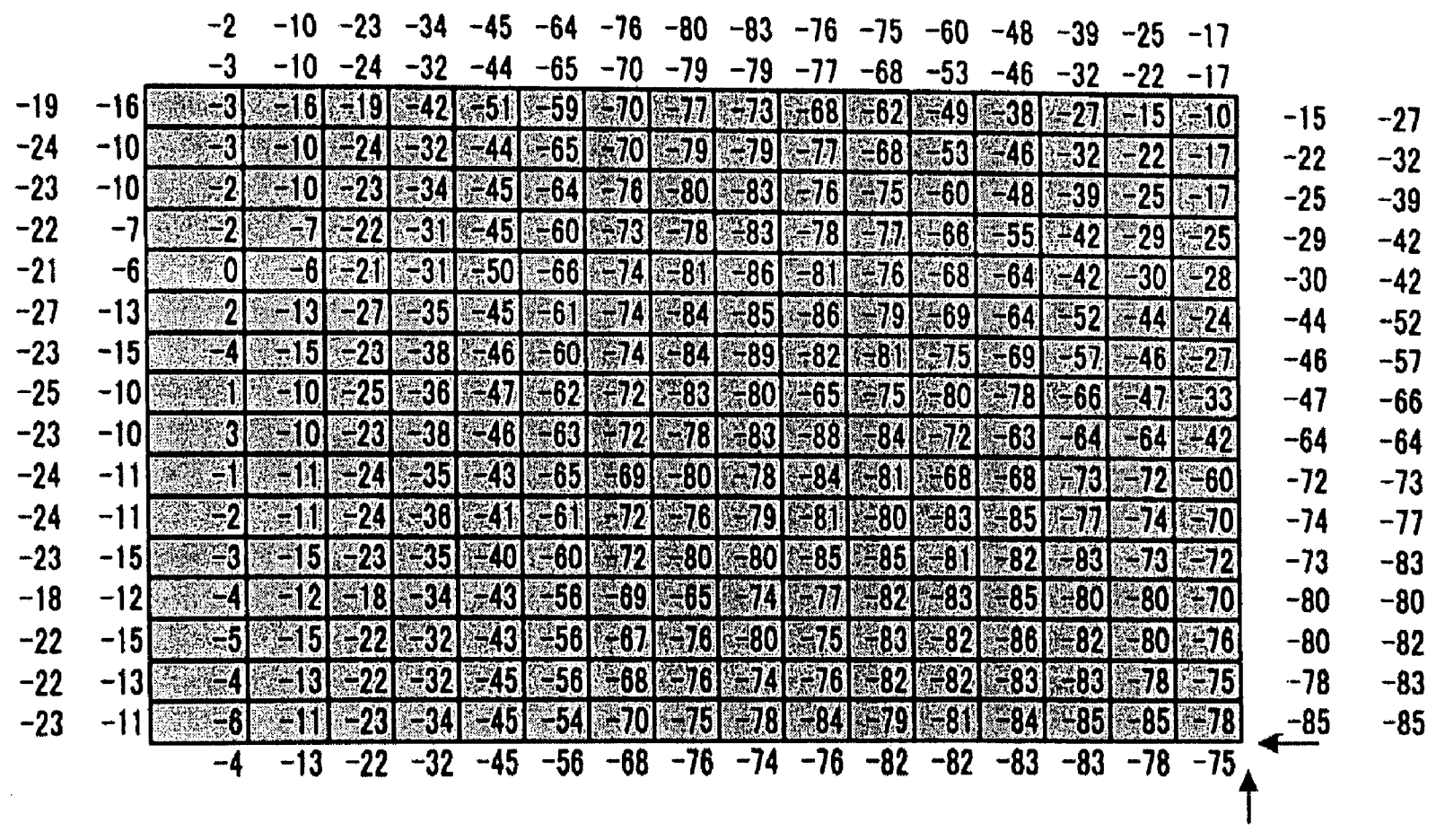

FIGS. 11A through 11G are diagrams showing pixel values and wavelet coefficient values when the decomposition level is 1, for the case where a lossless (no-loss) (5, 3) independent-function wavelet transform is carried out with respect to a square tile made up of 16×16 pixels. In FIG. 11A, the numerals arranged outside the tile indicate the pixel values extended by the mirroring method.

A vertical direction highpass filter operation shown in FIG. 11B and a vertical direction lowpass filter operation shown in FIG. 11C are carried out with respect to the tile having the pixel values shown in FIG. 11A. Next, a horizontal direction lowpass filter operation and a horizontal direction highpass filter operation are carried out with respect to the result of the vertical direction lowpass filter operation shown in FIG. 11C, so as to obtain the LL component shown in FIG. 11D and the HL component shown in FIG. 11E of the wavelet coefficients at the decomposition level 1. On the other hand, a horizontal direction lowpass filter operation and a horizontal direction highpass filter operation are carried out with respect to the result of the vertical direction highpass filter operation shown in FIG. 11B, so as to obtain the LH component shown in FIG. 11F and the HH component shown in FIG. 11G of the wavelet coefficients at the decomposition level 1.

FIGS. 12A through 12C are diagrams showing examples of pixel values of a square tile made up of 16×16 pixels which is obtained by carrying out an inverse transform from the wavelet coefficients derived in FIGS. 11A through 11G.

FIG. 12A shows the coefficient values of each of the subbands of the decomposition level 1, which are obtained by the forward wavelet transform described above in conjunction with FIGS. 11A through 11G, and are rearranged by interleaving.

FIG. 12B shows the result which is obtained by carrying out the horizontal direction inverse transform filter operation on the odd number pixels, followed by the horizontal direction inverse transform filter operation on the even numbered pixels, with respect to the coefficient values shown in FIG. 12A, and FIG. 12C shows the result which is obtained by carrying out the vertical direction inverse transform filter operation on the even number pixels, followed by the vertical direction inverse transform filter operation on the odd numbered pixels.

FIG. 13 is a diagram showing an example of the comparison result which is obtained by comparing the pixel values of the original image shown in FIG. 11A and the pixel values which are obtained by carrying out the lossless transform and inverse transform by the pixel expansion according to the mirroring method shown in FIG. 12C. In the case shown in FIG. 13, the error is indicated by a difference between the individual pixels. It may be seen from FIG. 13 that, the pixel values after the compression and expansion process perfectly match the pixel values of the original image, for all of the tiles.

Figure 14A:
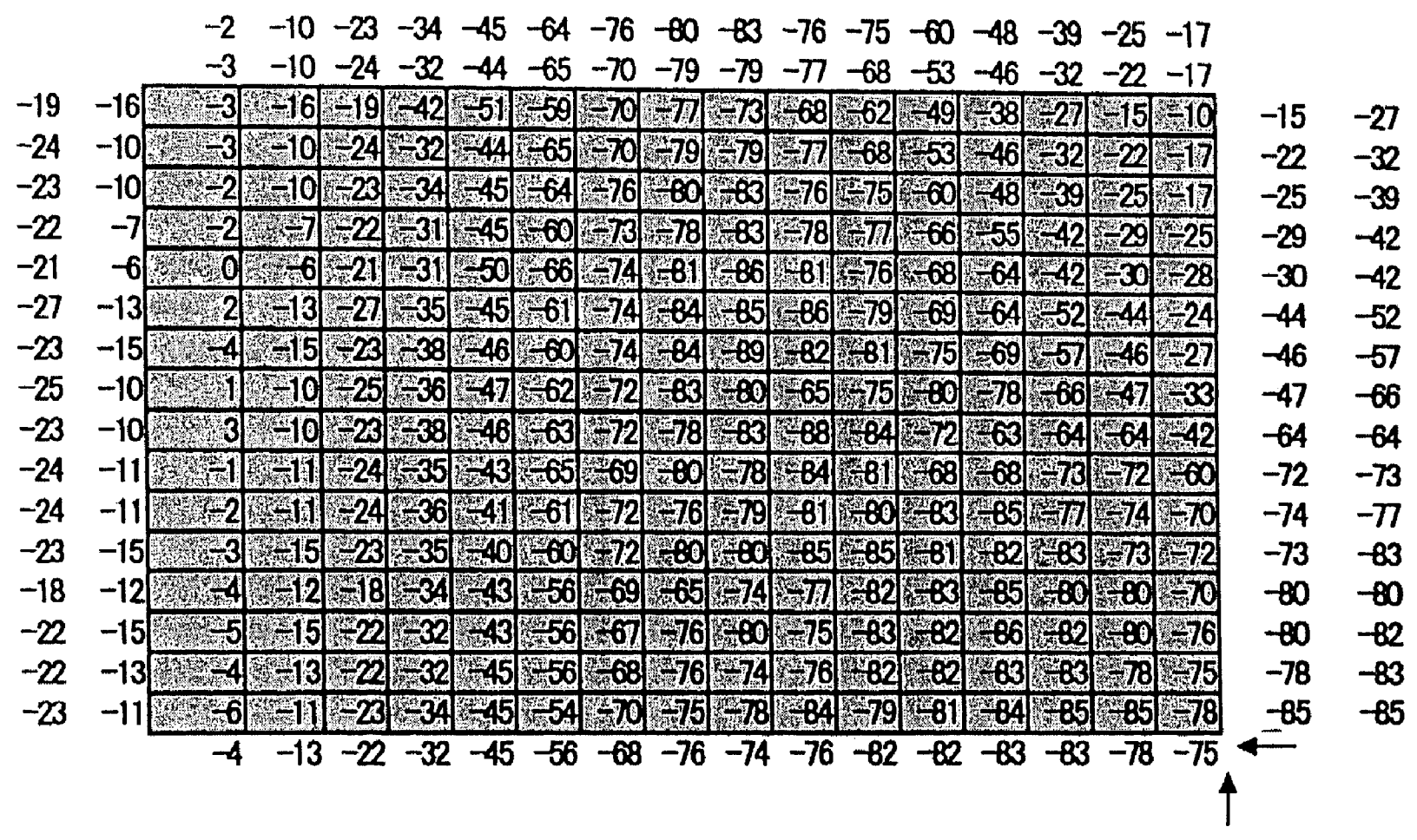

FIGS. 14A through 14G are diagrams showing pixel values and wavelet coefficient values when the decomposition level is 1, for the case where a lossy (5, 3) independent-function wavelet transform is carried out with respect to a square tile made up of 16×16 pixels. In FIG. 14A, the numerals arranged outside the tile indicate the pixel values extended by the mirroring method. However, in order to facilitate comparison with FIG. 11A, FIG. 14A shows the result of the quantization and inverse quantization.

A vertical direction highpass filter operation shown in FIG. 14B and a vertical direction lowpass filter operation shown in FIG. 14C are carried out with respect to the tile having the pixel values shown in FIG. 14A. Next, a horizontal direction lowpass filter operation and a horizontal direction highpass filter operation are carried out with respect to the result of the vertical direction lowpass filter operation shown in FIG. 14C, so as to obtain the LL component shown in FIG. 14D and the HL component shown in FIG. 14E of the wavelet coefficients at the decomposition level 1. On the other hand, a horizontal direction lowpass filter operation and a horizontal direction highpass filter operation are carried out with respect to the result of the vertical direction highpass filter operation shown in FIG. 14B, so as to obtain the LH component shown in FIG. 14F and the HH component shown in FIG. 14G of the wavelet coefficients at the decomposition level 1. In this particular example, the quantization step size is 4 (LL component)/32 (HL & HH components)/64 (HH component). The wavelet coefficient values after the quantization are obtained by adding the original positive or negative sign to the floor function of the value obtained by dividing the coefficient of each subband by the quantization step size.

FIGS. 15A through 15C are diagrams showing examples of pixel values of a square tile made up of 16×16 pixels which is obtained by carrying out an inverse transform from the wavelet coefficients after the quantization and inverse quantization and are derived in FIGS. 14A through 14G. The forward and reverse wavelet transforms are similar to those for the lossless independent-function wavelet transform, and a detailed description thereof will be omitted.

FIG. 16 is a diagram showing an example of the comparison result which is obtained by comparing the pixel values of the original image shown in FIG. 14A and the pixel values which are obtained by carrying out the lossy transform and inverse transform by the pixel expansion according to the mirroring method shown in FIG. 15C. In this example, unlike the case where the lossless transform and inverse transform (quantization step size 1) are carried out, errors are generated. Large errors are seen particularly near the tile boundary. This is the cause of the tile boundary becoming visually conspicuous at the low bit rate.

Conventionally, in order to eliminate the problems described above, a proposal has been made to use the image data of the adjacent tiles, that is, to mutually overlap the boundaries of the adjacent tiles (although the adjacent tile boundaries should not overlap according to the baseline system of the JPEG2000). In addition, the tile boundary which becomes visually conspicuous as a result is subjected to a so-called post-filtering process or the like by employing completely different image processing algorithms for each to make the tile boundary less conspicuous.

SUMMARY OF THE INVENTION

Accordingly, it is a general object of the present invention to provide a novel and useful image compression method and apparatus, image expansion method and apparatus, and computer-readable storage medium, in which the problems described above are eliminated.

Still another object of the present invention, is to provide an image compression method and apparatus, image expansion method and apparatus, and a computer-readable storage medium, which employ a method of eliminating the above described problems different from the conventional methods which overlap the tiles or carry out the post-filtering process, and greatly suppress the tile boundary from becoming conspicuous when the image data which is obtained by subjecting the original image to a lossy compression under a high compression rate condition is decoded back into the original image.

A further object of the present invention is to provide an image compression apparatus comprising a tile specifying section specifying rectangular tiles having an arbitrary size with respect to an image; an image dividing section dividing the image using the specified rectangular tiles; a bit-plane decomposing section decomposing each of the specified tiles dividing the image into bit-planes; a bit-plane ordering section ordering the bit-planes decomposing each of the specified tiles depending on a coding sequence; a layer forming section forming layers by the ordered bit-planes; and a suppressing section suppressing a quantization rate of a region low relative to other regions of the image. According to the image compression apparatus of the present invention, it is possible to make the tile boundary inconspicuous so that the image quality deterioration is suppressed at the tile boundary, even if the compression rate is high.

The suppressing section may suppress the quantization rate of a region in a vicinity of a tile boundary, by shifting a bit-plane of the region with respect to a bit-plane of a region separated from the tile boundary and having a relatively higher quantization rate, so as to be included in a higher layer of the layers formed by the ordered bit-planes.

The suppressing section may select the region in which the quantization rate is suppressed by a region of interest (ROI) process.

The suppressing section may hold coefficient values of the region in which the quantization rate is suppressed prior to quantization.

The code blocks may constitute a minimum unit of a collection of bit-planes restructured in a layer different from that of bit-planes in a region which is separated from a tile boundary and has a quantization rate high relative to others, and at least one code block may be non-adjacent to an outer edge of a tile. Alternatively, precincts may constitute a minimum unit of a collection of bit-planes restructured in a layer different from that of bit-planes in a region which is separated from a tile boundary and has a quantization rate high relative to others, and at least one precinct may be non-adjacent to an outer edge of a tile. In either case, the mutual relationship of the code block and the precinct with respect to the tile is prescribed in the coefficient domain and the spatial domain, when the bit-planes are restructured into a different layer. Hence, the distortion at the tile boundary can effectively be suppressed under various conditions, such as the size of the original image (VGA, HDTV, etc.), the performance of the processing apparatus (memory capacity, processing speed, etc.), and the specification required of the application (processing speed, image quality, cost, etc.).

Another object of the present invention is to provide an image compression method comprising a tile specifying step specifying rectangular tiles having an arbitrary size with respect to an image; an image dividing step dividing the image using the specified rectangular tiles; a bit-plane decomposing step decomposing each of the specified tiles dividing the image into bit-planes; a bit-plane ordering step ordering the bit-planes decomposing each of the specified tiles depending on a coding sequence; a layer forming step forming layers by the ordered bit-planes; and a suppressing step suppressing a quantization rate of a region low relative to other regions of the image. According to the image compression method of the present invention, it is possible to make the tile boundary inconspicuous so that the image quality deterioration is suppressed at the tile boundary, even if the compression rate is high.

Still another object of the present invention is to provide a computer-readable storage medium which stores a program for causing a computer to carry out an image compression, where the program comprises a tile specifying procedure causing the computer to specify rectangular tiles having an arbitrary size with respect to an image; an image dividing procedure causing the computer to divide the image using the specified rectangular tiles; a bit-plane decomposing procedure causing the computer to decompose each of the specified tiles dividing the image into bit-planes; a bit-plane ordering procedure causing the computer to order the bit-planes decomposing each of the specified tiles depending on a coding sequence; a layer forming procedure causing the computer to form layers by the ordered bit-planes; and a suppressing procedure causing the computer to suppress a quantization rate of a region low relative to other regions of the image. According to the computer-readable storage medium of the present invention, it is possible to make the tile boundary inconspicuous so that the image quality deterioration is suppressed at the tile boundary, even if the compression rate is high.

A further object of the present invention is to provide an image expansion apparatus for expanding compressed image data obtained by specifying rectangular tiles having an arbitrary size with respect to an image, dividing the image using the specified rectangular tiles, decomposing each of the specified tiles dividing the image into bit-planes, ordering the bit-planes decomposing each of the specified tiles depending on a coding sequence, forming layers by the ordered bit-planes, and a suppressing step suppressing a quantization rate of a region low relative to other regions of the image, comprising an input section receiving the compressed image data; and an expanding section expanding the compressed image data based on information related to the specified tiles.

Another object of the present invention is to provide an image expansion method for expanding compressed image data obtained by specifying rectangular tiles having an arbitrary size with respect to an image, dividing the image using the specified rectangular tiles, decomposing each of the specified tiles dividing the image into bit-planes, ordering the bit-planes decomposing each of the specified tiles depending on a coding sequence, forming layers by the ordered bit-planes, and a suppressing step suppressing a quantization rate of a region low relative to other regions of the image, comprising an input step receiving the compressed image data; and an expanding step expanding the compressed image data based on information related to the specified tiles.

Still another object of the present invention is to provide a computer-readable storage medium which stores a program for causing a computer to carry out an image expansion with respect to compressed image data which is obtained by specifying rectangular tiles having an arbitrary size with respect to an image, dividing the image using the specified rectangular tiles, decomposing each of the specified tiles dividing the image into bit-planes, ordering the bit-planes decomposing each of the specified tiles depending on a coding sequence, forming layers by the ordered bit-planes, and a suppressing step suppressing a quantization rate of a region low relative to other regions of the image, where the program comprises an input procedure causing the computer to receive the compressed image data; and an expanding procedure causing the computer to expand the compressed image data based on information related to the specified tiles.

A further object of the present invention is to provide an image compression apparatus comprising means for dividing an original image into a plurality of tiles; means for interpolating data in a periphery of each of the tiles and carrying out a wavelet transform; means for quantizing transformed wavelet coefficient values to compress image data of the original image; and reducing means for reducing a quantization rate of the wavelet coefficient values in a region in a vicinity of a tile boundary to a value lower than that of other regions. According to the image compression apparatus of the present invention, it is possible to eliminate the discontinuity at the tile boundary.

Another object of the present invention is to provide an image compression method comprising the steps of dividing an original image into a plurality of tiles; interpolating data in a periphery of each of the tiles and carrying out a wavelet transform; quantizing transformed wavelet coefficient values to compress image data of the original image; and reducing a quantization rate of the wavelet coefficient values in a region in a vicinity of a tile boundary to a value lower than that of other regions. According to the image compression method of the present invention, it is possible to eliminate the discontinuity at the tile boundary.

Still another object of the present invention is to provide a computer-readable storage medium which stores a program for causing a computer to carry out an image compression, where the program comprises a procedure causing the computer to divide an original image into a plurality of tiles; a procedure causing the computer to interpolate data in a periphery of each of the tiles and carrying out a wavelet transform; a procedure causing the computer to quantize transformed wavelet coefficient values to compress image data of the original image; and a procedure causing the computer to reduce a quantization rate of the wavelet coefficient values in a region in a vicinity of a tile boundary to a value lower than that of other regions. According to the computer-readable storage medium of the present invention, it is possible to eliminate the discontinuity at the tile boundary.

Other objects and further features of the present invention will be apparent from the following detailed description when read in conjunction with the accompanying drawings.

BRIEF DESCRIPTION OF THE DRAWINGS

FIGS. 11A through 11G are diagrams showing pixel values and wavelet coefficient values when the decomposition level is 1, for the case where a lossless (no-loss) (5, 3) independent-function wavelet transform is carried out with respect to a square tile made up of 16×16 pixels;

FIGS. 12A through 12C are diagrams showing examples of pixel values of a square tile made up of 16×16 pixels which is obtained by carrying out an inverse transform from the wavelet coefficients derived in FIGS. 11A through 11G;

FIG. 13 is a diagram showing an example of the comparison result which is obtained by comparing the pixel values of the original image shown in FIG. 11A and the pixel values which are obtained by carrying out the lossless transform and inverse transform by the pixel expansion according to the mirroring method shown in FIG. 12C;

FIGS. 14A through 14G are diagrams showing pixel values and wavelet coefficient values when the decomposition level is 1, for the case where a lossy (5, 3) independent-function wavelet transform is carried out with respect to a square tile made up of 16×16 pixels;

FIGS. 15A through 15C are diagrams showing examples of pixel values of a square tile made up of 16×16 pixels which is obtained by carrying out an inverse transform from the wavelet coefficients after the quantization and inverse quantization and are derived in FIGS. 14A through 14G;

FIGS. 20A through 20D are diagrams showing the relationship of the precinct of each subband and the code block for the decomposition level 1, with respect to the tiles shown in FIG. 18;

DESCRIPTION OF THE PREFERRED EMBODIMENTS

[First Embodiment]

Figure 1:
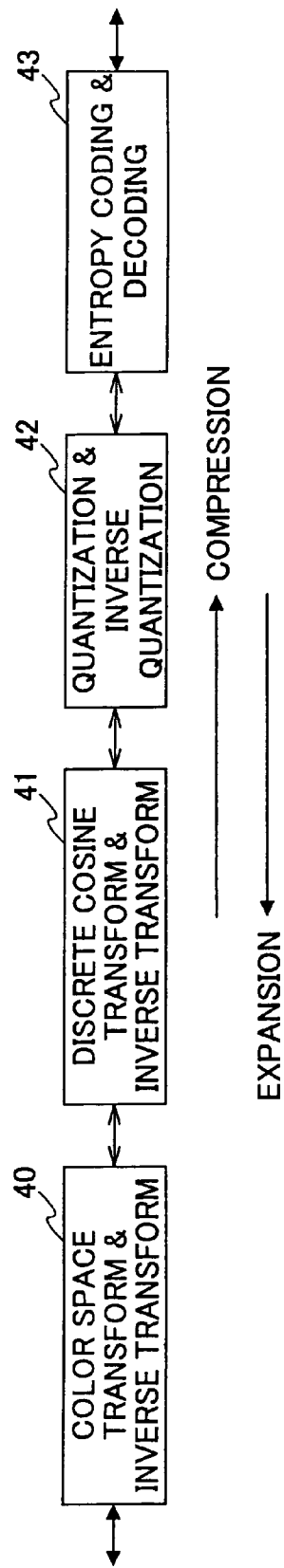
FIG. 1 is a system block diagram for explaining the operating principle of the JPEG algorithm.
Figure 2:
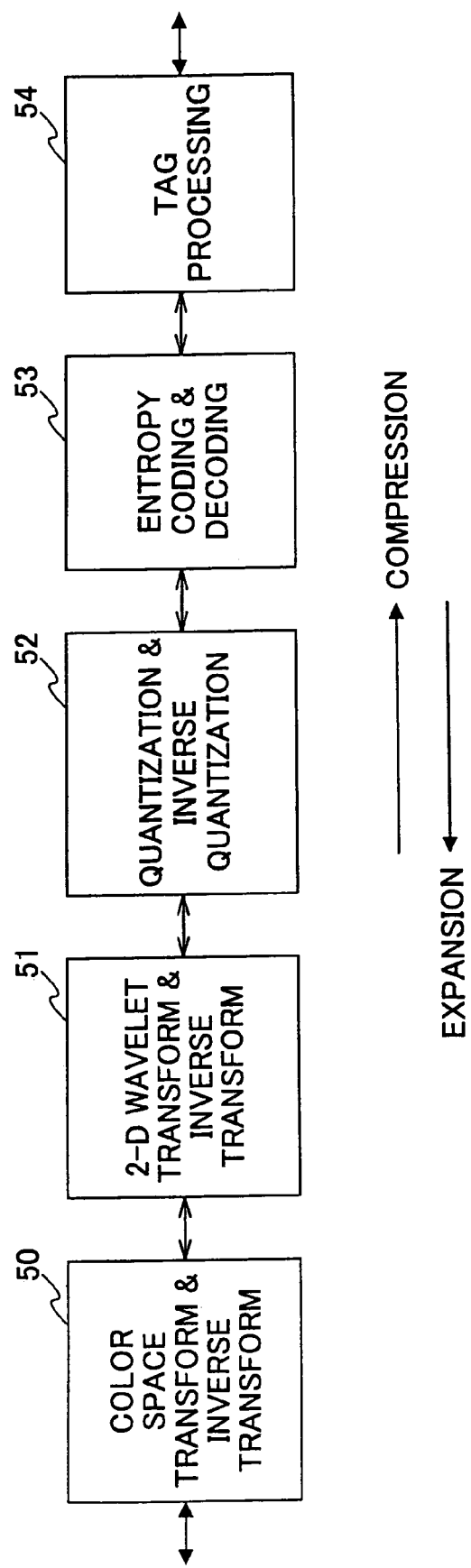
FIG. 2 is a system block diagram for explaining the operating principle of the JPEG2000 algorithm.
Figure 3:
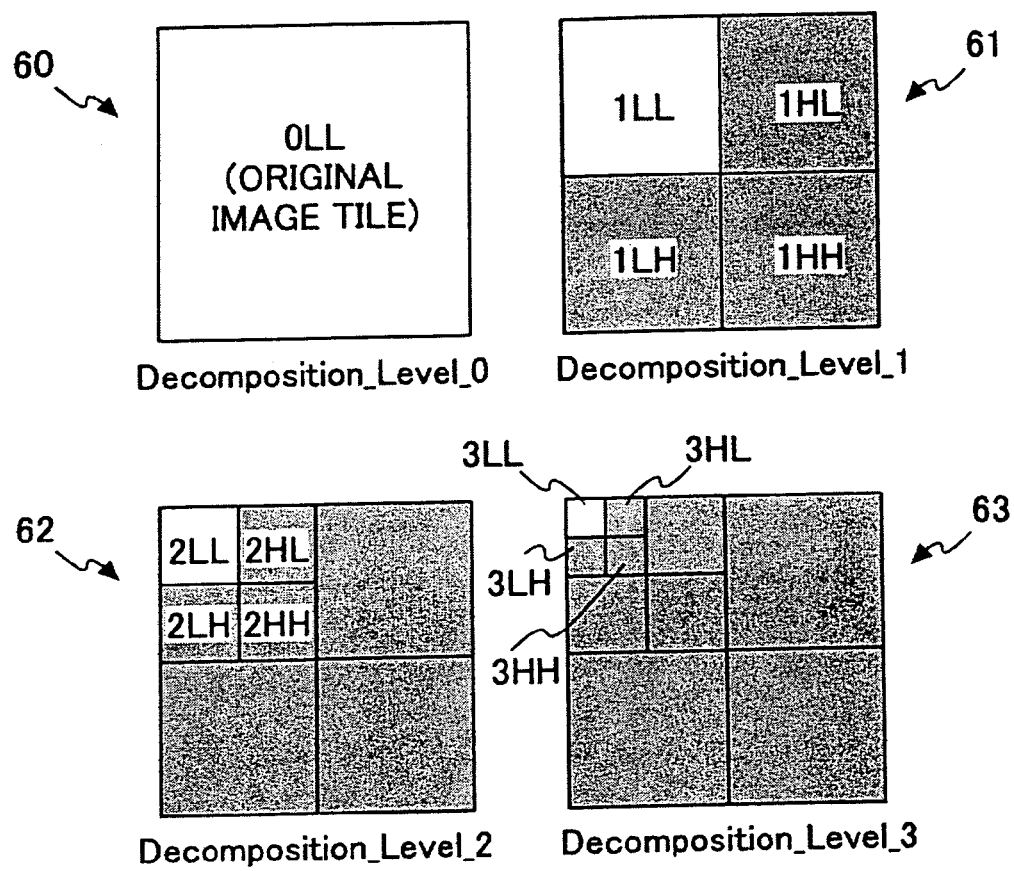
FIG. 3 is a diagram showing an example of a subband at each decomposition level for a case where the decomposition level is 3.
Figure 4:
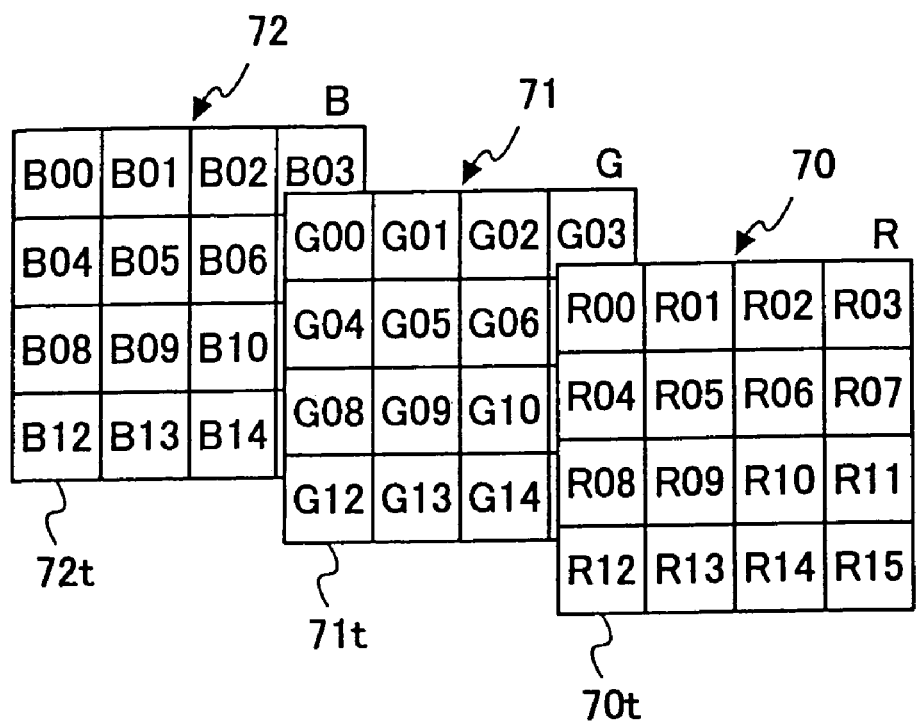
FIG. 4 is a diagram showing an example of each component of a color image divided into tiles.
Figure 5:
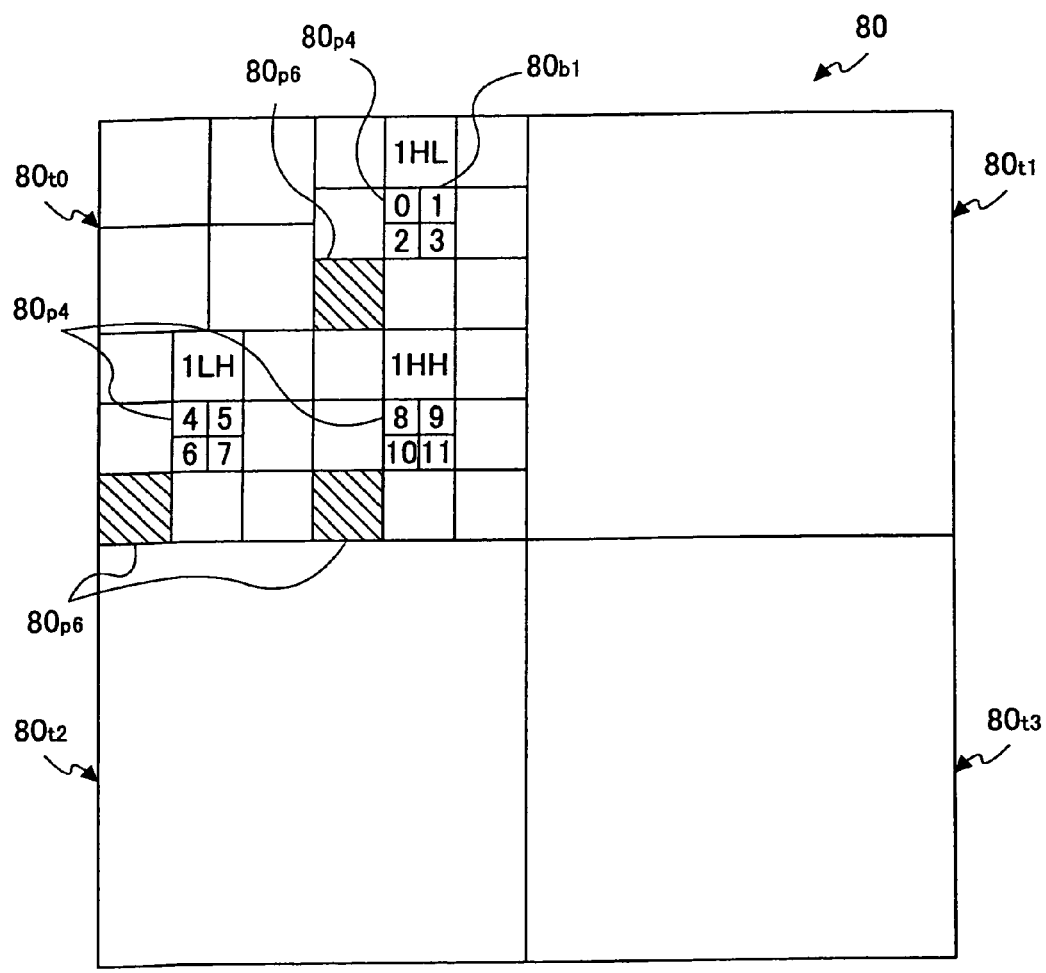
FIG. 5 is a diagram for explaining one example of the relationship of the precinct and the code block.
Figure 6:
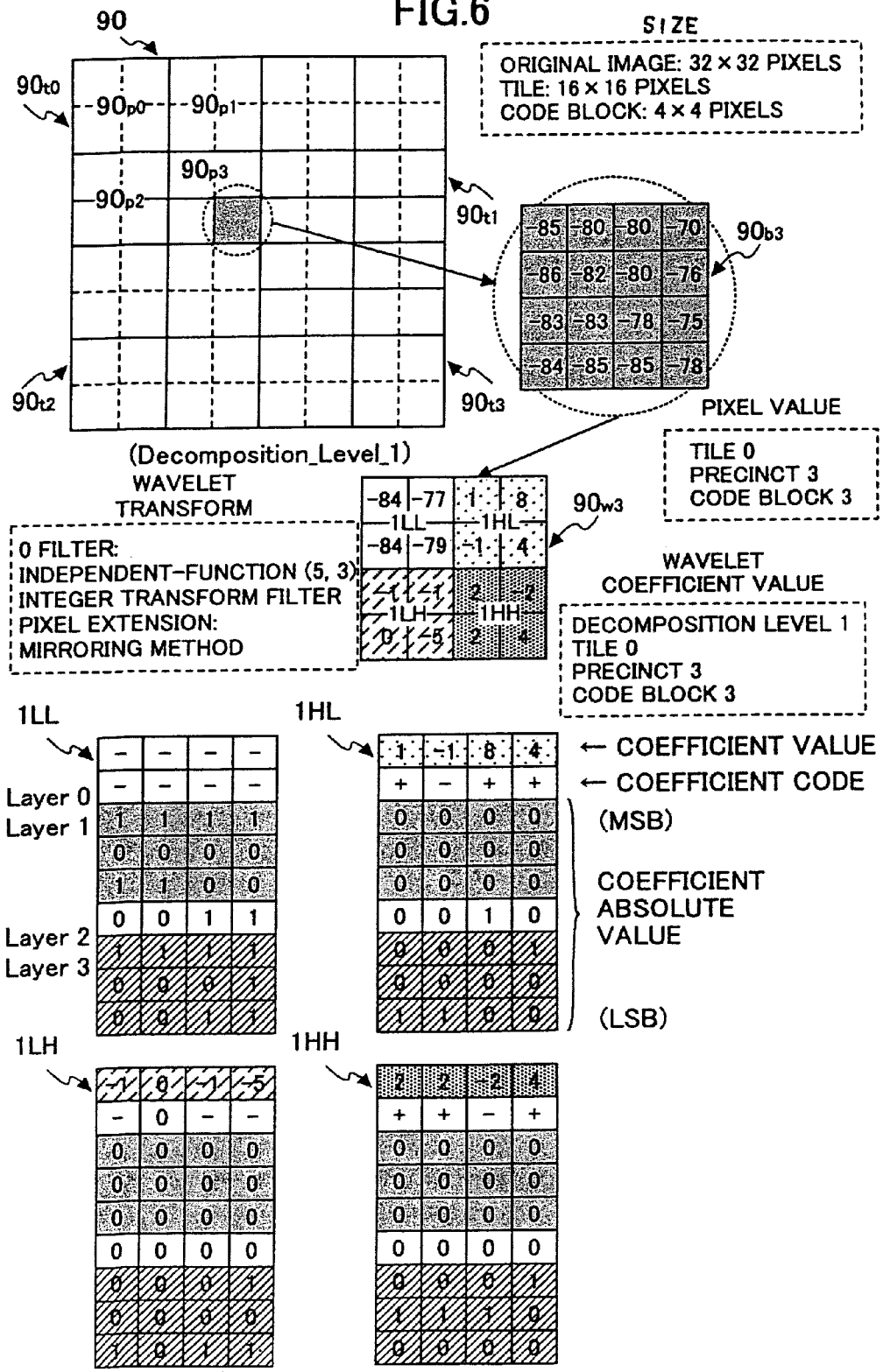
FIG. 6 is a diagram for explaining the procedure for ordering the bit-planes.
Figure 7:
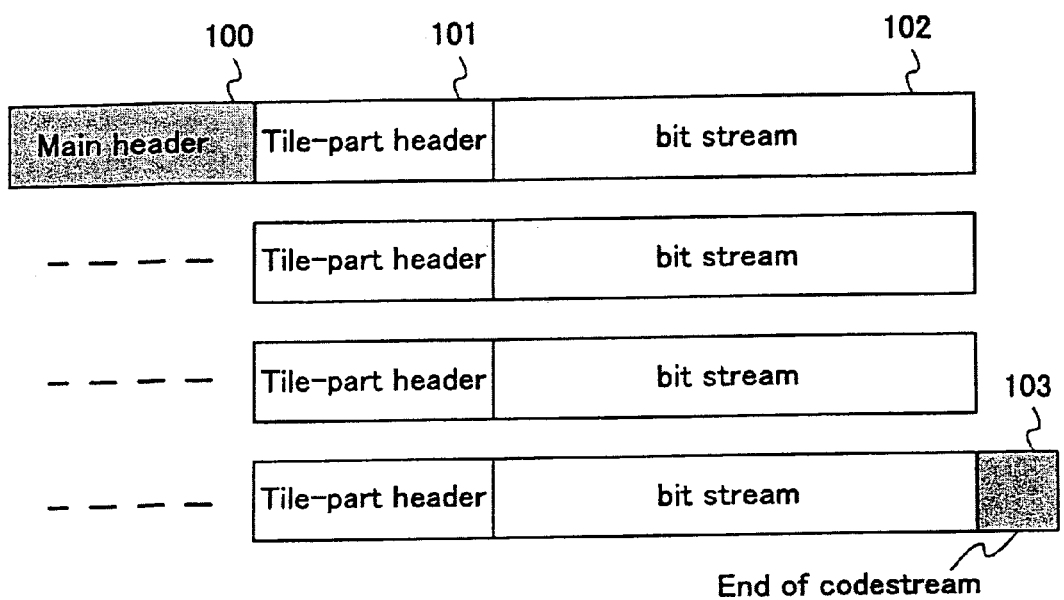
FIG. 7 is a simplified diagram showing an example of the code stream structure.
Figure 8:
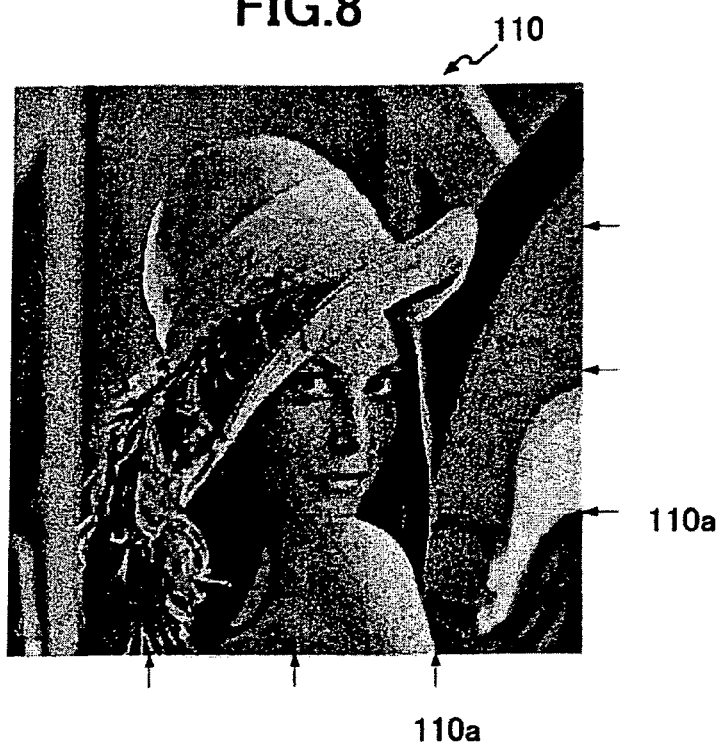
FIG. 8 is a diagram showing an example of an image which is obtained by compressing the original image to $1/75$ by a lossless (no-loss) compression and thereafter expanding the compressed image.
Figure 9:
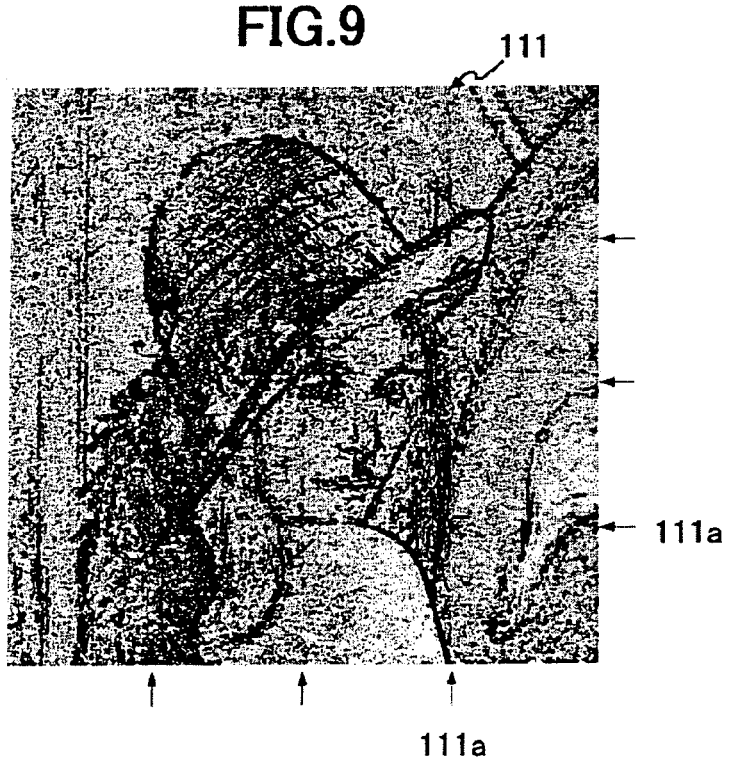
FIG. 9 is a diagram showing an example of an error image between the original image and the image after expansion.
Figure 10:
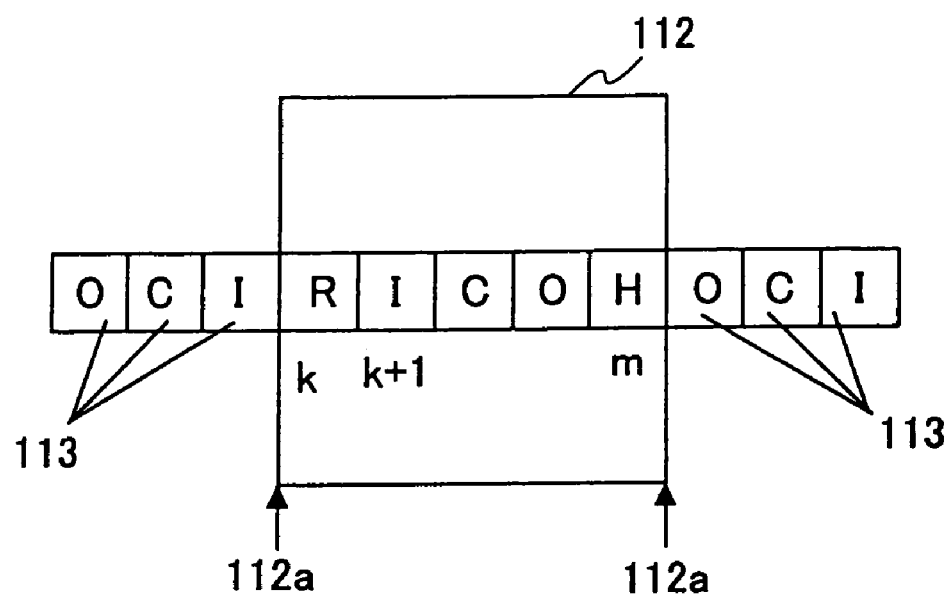
FIG. 10 is a diagram showing a pixel expansion using the mirroring method.
Figure 16:
FIG. 16 is a diagram showing an example of the comparison result which is obtained by comparing the pixel values of the original image shown in FIG. 14A and the pixel values which are obtained by carrying out the lossy transform and inverse transform by the pixel expansion according to the mirroring method shown in FIG. 15C.
Figure 17:
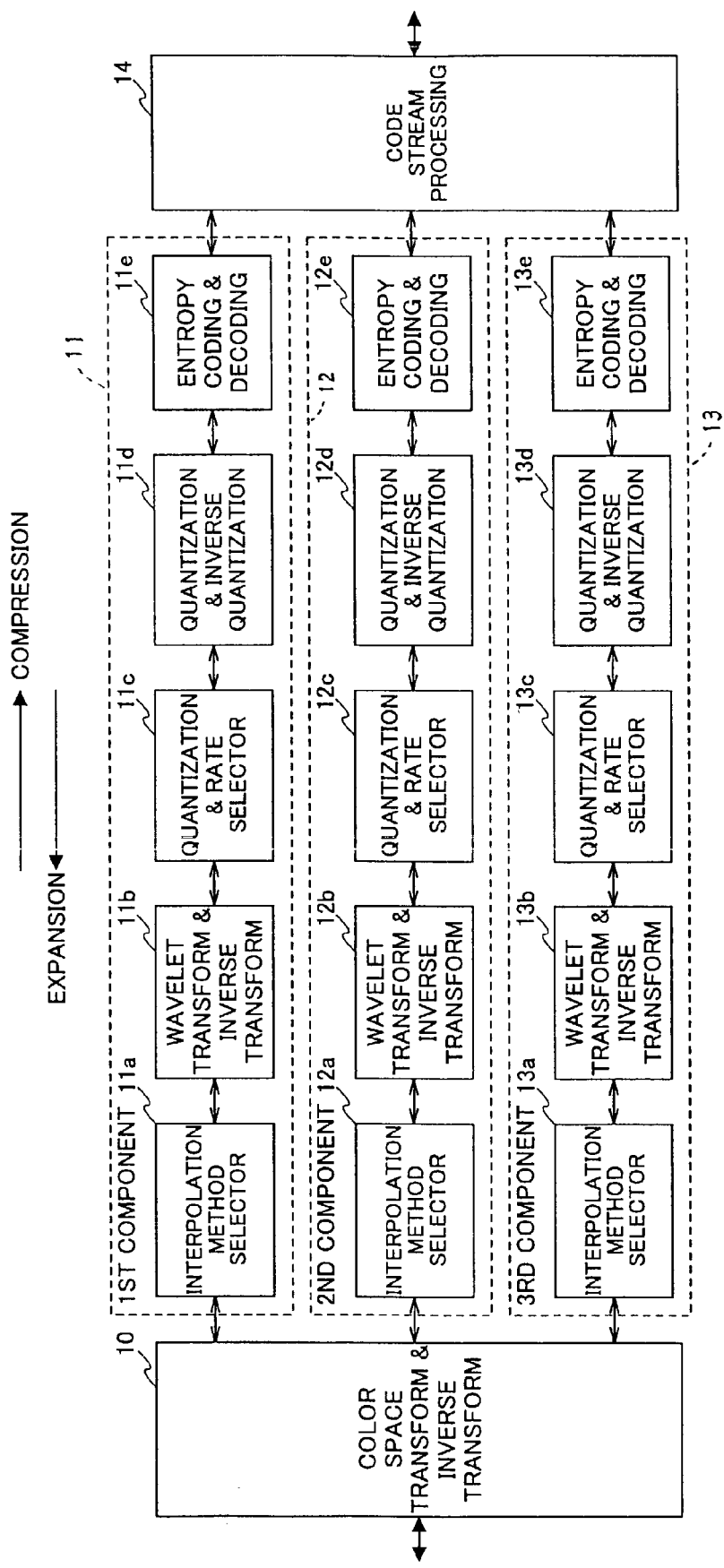
FIG. 17 is a system block diagram showing a first embodiment of an image compression and/or expansion apparatus according to the present invention.

FIG. 17 is a system block diagram showing a first embodiment of an image compression and/or expansion apparatus according to the present invention. The image compression and/or expansion apparatus shown in FIG. 17 includes a color space transform and inverse transform section 10, a first component 11, a second component 12, a third component 13, and a code stream processing section 14. The first component 11 includes an interpolation method selector 11a, a wavelet transform and inverse transform section 11b, a quantization rate selector 11c, a quantization and inverse quantization section 11d, and an entropy coding and decoding section 11e. Similarly, the second component 12 includes an interpolation method selector 12a, a wavelet transform and inverse transform section 12b, a quantization rate selector 12c, a quantization and inverse quantization section 12d, and an entropy coding and decoding section 12e. In addition, the third component 13 includes an interpolation method selector 13a, a wavelet transform and inverse transform section 13b, a quantization rate selector 13c, a quantization and inverse quantization section 13d, and an entropy coding and decoding section 13e.

In the image compression and/or expansion apparatus shown in FIG. 17, only one transform and inverse transform section is shown for each processing block so as to cope with the image compression and expansion, but it is of course possible to provide a transform section and an inverse transform section separately from each other.

The image compression and/or expansion apparatus shown in FIG. 17 is intended for processing a still image. The processes of the first, second and third components 11, 12 and 13 are carried out in parallel. The color space in this case is RGB or YUV.

A description will be given of the first component 11 for the case where the compression is carried out. In the interpolation method selector 11a, the interpolation method of obtaining the wavelet coefficient values and pixel values extended outside the tile boundary. The interpolation method may be selected from the method using the mirroring method, ecentrosymmetric interpolation method, method using the actual adjacent tile pixel values or the like. It is assumed for the sake of convenience that the mirroring method is used in this particular case. Next, the wavelet transform and inverse transform section 11b carries out a wavelet transform with respect to the original image. The quantization rate selector 11c creates a new layer with respect to the bit-plane of the code block adjacent to the tile boundary, of the wavelet coefficient values obtained by the mirroring method. More particularly, more younger layer numbers such as layers 0, 1, 2, . . . are reassigned to the bit-plane, so that the data will not be discarded even when the truncation is made.

Figure 18:
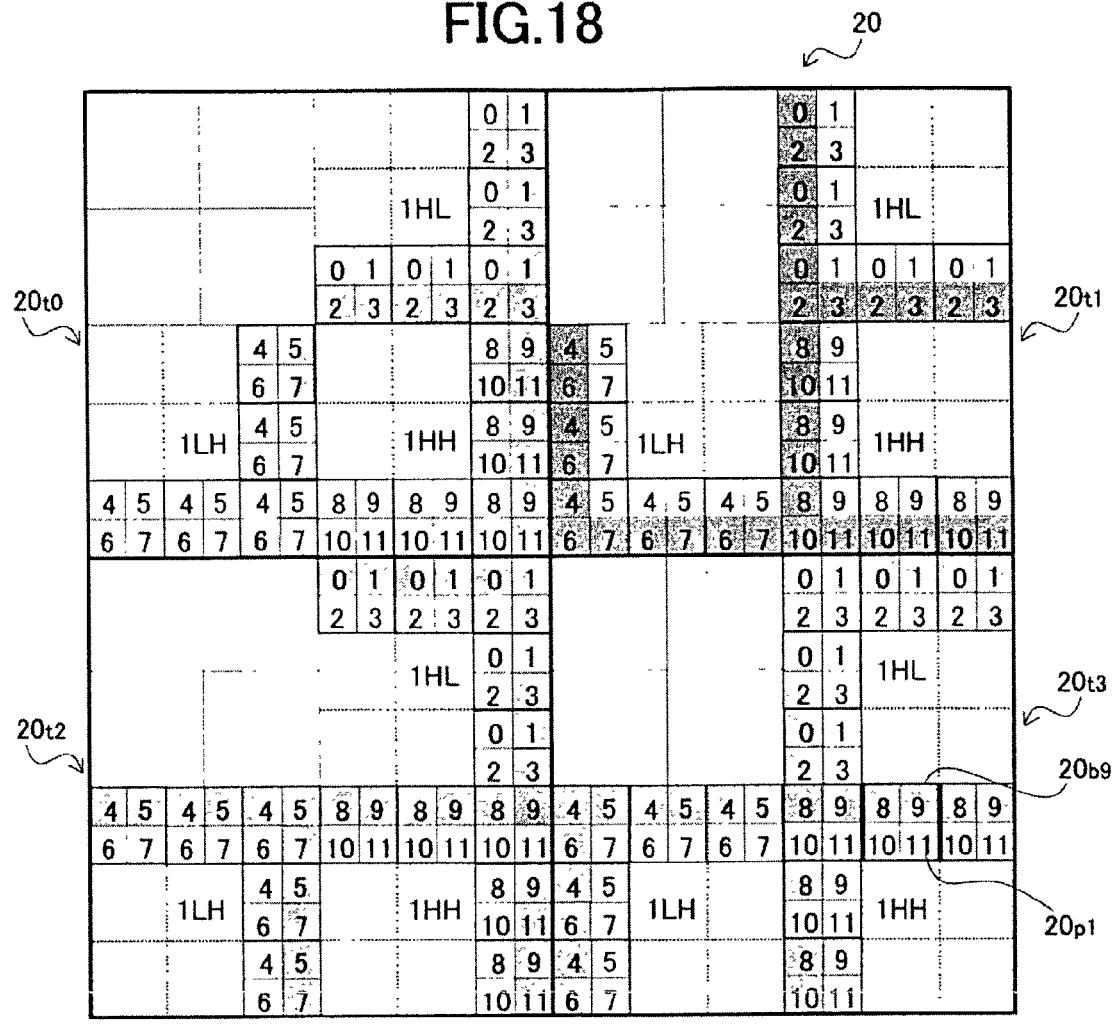
FIG. 18 is a diagram for explaining the wavelet transform with respect to the original image made up of 4 tiles.
Figure 19:
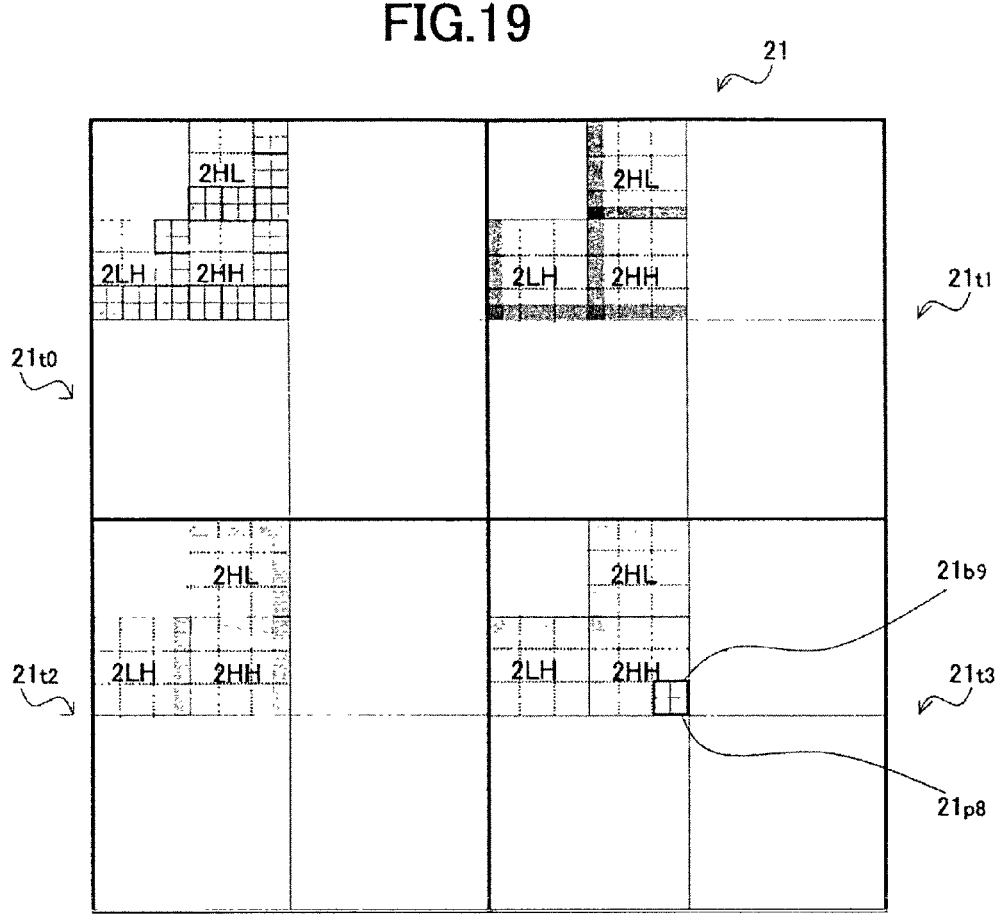
FIG. 19 is a diagram for explaining the wavelet transform with respect to the original image made up of 4 tiles.

FIGS. 18 and 19 are diagrams for explaining the wavelet transform with respect to the original image made up of 4 tiles. In FIG. 18, an original image 20 is divided into 4 tiles. $20_{t0}$ indicates the tile 0, $20_{t1}$ indicates the tile 1, $20_{t2}$ indicates the tile 2, and $20_{t3}$ indicates the tile 3. For example, the tile $20_{t3}$ shown in FIG. 18 includes a precinct $20_{p1}$ indicating the 1st precinct of each of 1HL, 1LH and 1HH, and the precinct $20_{p1}$ includes a code block $20_{b9}$ indicating a 9th code block. In FIG. 19, an original image 21 is divided into 4 tiles. $21_{t0}$ indicates the tile 0, $21_{t1}$ indicates the tile 1, $21_{t2}$ indicates the tile 2, and $21_{t3}$ indicates the tile 3. For example, the tile $21_{t3}$ shown in FIG. 19 includes a precinct $21_{p8}$ indicating the 8th precinct of each of 2HL, 2LH and 2HH, and the precinct $21_{p8}$ includes a code block $21_{b9}$ indicating a 9th code block. Although the top left ends of the tile 0 and the original image match in this particular case, it is of course possible to have an offset therebetween.

FIG. 18 shows the relationship between the precinct and the code block for the decomposition level 1, and FIG. 19 shows the relationship between the precinct and the code block for the decomposition level 2. In this case, the number of tiles is 4, the number of precincts is 9, and the number of code blocks is 12. The size of the precinct and the code block can be specified for each decomposition. For the sake of convenience, the number of precincts and the number of code blocks for the decomposition level 1 are the same as those for the decomposition level 2. In FIGS. 18 and 19, shaded portions indicate the code blocks of each subband of HL, LH and HH adjacent to the tile boundary, which become the target of the layer restructuring which will be described later.

Figure 20A:
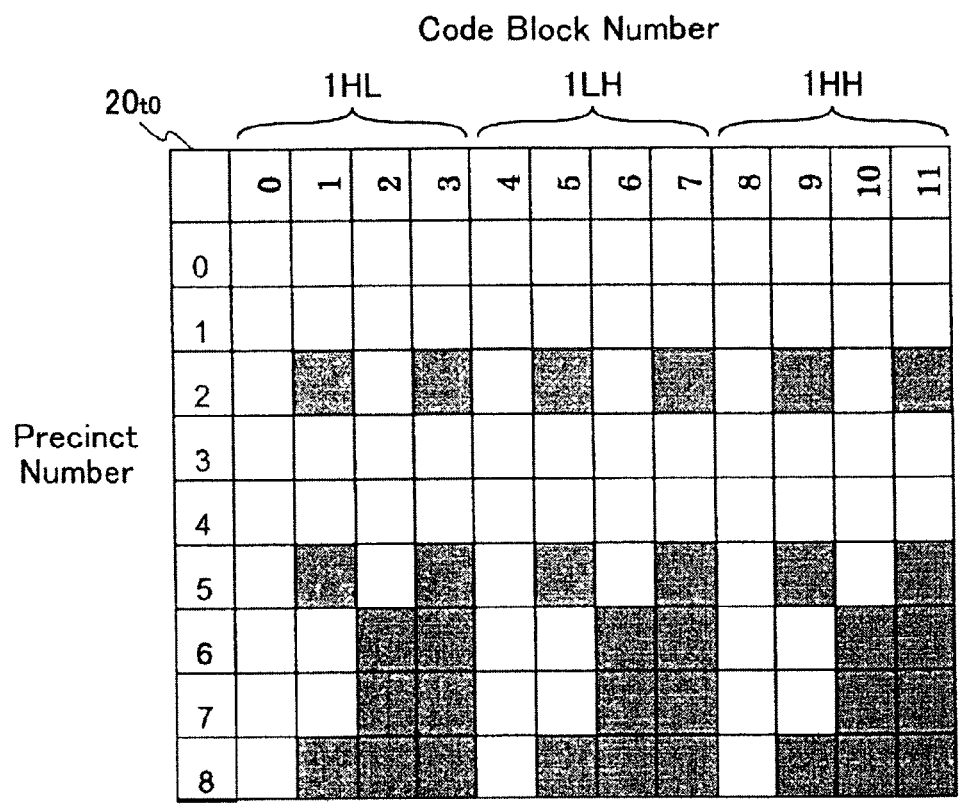
Figure 20B:
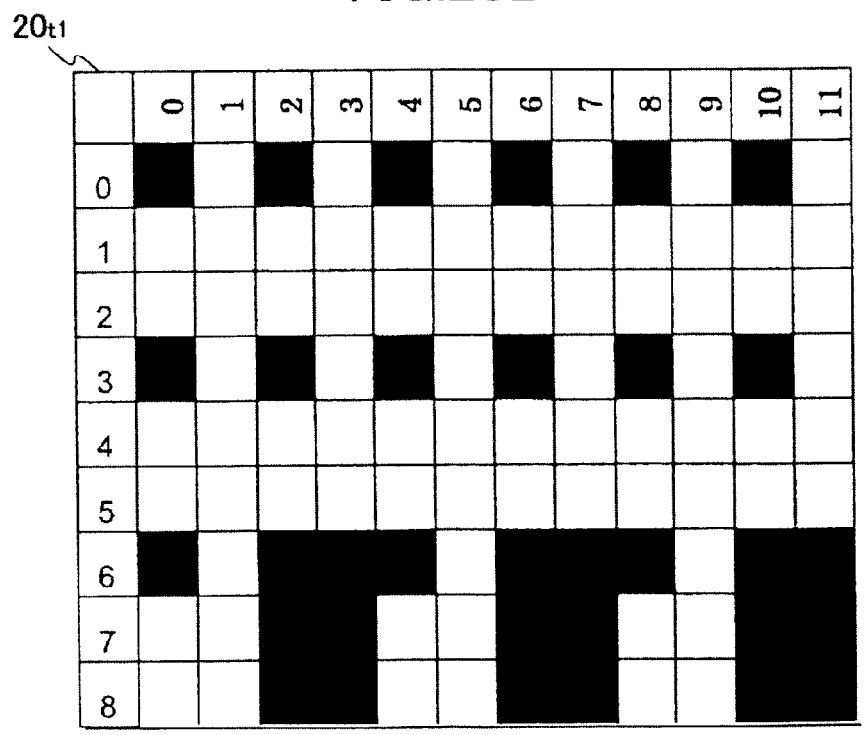
Figures 20C, 20D:
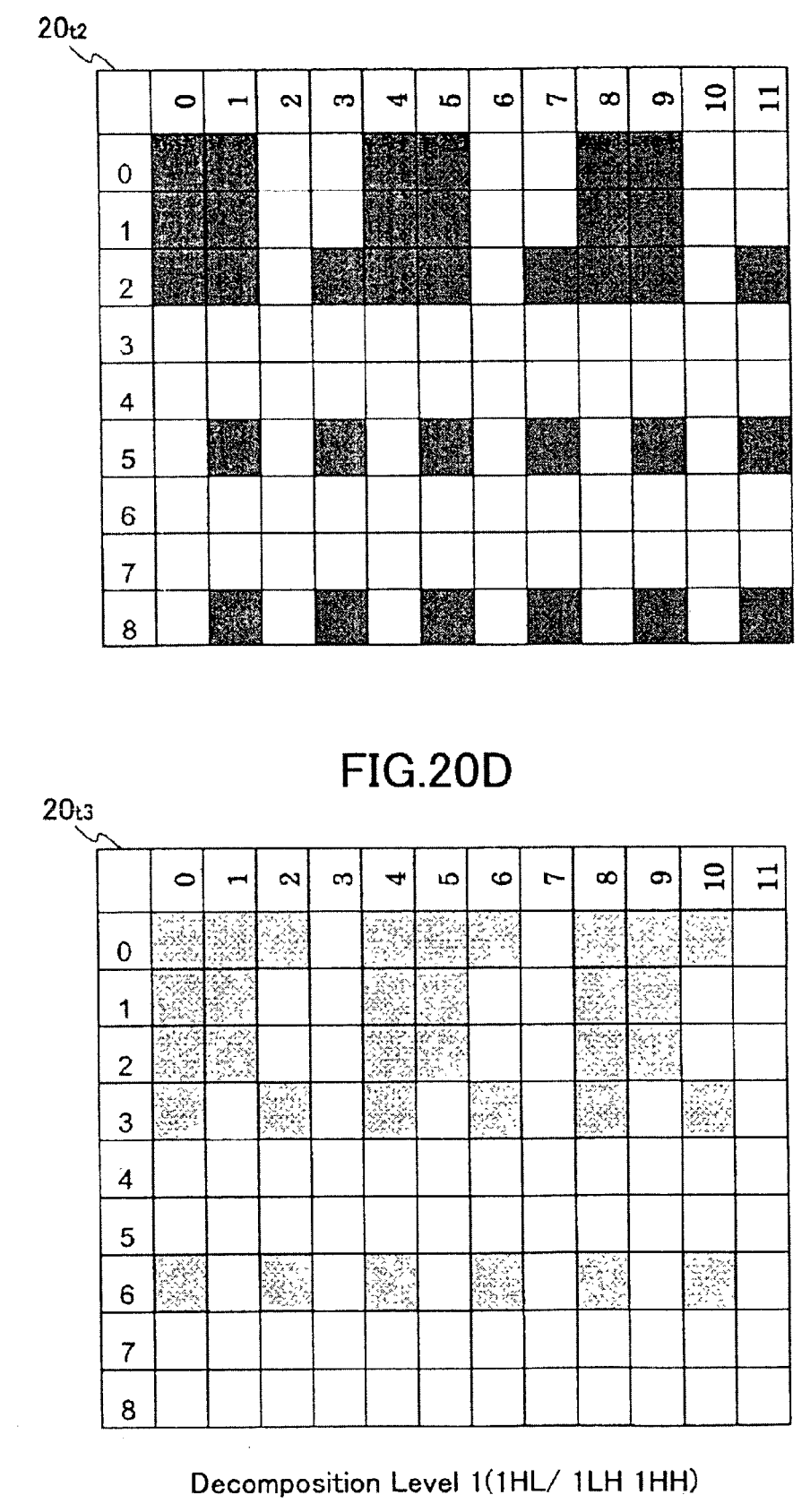

FIGS. 20A through 20D are diagrams showing the relationship of the precinct of each subband and the code block for the decomposition level 1, with respect to the tiles $20_{t0}$ through $20_{t3}$ shown in FIG. 18. FIG. 20A shows the relationship with respect to the tile $20_{t0}$, FIG. 20B shows the relationship with respect to the tile $20_{t1}$, FIG. 20C shows the relationship with respect to the tile $20_{t2}$, and FIG. 20D shows the relationship with respect to the tile $20_{t3}$. In FIGS. 20A through 20D, the ordinate indicates the precinct number, and the abscissa indicates the code block number. Shaded portions indicate the code blocks adjacent to the tile boundary. For example, in the tile $20_{t0}$ shown in FIG. 20A, the precinct number 7 indicates that the 2nd, 3rd, 6th, 7th, 10th and 11th code blocks are adjacent to the tile boundary, and the precinct number 4 is located at a position non-adjacent to the tile outer edge portion. Hence, it may be seen that in each tile, the code blocks included in the precinct number 4 are non-adjacent to the tile boundary.

Figure 21A:
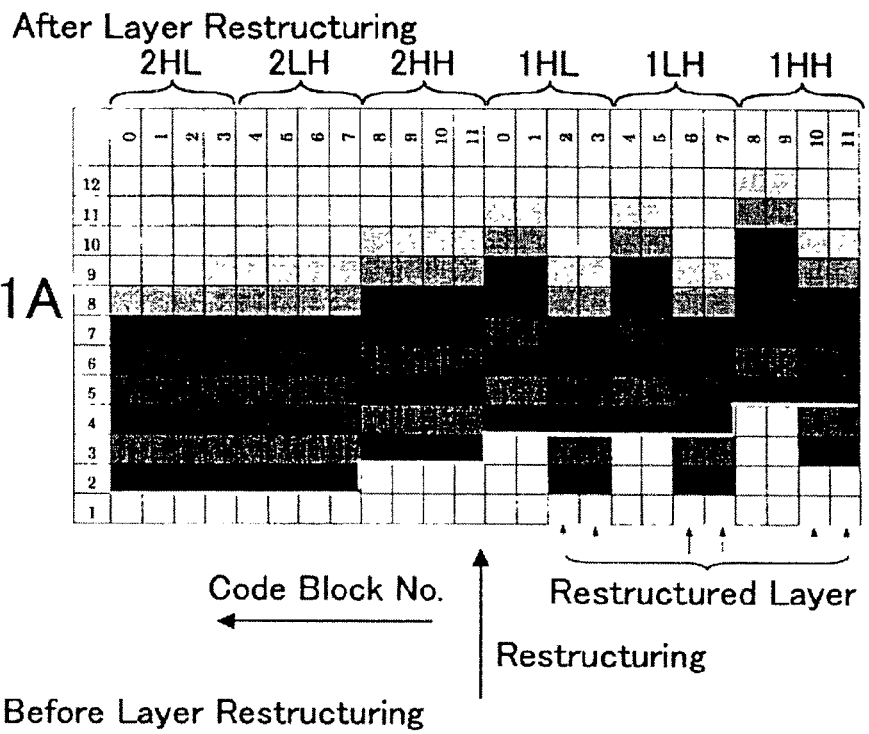
FIGS. 21A and 21B are diagrams showing states before and after layer restructuring applied with the present invention.
Figure 21B:
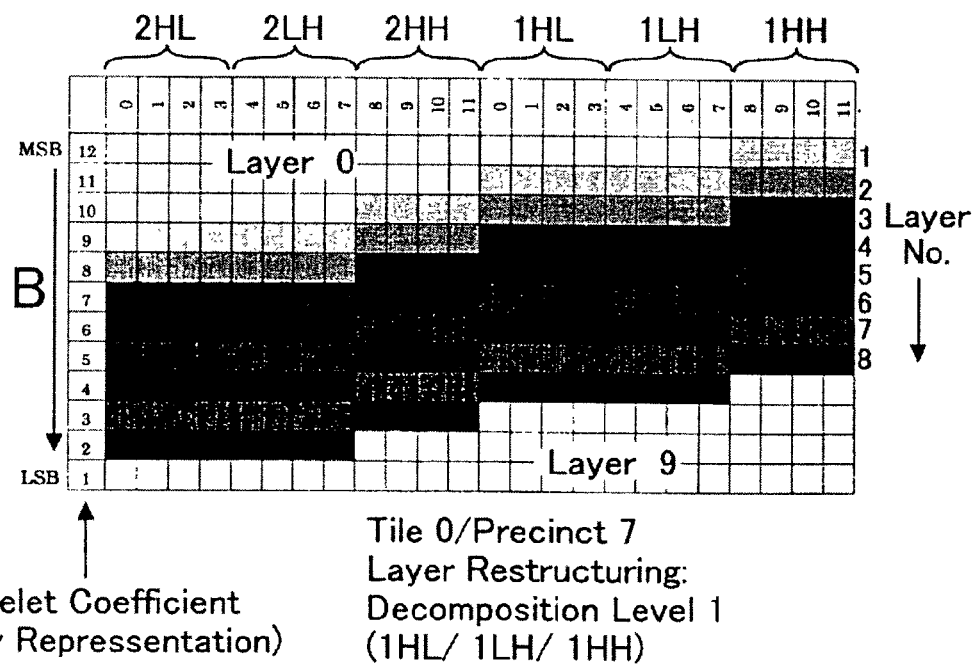

FIGS. 21A and 21B are diagrams showing states before and after the layer restructuring applied with the present invention. FIG. 21B shows the layer before the layer restructuring, and FIG. 21A shows the layer after the layer restructuring. Before the layer restructuring, the same layers are formed in each of 2HL and 2HL, 2HH, 1HL and 1LH, and 1HH as shown in FIG. 21B. Similarly to the case shown in FIG. 20A, the decomposition level 1, the tile $20_{t0}$ (tile 0), and the precinct number 7 will be considered in this case.

The ordinate in FIGS. 21A and 21B indicates the 12-bit wavelet coefficients, and MSB is assigned to the most significant layer while the LSB is assigned to the least significant layer. The abscissa indicates the code block numbers arranged in the order of the subbands starting from 1HH (made up of code block numbers 8, 9, 10 and 11) from the right, 1LH (made up of code block numbers 4, 5, 6 and 7), 1HL (made up of code block numbers 0, 1, 2 and 3), 2HH, 2LH and 2HL. The layers are formed by the bit-planes of each of the code blocks, and the layers 0, 1, . . . , 9 are formed in sequence from the most significant layer. More important data to be stored (data which are not discarded) are included for higher layers and for higher decomposition levels. As shown in FIG. 21B, the layers of the bit-planes are formed in a stepped shape. Hence, if the layer 9 is to be discarded by truncation as a layer including the bit-plane close to the LSB, for example, 4 bits are discarded in the code block of 1HH and 1 bit is discarded in the code block of 2HL. In FIG. 21A, a white line between the layer 9 and the layer 8 shows for the sake of convenience the boundary with the layer 9 discarded upon truncation.

In FIG. 21B, the code blocks having the code block numbers 2, 3, 6, 7, 10 and 11 which are indicated in gray are adjacent to the tile boundary. Hence, after the layer restructuring, the bit-planes of these code blocks are shifted to a higher layer with respect to the bit-planes of the other code blocks having the code block numbers 0, 1, 4, 5, 8 and 9 which are non-adjacent to the tile boundary, so as to be included in the layer 0, for example. This means that, when the wavelet coefficient values are discarded by the truncation, the quantization rate is suppressed to ¼ compared to the portions non-adjacent to the tile boundary. In other words, with respect to the code blocks of 1HH having the code block numbers 10 and 11 in FIG. 21B, for example, when the layer 9 is discarded, the quantization rate amounts to 4 bits and is 16. But after the layer restructuring, with respect to the code blocks of 1HH having the code block numbers 10 and 11 in FIG. 21A, when the layer 9 is discarded, the quantization rate amounts to 2 bits and is 4, thereby resulting in the suppression of the quantization rate to ¼.

The layer to which the bit-planes of the regions in the vicinity of the tile boundary are shifted is not limited to the layer 0, and the bit-planes may be shifted to be included in the higher layers such as the layer 1 or the layer 2. In any case, the bit-planes are shifted so as to be included in a higher layer, so that the data will not be discarded upon truncation. After determining the quantization rate at the tile boundary vicinity, the wavelet coefficients are quantized by the quantization and inverse quantization section 11d, 12d and 13d, and then encoded in the entropy coding and decoding sections 11e, 12e and 13e. Finally, the code stream is generated by the code stream processing section 14 shown in FIG. 17.

In the particular case described above, a plurality of layers are processed. However, it is possible to carry out the processing by regarding a plurality of layers as a single layer. For example, when the layers 0 through 8 shown in FIG. 21B are regarded as a single layer, the bit-planes which are adjacent to the tile boundary are shifted with respect to the bit-planes which are separated from the tile boundary so as to be included in the bit-planes of the higher layer side, so that the bit-planes on the lower layer side (the bit-planes of the layers 7 and 8 in this case) become added with respect to the original layer, after the layer restructuring shown in FIG. 21A.

Figure 22:
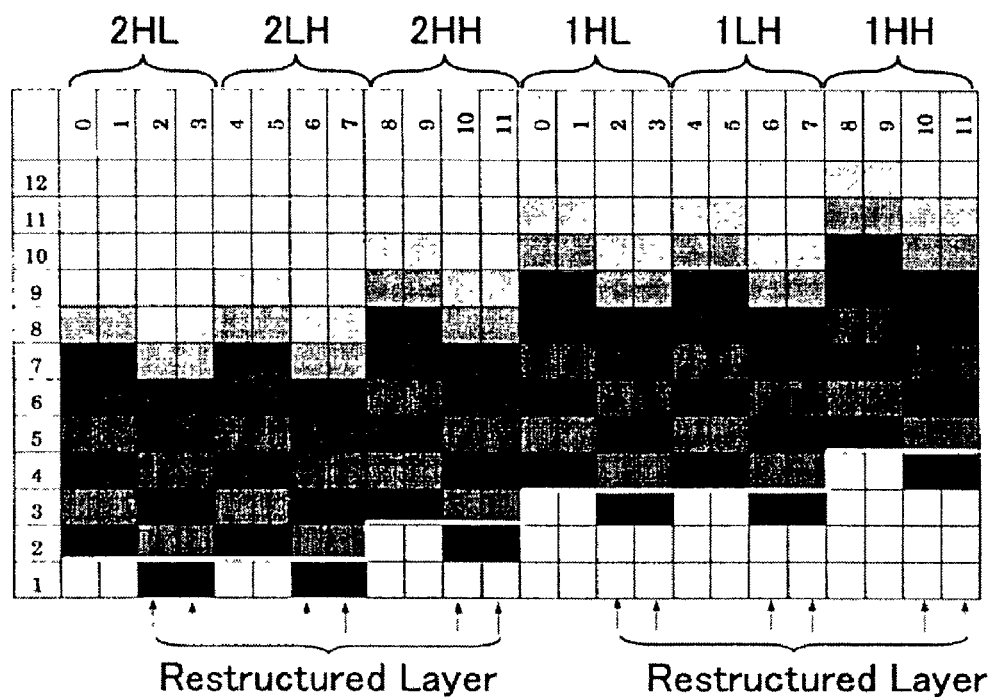
FIG. 22 is a diagram showing a state after the layer restructuring for the decomposition level 2.

The layer restructuring is made for the decomposition level 1 in this embodiment, but may of course be similarly made for the decomposition level 2. FIG. 22 is a diagram showing a state after the layer restructuring for the decomposition level 2. Similarly to the case shown in FIG. 21A, the tile $20_{t0}$ (tile 0) and the precinct number 7 will be considered in this case. In this case, the code blocks having the code block numbers 2, 3, 6, 7, 10 and 11 and adjacent to the tile boundary are shifted so as to be included in a layer one level higher. In other words, compared to the portions non-adjacent to the tile boundary, the quantization rate is suppressed to ½ at the portions adjacent to the tile boundary.

Figure 23:
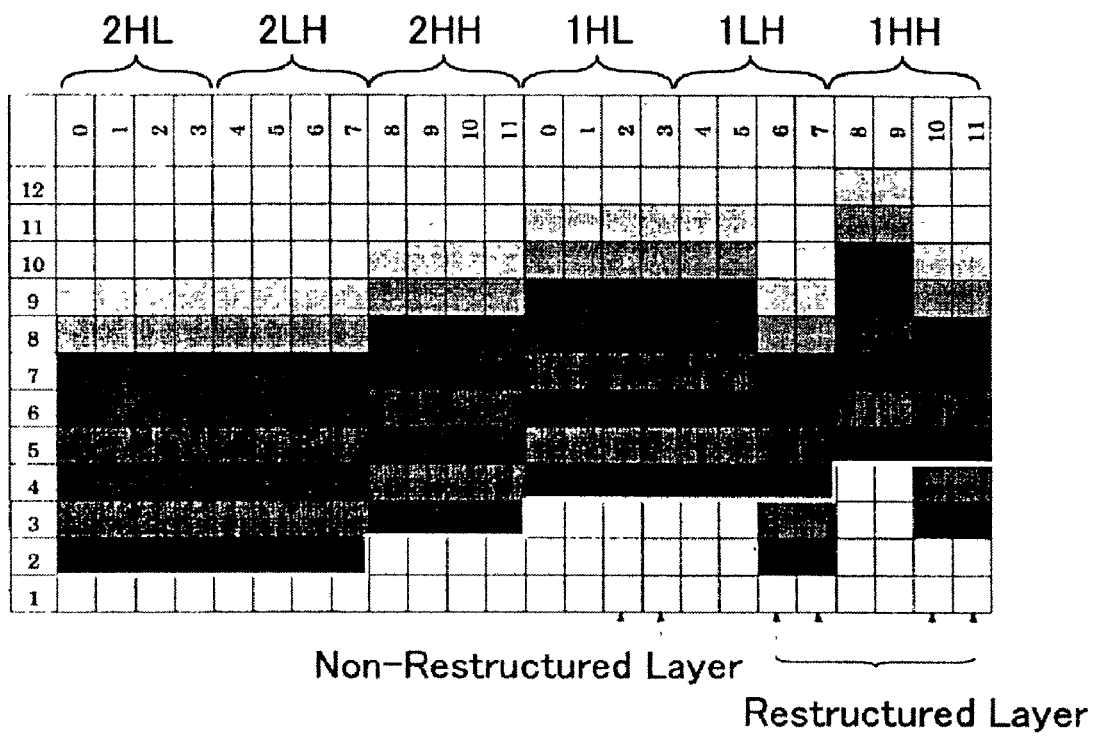
FIG. 23 is a diagram showing another embodiment of the layer restructuring.

FIG. 23 is a diagram showing another embodiment of the layer restructuring. In this embodiment of the layer restructuring, the layer restructuring is made only when the wavelet coefficient values in the tile boundary vicinity obtained by the interpolation method are larger than a predetermined value which is specified in advance. This is based on experience since the wavelet coefficient values in the tile boundary vicinity become larger when a large distortion occurs at the tile boundary. Although the code blocks 2 and 3 of the 1HL subband are adjacent to the tile boundary, the wavelet coefficient values are smaller than the predetermined values, and thus, the layer restructuring is not made in the 1HL subband. On the other hand, for both the subbands 1LH and 1HH, the layer restructuring is made because the wavelet coefficient values are larger than the predetermined value.

Furthermore, when the wavelet coefficient values in the tile boundary vicinity obtained by the interpolation method are larger than the predetermined value, it may be regarded that the distortion at the tile boundary becomes larger as the difference between the wavelet coefficient values and the predetermined value becomes larger, in correspondence with the magnitude of the difference. Accordingly, it is easier to control the quantization rate by determining the shift amount of the bit-planes.

Figure 24:
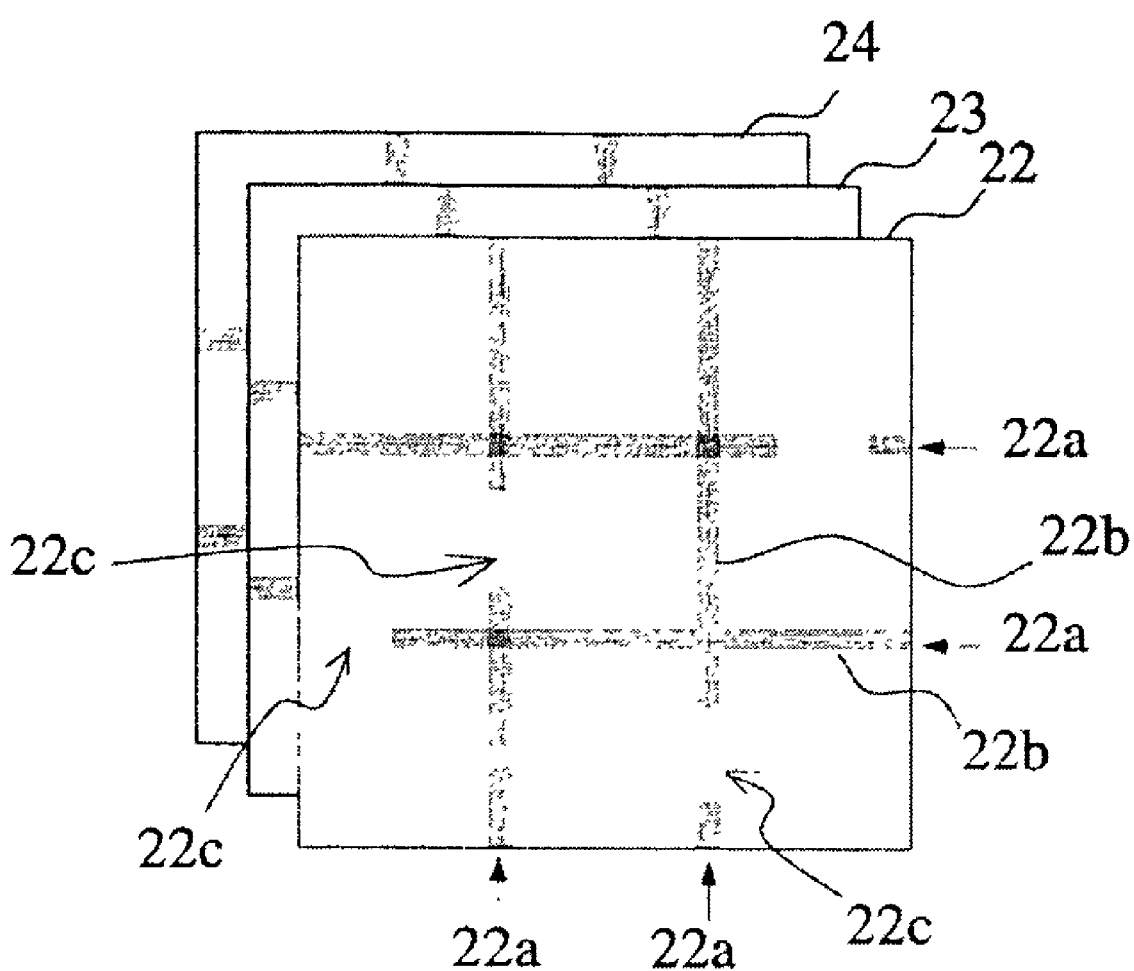
FIG. 24 is a diagram showing an application of the present invention to the still image.

FIG. 24 is a diagram showing an application of the present invention to the still image. FIG. 24 shows a first component 22, a second component 23 and a third component 24. For example, the first component 22 includes a tile boundary 22a, a suppressed portion 22b where the quantization rate is suppressed, and an uncontrolled portion 23b where the quantization rate was not controlled. FIG. 24 schematically shows a state where the quantization rate is suppressed at the tile boundary vicinity.

Figure 25:
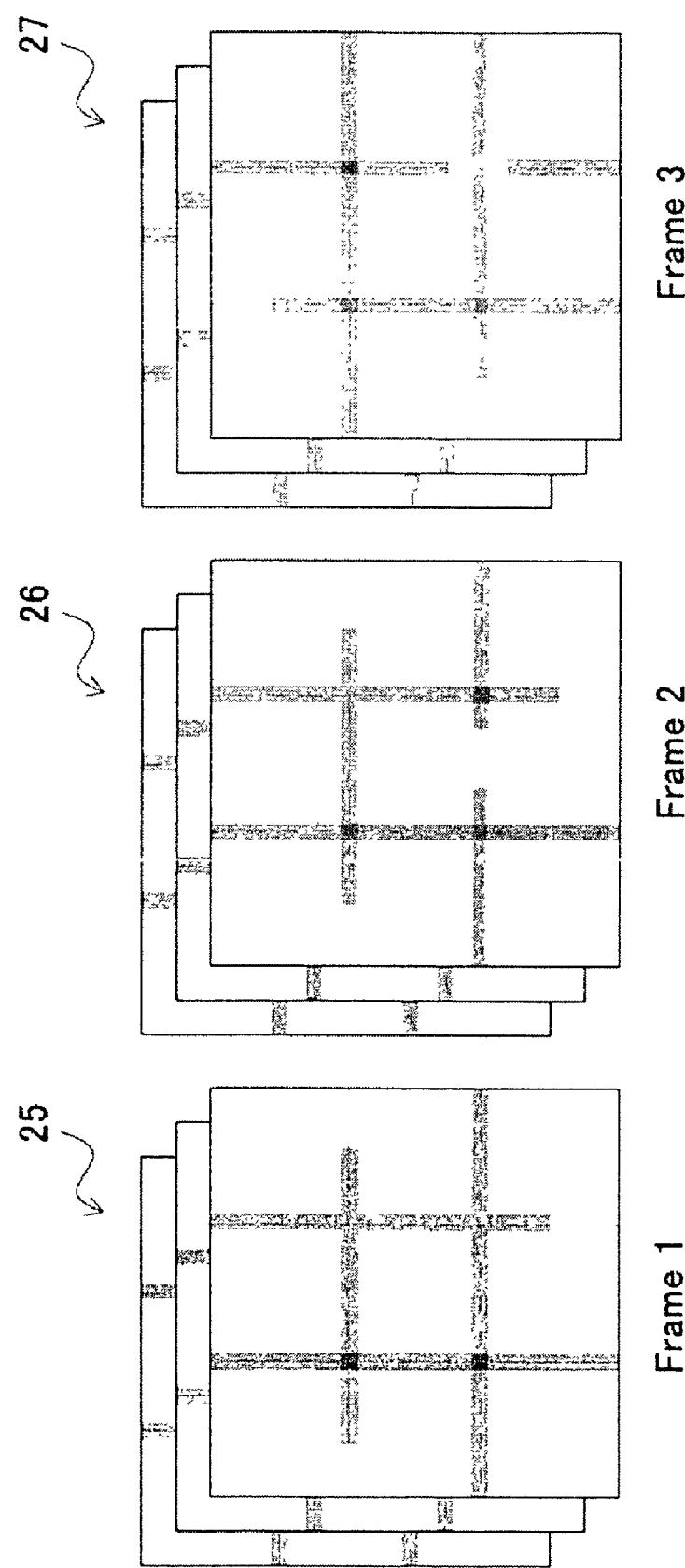
FIG. 25 is a diagram showing an application of the present invention to the moving image.

FIG. 25 is a diagram showing an application of the present invention to the moving image. FIG. 25 shows a state where the quantization rate is controlled at the tile boundary vicinity for each of frames 25, 26 and 27 (frames 1, 2 and 3).

In FIGS. 24 and 25, black portions indicate the regions where the quantization rate is suppressed to a low rate. On the other hand, non-black portions indicate regions where the quantization rate is not suppressed even though at the tile boundary vicinity, because the wavelet coefficient values at the tile boundary vicinity is smaller than the predetermined value as described above in conjunction with FIG. 23 and there was no need for the layer restructuring. In other words, the tile boundary was originally inconspicuous at these non-black portions.

In the embodiment described heretofore, the layer restructuring is finely made in units of code blocks. In this case, the quantization rate may be set to an optimum value which minimizes the distortion at the tile boundary. On the other hand, when the original image size is large, the processing time may become long. In a case where the high-speed processing is a priority as in the case of displaying the moving image, it is conceivable to make the layer restructuring in units of precincts. Although an optimum quantization rate may not be selected in this case, there is an advantage in that the processing can be carried out in real-time.

Figure 26:
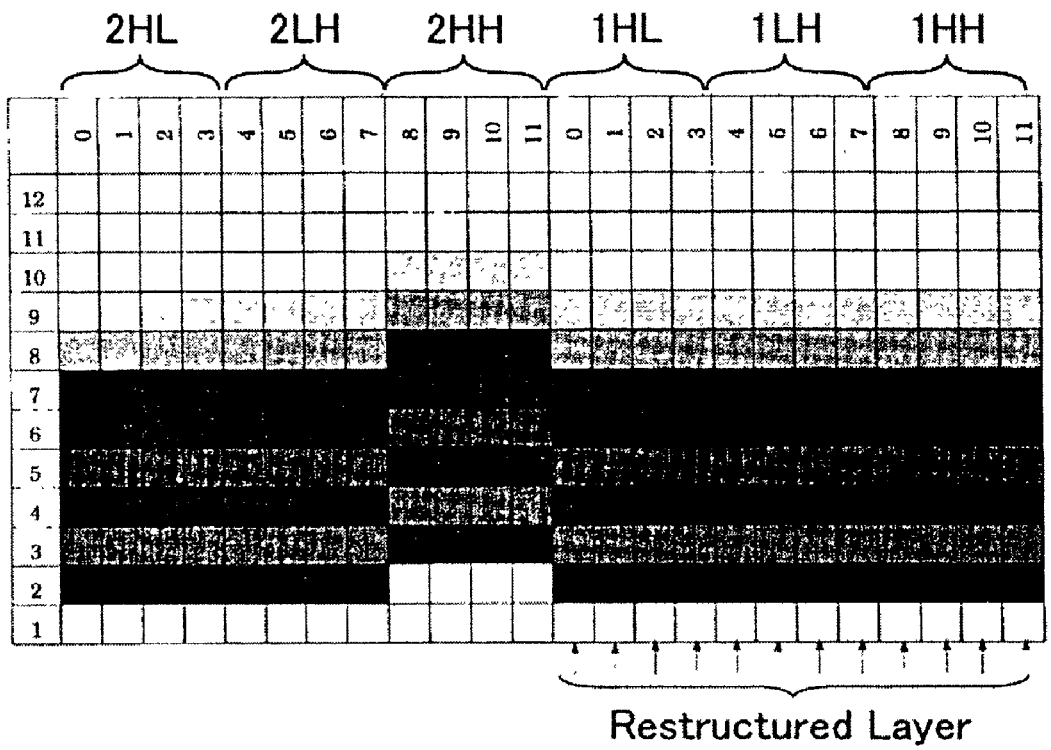
FIG. 26 is a diagram showing a result of restructuring which is made so that all code blocks included in the precinct become included in a higher layer.

FIG. 26 is a diagram showing a result of restructuring which is made so that all code blocks included in the precinct become included in a higher layer. FIG. 26 shows a case where, if a predetermined number of blocks within the precinct, such as one-half or more code blocks, are adjacent to the tile boundary, the restructuring is made so that all of the code blocks included in this precinct become included in a higher layer. In this particular case, entire subbands of 1HL, 1LH and 1HH are uniformly absorbed by the higher layer.

When the quantization rate at the tile boundary vicinity is reduced in order to reduce the distortion at the tile boundary, the compression rate of the image is consequently reduced as a result. Hence, in order to minimize the undesirable reduction in the compression rate, it is conceivable to improve the geometrical relationship of the precincts or the code blocks with respect to the tile. In other words, if a precinct or code block non-adjacent to the tile boundary is created, the quantization rate at this precinct or code block may be remain high compared to that at the tile boundary, which would in turn suppress reduction in the compression rate of the image as a whole.

Figure 27:
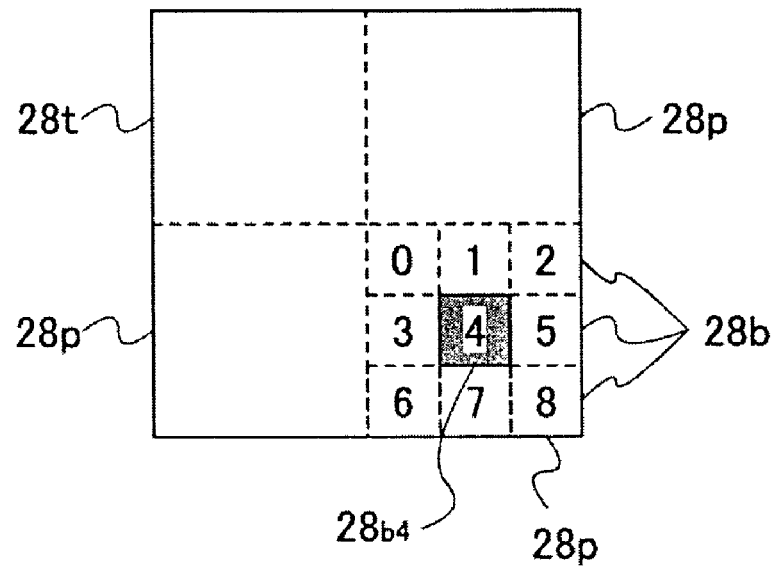
FIG. 27 is a diagram showing an improved geometrical relationship of the block codes with respect to the tile.
Figure 28:
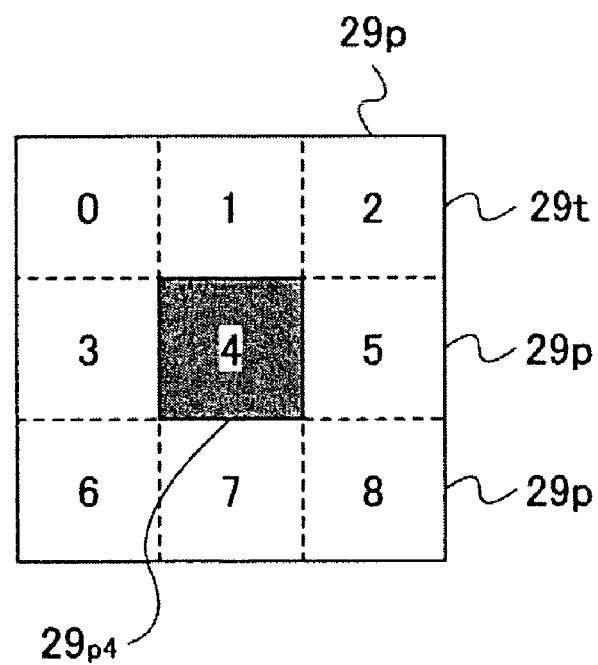
FIG. 28 is a diagram showing an improved geometrical relationship of the precincts with respect to the tile.

FIGS. 27 and 28 are diagrams respectively showing improved geometrical relationships of the block codes and the precincts with respect to the tile.

In FIG. 27, a tile $28_t$ is divided into precincts $28_p$, and precinct $28_p$ is divided into code blocks $28_b$. A 4th code block $28_{b4}$ is non-adjacent to the tile outer edge, and the quantization rate at this 4th code block $28_{b4}$ can be made higher than that at the tile boundary.

In FIG. 28, a tile $29_t$ is divided into precincts $29_p$, and a 4th precinct $29_{p4}$ is non-adjacent to the tile outer edge, and the quantization rate at this 4th precinct $29_{p4}$ can be made higher than that at the tile boundary.

The effect of compression differs depending on the number of subbands and the decomposition level of the bit-plane which is restructured to a different layer. For example, if the decomposition level is 1, it is possible to reduce the processing time, but the image quality becomes slightly rough. If the decomposition level is 2 or more, the image quality further improves, but the processing time increases. The same holds true for the number of subbands which are divided. Hence, these parameters may be appropriately set to suit the environment and purpose of employing the image compression and/or expansion apparatus.

[Second Embodiment]

The first embodiment described above uses the layer restructuring. However, it is possible to improve the state of distortion at the tile boundary by controlling the quantization rate at the tile boundary vicinity depending on a region of interest (ROI) process, as done in this second embodiment. According to the extended specifications of the JPEG2000 (which is not yet definite in June 2001), the prospect is that it will be able to uniformly reduce the quantization rate for arbitrary shapes. More particularly, one ROI bit-plane is prepared separately from the wavelet coefficient values, and the bits of this ROI bit-plane are set to 1 with respect to the pixel positions which are to be processed as the ROI, while the bits of the ROI bit-plane are reset to 0 with respect to other pixel positions, so that the quantization rate can easily be controlled.

Figure 29A:
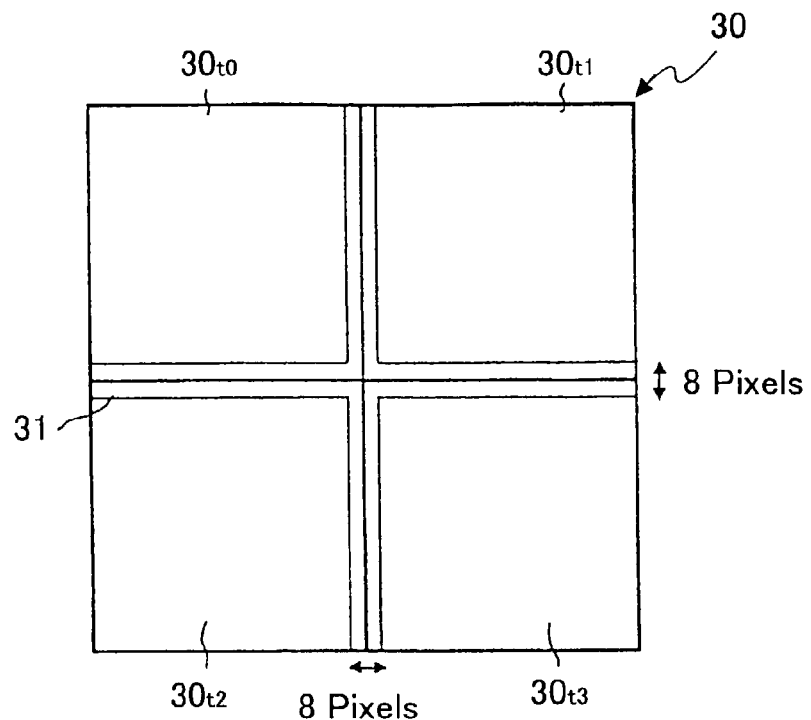
FIGS. 29A and 29B are diagrams showing an embodiment of the ROI process.
Figure 29B:
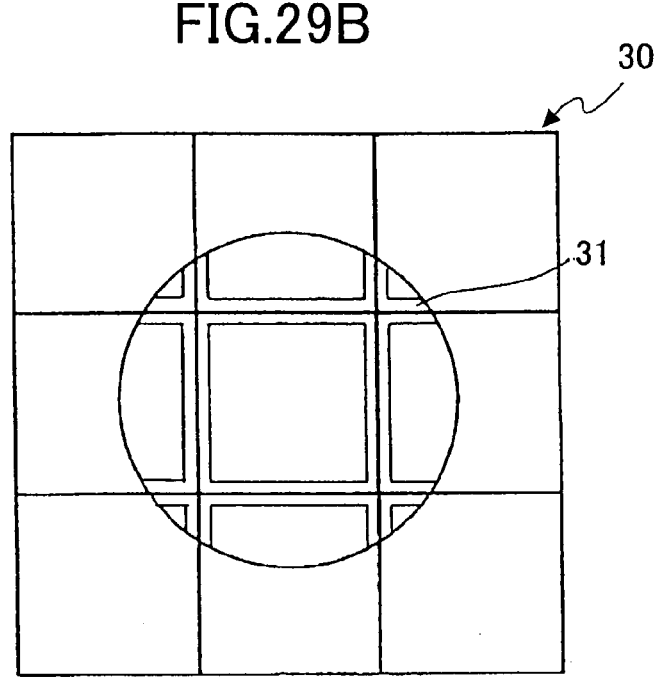

FIGS. 29A and 29B are diagrams showing an embodiment of the ROI process. In this case, an original image 30 is divided into 4 tiles $30_{t0}$, $30_{t1}$, $30_{t2}$ and $30_{t3}$, and a cross-shaped ROI 31 having a predetermined width along each tile boundary is specified. In FIG. 29A, the ROI 31 is specified with a width of 8 pixels. The wavelet coefficient values generated from the pixel values existing in this cross-shaped region are reduced of the quantization rate based on a predetermined value which is specified in advance. As a result, the distortion at the tile boundary is improved (reduced). In addition, FIG. 29B shows the ROI 31 which is set with respect to the tile boundary region on the inner side of the image belong to within 1 frame.

[Third Embodiment]

As another method, it is conceivable to hold the wavelet coefficient values at the tile boundary vicinity before the quantization separately from the wavelet coefficient values after the quantization. In JPEG2000, a COM marker is prescribed for inserting a comment at a predetermined position in the code. An arbitrary number of such COM markers may be inserted within the main header or the tile-part header, and a maximum of 65535 bytes of data can be inserted succeeding the COM marker. Hence, in this third embodiment, the COM marker is inserted in the tile-part header, and the wavelet coefficient values of the pixels of 1HL, 1LH and 1HH adjacent to the tile boundary and prior to the quantization are inserted with a prescribed format succeeding the COM marker.

Figure 30:
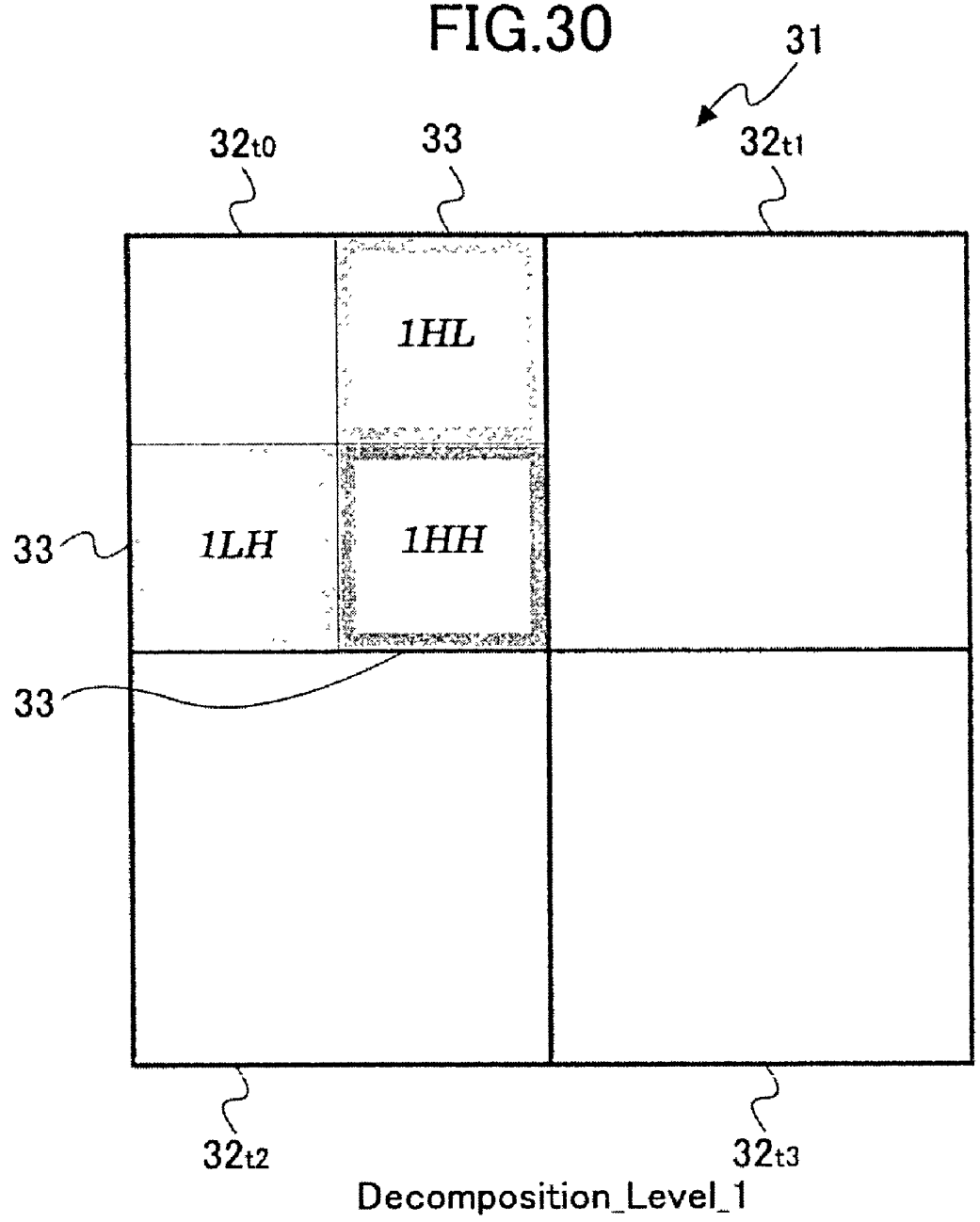
FIG. 30 is a diagram showing the wavelet coefficient values of the pixels of 1HL, 1LH and 1HH adjacent to the tile boundary and prior to the quantization, having the prescribed format.

FIG. 30 is a diagram showing the wavelet coefficient values of the pixels of 1HL, 1LH and 1HH adjacent to the tile boundary and prior to the quantization, having the prescribed format. In FIG. 30, an original image 32 is divided into 4 tiles $32_{t0}$, $32_{t1}$, $32_{t2}$ and $32_{t3}$, and a shaded region 33 includes the wavelet coefficient values of the pixels of 1HL, 1LH and 1HH adjacent to the tile $32_{t0}$ and prior to the quantization. For the sake of convenience, the coefficients on the 4 sides of each of the subbands of 1HL, 1LH and 1HH are stored clockwise, as "top side" →>"right side"→>"bottom side"→>"left side", in a sequence "1HL"→>"1LH"→>"1HH", with a fixed length of 2 bytes per coefficient.

The contents of the COM marker, that is, the writing sequence (format) such as that described above, may be freely selected, so that the contents are, meaningless in general to a third party attempting to decode the data. In other words, the decoding is normally made based on the quantized coefficients existing within the code. However, in a case where it is possible to know the contents of the COM marker, it is possible not to use the quantized values existing within the code but to make the decoding using accurate values embedded in the COM marker, with respect to the wavelet coefficient values at the tile boundary.

The use of 9×7 and 5×3 wavelet transform filters is prescribed in the JPEG2000. When such filters are used, wavelet coefficient values of 25 pixels and the peripheral 81 pixels become necessary at the maximum in order to obtain 1 pixel value by the wavelet inverse transform. Furthermore, each one of the wavelet coefficient values contributes to the derivation of a large number of pixel values. Accordingly, the accurate wavelet coefficient values at the tile boundary which are read from the COM marker become important data for the inverse transform which is carried out to derive the pixel values existing at the tile boundary. As a result, it is possible to reduce the quantization error of the pixel values at the tile boundary vicinity, and to make the tile boundary inconspicuous.

Figure 31:
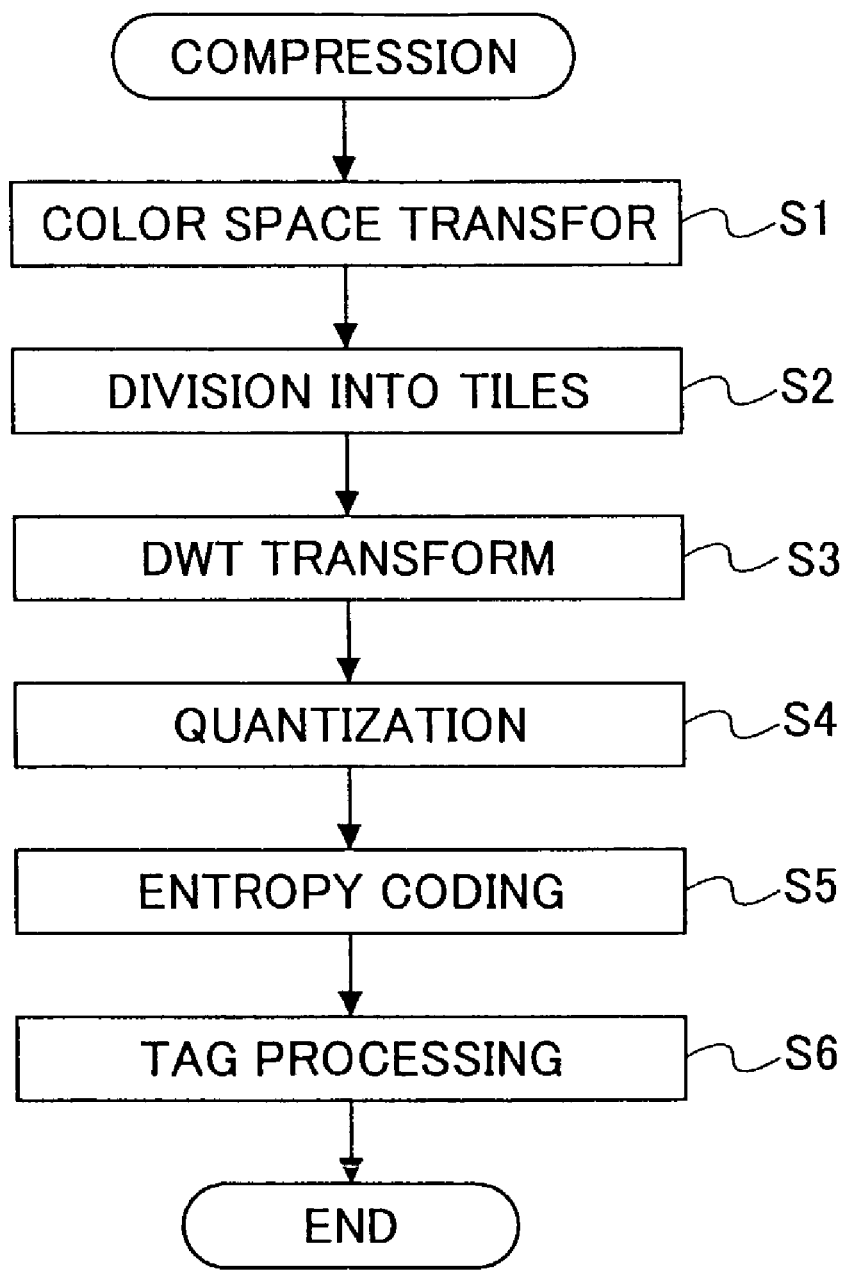
FIG. 31 is a flow chart for explaining an embodiment of the image compression method according to the present invention.

FIG. 31 is a flow chart for explaining an embodiment of the image compression method according to the present invention. This embodiment of the image compression method is carried out with respect to the JPEG2000 system. First, a step S1 transforms the image into color spaces. Then, a step S2 specifies rectangular tiles with an arbitrary size with respect to the image, and divides the image using the specified rectangular tiles. After the division into the tiles, a step S3 further divides each-tile into code blocks, and carries out a DWT transform with respect to the divided code blocks.

After the DWT transform, a step S4 decomposes the code block into bit-planes, and the decomposed bit-planes are ordered from the MSB to the LSB depending on the coding sequence of the decomposed bit-planes. The ordered bit-planes are used to form layers which are ordered from the highest layer to the lowest layer. The bit-plane of the tile boundary vicinity region where the quantization rate is to be relatively suppressed to a low value, is shifted so as to be included in one of higher layers of the ordered layers, with respect to the bit-plane of the region separated from the tile boundary and where the quantization rate is to be relatively maintained to a high value. A layer restructuring to a different layer is made in this manner, and a quantization is then carried out.

After these processes of the step S4, a step S5 carries out an entropy coding from the higher layers of the quantized layers. In addition, a step S6 carries out a tag process, and the process ends.

As a function of the JPEG2000, it is possible to specify the region where the quantization rate is to be suppressed to a low value by the ROI process. In addition, it is possible to hold the coefficients of the region where the quantization rate is to be suppressed to the low value before the quantization, and refer to the held coefficients at the time of the expansion.

Figure 32:
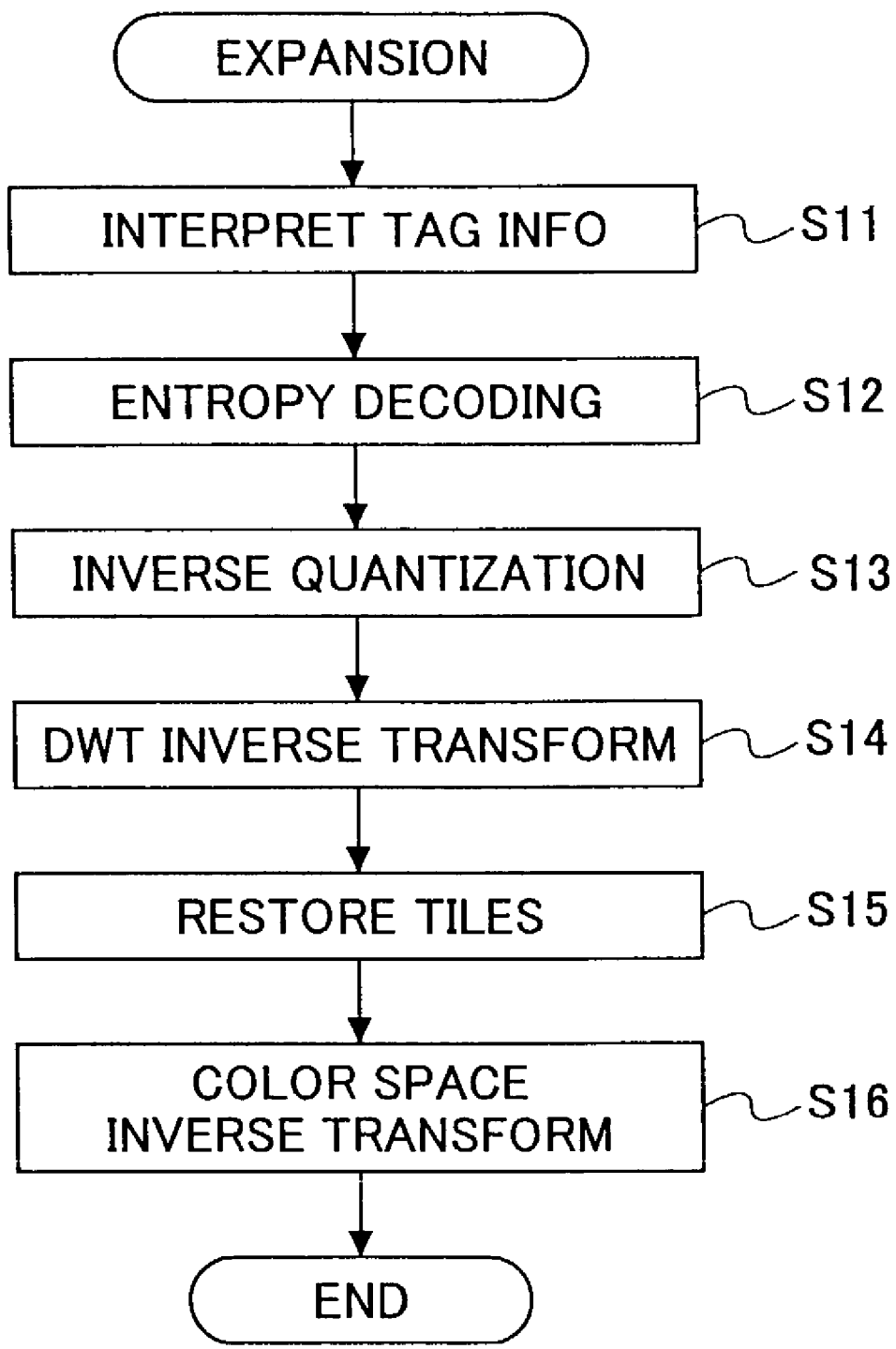
FIG. 32 is a flow chart for explaining an embodiment of the image expansion method according to the present invention.

FIG. 32 is a flow chart for explaining an embodiment of the image expansion method according to the present invention. First, a step S11 interprets the tag information based on the tile division information of the compressed image. A step S12 carries out an entropy decoding, and a step S13 carries out an inverse quantization. A step S14 carries out a SWT inverse transform, and a step S15 restores the tiles. A step S16 connects the restored tiles and carries out a color space inverse transform so as to generate the expanded image, and the process ends.

The embodiments of the image compression apparatus, image expansion apparatus, image compression method and image expansion method according to the present invention are described above, but the present invention is also applicable to a computer system. More particularly, a computer-readable storage medium according to the present invention stores a computer program for causing a computer or information processing apparatus, such as a personal computer, to carry out a process using the image compression method and/or the image expansion method of the present invention, so that the computer functions as the image compression apparatus and/or the image expansion apparatus of the present invention.

In other words, the computer-readable storage medium is formed by a recording medium which stores a computer program for causing a computer to function as any of the described embodiments of the image compression apparatus and/or the image expansion apparatus. The recording medium may be selected from CD-ROMs, magneto-optical disks, DVD-ROMs, floppy disks, flash memories, memory cards, memory sticks, various kinds of ROMs, various kinds of RAMs, and any media capable of storing the computer program in a computer-readable form. The computer which executes the computer program may read the computer program from the computer-readable storage medium which is loaded into the computer or, read the computer program from the computer-readable storage medium via a communication means such as a modem via one or more networks. In addition, the computer program may be preinstalled in the computer-readable storage medium, such as a hard disk drive (HDD), of the computer.

[Fourth Embodiment]

Figure 33:
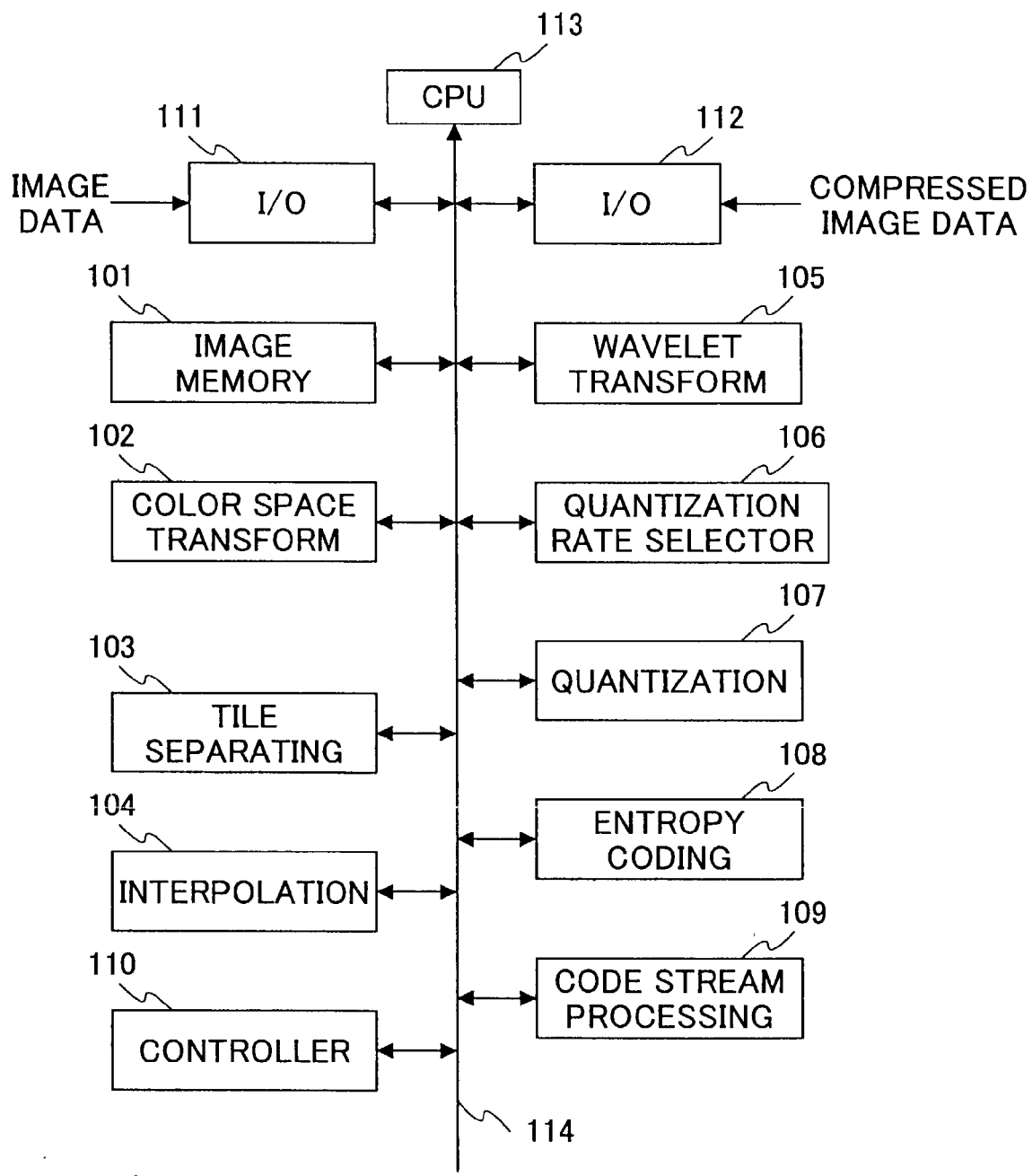
FIG. 33 is a system block diagram for explaining a fourth embodiment of the image compression apparatus according to the present invention.

FIG. 33 is a system block diagram for explaining a fourth embodiment of the image compression apparatus according to the present invention. The image compression apparatus shown in FIG. 33 includes an image memory 101, a color space transform section 102, a tile separating section 103, an interpolation section 104, a wavelet transform section 105, a quantization rate selector 106, a quantization section 107, an entropy coding section 108, a code stream processing section 109, a controller 110, an input/output (I/O) section 111 for inputting image data, an input/output section 112 for outputting compressed image data, and a CPU 113 which are connected via a bus 114.

Figure 34:
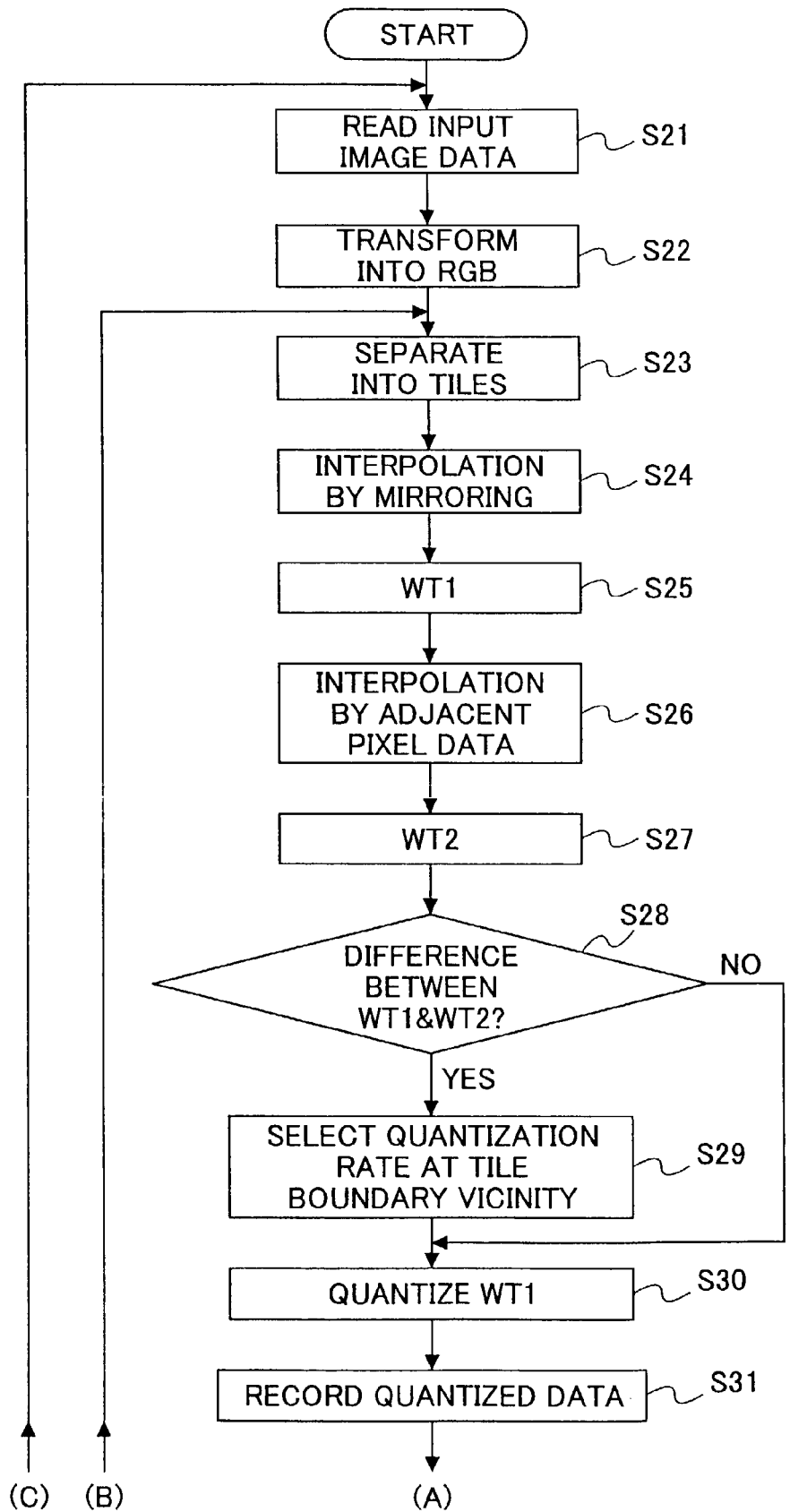
FIG. 34 is a flow chart for explaining the operation of the fourth embodiment.
Figure 35:
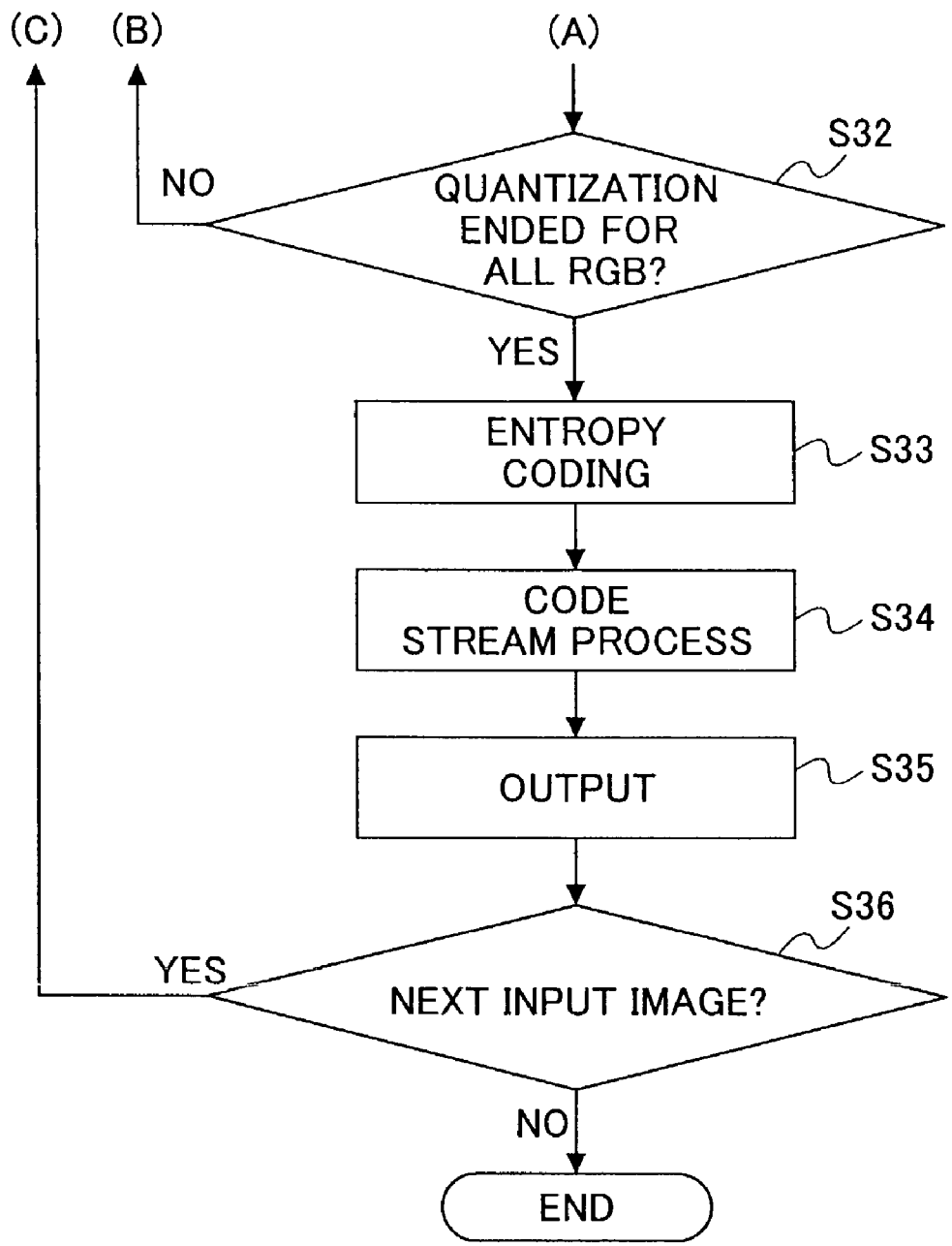
FIG. 35 is a flow chart for explaining the operation of the fourth embodiment.

FIGS. 34 and 35 are flow charts for explaining the operation of the fourth embodiment.

In FIG. 34, the controller 110 reads the image data from the input/output section 111 and stores the image data in the image memory 101 in a step S21. In a case where the input image is a moving image, the image data is alternately stored in regions A and B (not shown) within the image memory 101.

After the image data amounting to 1 frame are stored in the image memory 101 in the step S21, the color space transform section 102 separates and transforms the stored image data into red (R), green (G) and blue (B) components in a seep S22. It is of course possible to separate and transform the stored image data into yellow (Y), magenta (M) and cyan (C) components of the complementary color system or, to luminance (Y), red color difference (U) and blue color difference (V) components (YUV components) or, to YCrCb components, instead of into the RGB components.

The tile separating section 103 divides each of the image data separated into the R, G and B components into tiles made up of 16×16 pixels, for example, in a step S23.

The interpolation section 104 reads the divided tiles, and interpolates the image data at the tile outer periphery by a first interpolation method, namely, the mirroring method, in a step S24.

The wavelet transform section 105 carries out a wavelet transform with respect to the tiles which are interpolated in the step S24, and stores transformed wavelet coefficient values (WT1) into a memory (not shown) in a step S25. The memory may be provided separately from the image memory 101 or, be a part of a memory unit which also includes the image memory 101.

The interpolation section 104 reads the same tile as that read in the step S24, and interpolates the image data at the tile periphery by a second interpolation method in a step S26. The second interpolation method may use pixel values of tiles adjacent to the read tile.

The wavelet transform section 105 carries out a wavelet transform with respect to the tiles which are interpolated in the step S26, and stores transformed wavelet coefficient values (WT2) into the above described memory in a step S27.

The quantization rate selector 106 decides whether or not a difference exists between the wavelet coefficient values WT1 and WT2 at the tile boundary vicinity, in a step S28. The process advances to a step S29 if the decision result in the step S28 is YES, and the process advances to a step S30 if the decision result in the step S28 is NO. The step S28 can make the decision by judging the difference of the individual coefficient values of the wavelet coefficient values WT1 and WT2 or, judging whether a sum of square of the difference of the individual coefficient values is greater than or equal to a predetermined value.

The quantization rate selector 106 selects the quantization rate at the vicinity of the tile for which the decision result is YES in the step S28, in the step S29.

The quantization section 107 carries out a quantization with respect to the wavelet coefficient values WT1 subjected to the wavelet transform in the step S25, in the step S30.

With respect to the coefficient values at the tile boundary vicinity for which the quantization rate is selected in the step S29, the quantization is carried out at a quantization rate lower than the quantization rate with respect to the other coefficient values.

For example, the step 29 outputs 1 if the difference is 5 or greater in the step S28, outputs 2 if the difference is 7, and outputs 3 if the difference is 9. The step S30 reduces the quantization rate by 1 rank if 1 is output in the step S29, reduces the quantization rate by 2 ranks if 2 is output in the step S29, and the like. In other words, the step S30 reduces the quantization rate depending on the difference.

It is possible to reduce the quantization rate to a predetermined rank or to set the quantization rate to 1, that is, so as not to carry out the quantization, if the difference is greater than or equal to a predetermined value.

The quantization rate may be reduced in arbitrary units. For example, the quantization rate may be reduced in units of coefficients (pixels), units of code blocks or, in units of subbands.

The quantization section 107 stores the data quantized in the step S30 and the data having the reduced quantization rate, the code blocks or the subbands, in a step S31, and the process advances to a step S32 shown in FIG. 35.

In FIG. 35, the controller 110 decides whether or not all of the tiles of the R, G and B components of 1 frame are quantized, in the step S32. If the decision result in the step S32 is NO, the process returns to the step S23 shown in FIG. 34, and the steps S23 through S32 are repeated. The process advances to a step S33 if the decision result in the step S32 is YES.

The entropy coding section 108 carries out a known coding process in the step S33. The code stream processing section 109 generates a code stream in a step S34, and the code stream is output from the input/output section 112 in a step S35.

The controller 110 decides whether or not a next input image exists, in a step S36. If the decision result in the step S36 is YES, the process returns to the step S21 shown in FIG. 34, and the steps S21 through 36 are repeated. On the other hand, the process ends if the decision result in the step S36 is NO.

Figure 36:
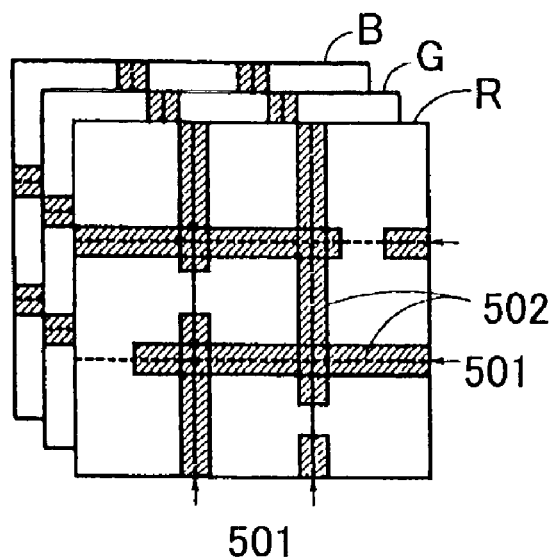
FIG. 36 is a diagram showing a processed result obtained by the fourth embodiment.

FIG. 36 is a diagram showing a processed result obtained by the fourth embodiment. In FIG. 36, the tile boundary is indicated by a reference numeral 501, and a region 502 with the hatching is located at the tile boundary vicinity. The quantization rate is reduced in the region 502.

The region 502 does not exist at some portions of the tile boundary vicinity. At these portions, the difference between the wavelet coefficient values obtained by the mirroring method and the interpolation method using adjacent pixels is small, and the quantization rate does not need to be reduced. At these portions, a discontinuity originally does not occur at the tile boundary 501.

The step S26 carries out the interpolation using the adjacent pixels in this embodiment. However, the step S26 may carry out the interpolation using a method other than the mirroring method of interpolation carried out in the step S24, such as the interpolation using centrosymmetric method.

Furthermore, the interpolation carried out in the step S24 is not limited to the mirroring method.

Figure 37:
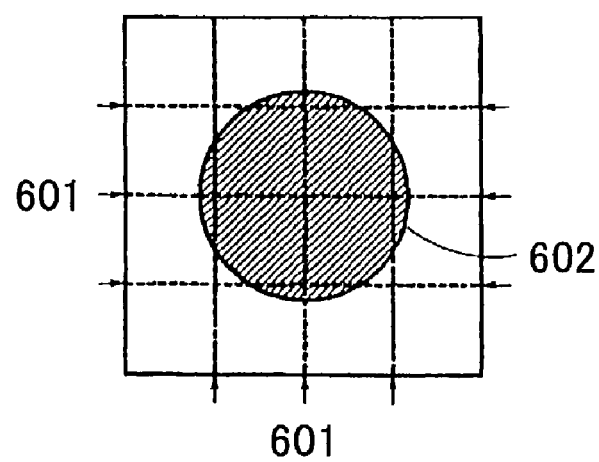
FIG. 37 is a diagram for explaining a region applied with the fourth embodiment.

FIG. 37 is a diagram for explaining a region applied with the fourth embodiment. In FIG. 37, the tile boundary is indicated by a reference numeral 601. A region 602 indicated by the hatching may be specified, and this fourth embodiment may be applied with respect to this region 602, while the steps S26 through S29 are omitted with respect to the other regions.

In addition, although the step S22 separates the image data into the R, G and B components and this fourth embodiment is applied to each of the R, G and B components, it is possible to apply this fourth embodiment to only the image data of the G component which visually contributes the most. In this case, the steps S26 through S29 may be omitted with respect to the image data of the R and B components.

Similarly, if the image data is separated into Y, U and V components, it is possible to apply this fourth embodiment to only the image data of the Y component.

In a case where the input image is monochromatic, the step S22 may be omitted.

Moreover, the steps S26 through S29 may be omitted, and the step S30 in this case may carry out the quantization by reducing the quantization rate with respect to all regions in the tile boundary vicinity compared to other regions.

According to this fourth embodiment, it is possible to eliminate the discontinuity at the tile boundary of the expanded image, because the quantization rate of the wavelet coefficient values in the regions at the tile boundary vicinity is reduced compared to the quantization rate at regions other than the tile boundary vicinity.

Further, the present invention is not limited to these embodiments, but various variations and modifications may be made without departing from the scope of the present invention.

What is claimed is:

1. An image compression apparatus comprising:
a tile specifying section specifying rectangular tiles having an arbitrary size with respect to an image;
an image dividing section dividing the image using the specified rectangular tiles;
a bit-plane decomposing section decomposing each of the specified tiles dividing the image into bit-planes;
a bit-plane ordering section ordering the bit-planes decomposing each of the specified tiles depending on a coding sequence;
a layer forming section forming layers by the ordered bit-planes; and
a suppressing section suppressing a quantization rate of a region of interest low relative to other regions of the image by including a bit-plane of said region of interest in a higher layer of the layers formed by the ordered bit-planes than the other regions without shifting the bit-planes themselves,
wherein said suppressing section suppresses the quantization rate of a region in a vicinity of a tile boundary, with respect to a bit-plane of a region separated from the tile boundary and having a relatively higher quantization rate, so as to be included in a higher layer of the layers formed by the ordered bit-planes without shifting the bit-planes themselves.

2. The image compression apparatus as claimed in claim 1, wherein said suppressing section holds coefficient values of the region in which the quantization rate is suppressed prior to quantization.

3. The image compression apparatus as claimed in claim 2, wherein said suppressing section holds the coefficient values in tile-part headers.

4. The image compression apparatus as claimed in claim 1, further comprising:
a layer restructuring section restructuring a layer,
a number of layers prior to restructuring of the layer being one or more.

5. An image compression apparatus comprising:
a tile specifying section specifying rectangular tiles having an arbitrary size with respect to an image;
an image dividing section dividing the image using the specified rectangular tiles;
a bit-plane decomposing section decomposing each of the specified tiles dividing the image into bit-planes;
a bit-plane ordering section ordering the bit-planes decomposing each of the specified tiles depending on a coding sequence;
a layer forming section forming layers by the ordered bit-planes; and
a suppressing section suppressing a quantization rate of a region of interest low relative to other regions of the image by including a bit-plane of said region of interest in a higher layer of the layers formed by the ordered bit-planes than the other regions without shifting the bit-planes themselves,
wherein code blocks constitute a minimum unit of a collection of bit-planes restructured in a layer different from that of bit-planes in a region which is separated from a tile boundary and has a quantization rate high relative to others, and at least one code block is non-adjacent to an outer edge of a tile.

6. An image compression apparatus comprising:
a tile specifying section specifying rectangular tiles having an arbitrary size with respect to an image;
an image dividing section dividing the image using the specified rectangular tiles;
a bit-plane decomposing section decomposing each of the specified tiles dividing the image into bit-planes;
a bit-plane ordering section ordering the bit-planes decomposing each of the specified tiles depending on a coding sequence;
a layer forming section forming layers by the ordered bit-planes; and
a suppressing section suppressing a quantization rate of a region of interest low relative to other regions of the image by including a bit-plane of said region of interest in a higher layer of the layers formed by the ordered bit-planes than the other regions without shifting the bit-planes themselves,
wherein precincts constitute a minimum unit of a collection of bit-planes restructured in a layer different from that of bit-planes in a region which is separated from a tile boundary and has a quantization rate high relative to others, and at least one precinct is non-adjacent to an outer edge of a tile.

7. An image compression apparatus comprising:
a tile specifying section specifying rectangular tiles having an arbitrary size with respect to an image;
an image dividing section dividing the image using the specified rectangular tiles;
a bit-plane decomposing section decomposing each of the specified tiles dividing the image into bit-planes;
a bit-plane ordering section ordering the bit-planes decomposing each of the specified tiles depending on a coding sequence;
a layer forming section forming layers by the ordered bit-planes; and
a suppressing section suppressing a quantization rate of a region of interest low relative to other regions of the image by including a bit-plane of said region of interest in a higher layer of the layers formed by the ordered bit-planes than the other regions without shifting the bit-planes themselves,
wherein bit-planes restructured in a layer different from that of bit-planes in a region which is separated from a tile boundary and has a quantization rate high relative to others have a 15 decomposition level 1 or 2.

8. The image compression apparatus as claimed in claim 7, wherein a processing time and an output image quality of the image compression apparatus differ depending on the decomposition level.

9. The image compression apparatus comprising:
a tile specifying section specifying rectangular tiles having an arbitrary size with respect to an image;
an image dividing section dividing the image using the specified rectangular tiles;
a bit-plane decomposing section decomposing each of the specified tiles dividing the image into bit-planes;
a bit-plane ordering section ordering the bit-planes decomposing each of the specified tiles depending on a coding sequence;
a layer forming section forming layers by the ordered bit-planes; and
a suppressing section suppressing a quantization rate of a region of interest low relative to other regions of the image by including a bit-plane of said regions of interest in a higher layer of the layers formed by the ordered bit-planes than the other regions without shifting the bit-planes themselves,
wherein bit-planes restructured in a layer different from that of bit-planes in a region which is separated from a tile boundary and has a quantization rate high relative to others have one or a plurality of subbands.

10. The image compression apparatus as claimed in claim 9, wherein a processing time and an output image quality of the image compression apparatus differ depending on a number of subbands.

11. An image compression apparatus comprising:
a tile specifying section specifying rectangular tiles having an arbitrary size with respect to an image;
an image dividing section dividing the image using the specified rectangular tiles;
a bit-plane decomposing section decomposing each of the specified tiles dividing the image into bit-planes;
a bit-plane ordering section ordering the bit-planes decomposing each of the specified tiles depending on a coding sequence;
a layer forming section forming layers by the ordered bit-planes; and
a suppressing section suppressing a quantization rate of a region of interest low relative to other regions of the image by including a bit-plane of said region of interest in a higher layer of the layers formed by the ordered bit-planes than the other regions without shifting the bit-planes themselves,
wherein bit-planes restructured in a layer different from that of bit-planes in a region which is separated from a tile boundary and has a quantization rate high relative to others have wavelet coefficient values greater than a predetermined value.

12. The image compression apparatus as claimed in claim 11, further comprising:
a layer restructuring section restructuring the layer so that the bit-planes are absorbed by higher layers as a difference between the wavelet coefficient values of the bit-planes forming a code block and the predetermined value becomes larger.

13. The image compression apparatus as claimed in claim 11, further comprising:
an interpolation section interpolating pixels extended outside a tile by a mirroring method when obtaining the wavelet coefficient values.

14. The image compression apparatus comprising:
a tile specifying section specifying rectangular tiles having an arbitrary size with respect to an image;
an image dividing section dividing the image using the specified rectangular tiles;
a bit-plane decomposing section decomposing each of the specified tiles dividing the image into bit-planes;
a bit-plane ordering section ordering the bit-planes decomposing each of the specified tiles depending on a coding sequence;
a layer forming section forming layers by the ordered bit-planes;
a suppressing section suppressing a quantization rate of a region of interest low relative to other regions of the image by including a bit-plane of said region of interest in a higher layer of the layers formed by the ordered bit-planes than the other regions without shifting the bit-planes themselves; and
a layer restructuring section restructuring a layer by shifting all bit-planes included in a precinct so as to be included in a higher layer when more than a predetermined number of code blocks forming the precinct are adjacent to a tile boundary.

15. An image compression apparatus comprising:
a tile specifying section specifying rectangular tiles having an arbitrary size with respect to an image;
an image dividing section dividing the image using the specified rectangular tiles;
a bit-plane decomposing section decomposing each of the specified tiles dividing the image into bit-planes;
a bit-plane ordering section ordering the bit-planes decomposing each of the specified tiles depending on a coding sequence;
a layer forming section forming layers by the ordered bit-planes; and
a suppressing section suppressing a quantization rate of a region of interest low relative to other regions of the image by including a bit-plane of said region of interest in a higher layer of the layers formed by the ordered bit-planes than the other regions without shifting the bit-planes themselves,
wherein said suppressing section suppresses the quantization rate of the region of interest in a vicinity of a tile boundary.

16. An image compression apparatus comprising:
a tile specifying section specifying rectangular tiles having an arbitrary size with respect to an image;
an image dividing section dividing the image using the specified rectangular tiles;
a bit-plane decomposing section decomposing each of the specified tiles dividing the image into bit-planes;
a bit-plane ordering section ordering the bit-planes decomposing each of the specified tiles depending on a coding sequence;
a layer forming section forming layers by the ordered bit-planes; and
a suppressing section suppressing a quantization rate of a region low relative to other regions of the image,
wherein said suppressing section selects the region in which the quantization rate is suppressed by a region in a vicinity of a tile boundary.

17. The image compression apparatus as claimed in claim 16, wherein said suppressing section carries out the region of interest (ROI) process with respect to pixels or, code blocks or, precincts, in the vicinity of the tile boundary.

18. The image compression apparatus as claimed in claim 16, wherein said suppressing section carries out the region of interest (ROI) process with respect to a region in a vicinity of a tile boundary.

19. The image compression apparatus as claimed in claim 16, wherein said suppressing section carries out the region of interest (ROI) process which is specified by an ROI.

20. An image compression method comprising:
a tile specifying step specifying rectangular tiles having an arbitrary size with respect to an image;
an image dividing step dividing the image using the specified rectangular tiles;
a bit-plane decomposing step decomposing each of the specified tiles dividing the image into bit-planes;
a bit-plane ordering step ordering the bit-planes decomposing each of the specified tiles depending on a coding sequence;
a layer forming step forming layers by the ordered bit-planes; and
a suppressing step suppressing a quantization rate of a region of interest low relative to other regions of the image by including a bit-plane of said region of interest in a higher layer of the layers formed by the ordered bit-planes than the other regions without shifting the bit-planes themselves,
wherein said suppressing step suppresses the quantization rate of a region in a vicinity of a tile boundary, with respect to a bit-plane of a region separated from the tile boundary and having a relatively higher Quantization rate, so as to be included in a higher layer of the layers formed by the ordered bit-planes without shifting the bit-planes themselves.

21. The image compression method as claimed in claim 20, wherein said suppressing step holds coefficient values of the region in which the quantization rate is suppressed prior to quantization.

22. An image compression method comprising:
a tile specifying section specifying rectangular tiles having an arbitrary size with respect to an image;
an image dividing section dividing the image using the specified rectangular tiles;
a bit-plane decomposing section decomposing each of the specified tiles dividing the image into bit-planes;
a bit-plane ordering section ordering the bit-planes decomposing each of the specified tiles depending on a coding sequence;
a layer forming section forming layers by the ordered bit-planes; and
a suppressing section suppressing a quantization rate of a region of interest low relative to other regions of the image by including a bit-plane of said region of interest in a higher layer of the layers formed by the ordered bit-planes than the other regions without shifting the bit-planes themselves,
wherein said suppressing step suppresses the quantization rate of the region of interest in a vicinity of a tile boundary.

23. An image compression method comprising:
a tile specifying step specifying rectangular tiles having an arbitrary size with respect to an image;
an image dividing step dividing the image using the specified rectangular tiles;
a bit-plane decomposing step decomposing each of the specified tiles dividing the image into bit-planes;
a bit-plane ordering step ordering the bit-planes decomposing each of the specified tiles depending on a coding sequence;
a layer forming step forming layers by the ordered bit-planes; and
a suppressing step suppressing a quantization rate of a region low relative to other regions of the image,
wherein said suppressing step selects the region in which the quantization rate is suppressed by a region in a vicinity of a tile boundary.

24. A computer-readable storage medium which stores a computer program for causing a computer to carry out an image compression, said computer program comprising:
a tile specifying procedure causing the computer to specify rectangular tiles having an arbitrary size with respect to an image;
an image dividing procedure causing the computer to divide the image using the specified rectangular tiles;
a bit-plane decomposing procedure causing the computer to decompose each of the specified tiles dividing the image into bit-planes;
a bit-plane ordering procedure causing the computer to order the bit-planes decomposing each of the specified tiles depending on a coding sequence;
a layer forming procedure causing the computer to form layers by the ordered bit-planes; and
a suppressing procedure causing the computer to suppress a quantization rate of a region of interest low relative to other regions of the image by including a bit-plane of said region of interest in a higher layer of the layers formed by the ordered bit-planes than the other regions without shifting the bit-planes themselves,
wherein said suppressing procedure causes the computer to suppresses the quantization rate of a region in a vicinity of a tile boundary, with respect to a bit-plane of a region separated from the tile boundary and having a relatively higher canalization rate, so as to be included in a higher layer of the layers formed by the ordered bit-planes without shifting the bit-planes themselves.

25. A computer-readable storage medium which stores a program for causing a computer to carry out an image compression, said program comprising:
a tile specifying procedure causing the computer to specify rectangular tiles having an arbitrary size with respect to an image;
an image dividing procedure causing the computer to divide the image using the specified rectangular tiles;

a bit-plane decomposing procedure causing the computer to decompose each of the specified tiles dividing the image into bit-planes;

a bit-plane ordering section ordering procedure causing the computer to order the bit-planes decomposing each of the specified tiles depending on a coding sequence;

a layer forming procedure causing the computer to form layers by the ordered bit-planes; and a suppressing procedure causing the computer to suppress a canalization rate of a region of interest low relative to each other regions of the image by including a bit-plane of said region of interest in a higher layer of the layers formed by the ordered bit-planes than the other regions without shifting the bit-planes themselves, wherein said suppressing procedure causes the computer to suppress the quantization rate of the region of interest in a vicinity of a tile boundary.

26. An image expansion apparatus for expanding compressed image data obtained by specifying rectangular tiles having an arbitrary size with respect to an image, dividing the image using the specified rectangular tiles, decomposing each of the specified tiles dividing the image into bit-planes, ordering the bit-planes decomposing each of the specified tiles depending on a coding sequence, forming layers by the ordered bit-planes, suppressing a quantization rate of a region of interest low relative to other regions of the image by including a bit-plane of said region of interest in a higher layer of the layers formed by the ordered bit-planes than the other regions without shifting the bit-planes themselves, and suppressing the canalization rate of a region in a vicinity of a tile boundary, with respect to a bit-plane of a region separated from the tile boundary and having a relatively higher quantization rate, so as to be included in a higher layer of the layers formed by the ordered bit-planes without shifting the bit-planes themselves, comprising:

an input section receiving the compressed image data; and an expanding section expanding the compressed image data based on information related to the specified tiles.

27. The image expansion apparatus as claimed in claim 26, wherein said expanding section includes an entropy decoding section, an inverse quantization section, and a two-dimensional discrete wavelet inverse transform section.

28. An image expansion method for expanding compressed image data obtained by specifying rectangular tiles having an arbitrary size with respect to an image, dividing the image using the specified rectangular tiles, decomposing each of the specified tiles dividing the image into bit-planes, ordering the bit-planes decomposing each of the specified tiles depending on a coding sequence, forming layers by the ordered bit-planes, suppressing a quantization rate of a region of interest low relative to other regions of the image by including a bit-plane of said region of interest in a higher layer of the layers formed by the ordered bit-planes than the other regions without shifting the bit-planes themselves, and suppressing the canalization rate of a region in a vicinity of a tile boundary, with respect to a bit-plane of a region separated from the tile boundary and having a relatively higher quantization rate, so as to be included in a higher layer of the layers formed by the ordered bit-planes without shifting the bit-planes themselves, comprising:

an input step receiving the compressed image data; and an expanding step expanding the compressed image data based on information related to the specified tiles.

29. A computer-readable storage medium which stores a program for causing a computer to carry out an image expansion with respect to compressed image data which is obtained by specifying rectangular tiles having an arbitrary size with respect to an image, dividing the image using the specified rectangular tiles, decomposing each of the specified tiles dividing the image into bit-planes, ordering the bit-planes decomposing each of the specified tiles depending on a coding sequence, forming layers by the ordered bit-planes, suppressing a quantization rate of a region of interest low relative to other regions of the image by including a bit-plane of said region of interest in a higher layer of the layers formed by the ordered bit-planes than the other regions without shifting the bit-planes themselves, and suppressing the quantization rate of a region in a vicinity of a tile boundary, with respect to a bit-plane of a region separated from the tile boundary and having a relatively higher quantization rate, so as to be included in a higher layer of the layers formed by the ordered bit-planes without shifting the bit-planes themselves, said program comprising:

an input procedure causing the computer to receive the compressed image data; and an expanding procedure causing the computer to expand the compressed image data based on information related to the specified tiles.

30. An image compression apparatus comprising:

a dividing part configured to divide an original image into a plurality of tiles;

an interpolating part configured to interpolate first data in a periphery of each of the tiles and carrying out a wavelet transform;

a quantizing part configured to quantize transformed wavelet coefficient values to compress image data of the original image; and a reducing part configured to reduce a quantization rate of the wavelet coefficient values in a region in a vicinity of a tile boundary to a value lower than that of other regions.

31. The image compression apparatus as claimed in claim 30, wherein said reducing part uniformly reduces the quantization rate of the wavelet coefficient values in the region in the vicinity of the tile boundary.

32. The image compression apparatus as claimed in claim 30, wherein said reducing part reduces the quantization rate of the wavelet coefficient values in the region in the vicinity of the tile boundary to 1.

33. The image compression apparatus as claimed in claim 30, wherein said reducing part reduces the quantization rate of the wavelet coefficient values in a region in a vicinity of only a tile boundary included within a specified region which is specified in advance in the original image.

34. The image compression apparatus as claimed in claim 30, wherein the original image is a moving image.

35. The image compression apparatus as claimed in claim 30, wherein said reducing part compares and obtains a difference between the wavelet coefficient values and wavelet coefficient values which are obtained by interpolating second data in a periphery of each of the tiles and carrying out a wavelet transform, and reduces the quantization rate depending on the difference.

36. The image compression apparatus as claimed in claim 30, wherein said interpolating part employs a mirroring method to interpolate the data.

37. The image compression apparatus as claimed in claim 35, wherein said reducing part interpolates the second data by a centrosymmetric method.

38. The image compression apparatus as claimed in claim 35, wherein said reducing part interpolates the second data using the image data of the original image of each of the tiles and tiles adjacent thereto.

39. The image compression apparatus as claimed in claim 35, wherein said reducing part compares the wavelet coefficient values in units of subbands or, code blocks or, pixels.

40. The image compression apparatus as claimed in claim 39, wherein said reducing part reduces the quantization rate only with respect to a subband or code block including a maximum value of the difference.

41. The image compression apparatus as claimed in claim 39, wherein said reducing part reduces the quantization rate only with respect to a subband or code block including a maximum value of a sum of square of the difference.

42. The image compression apparatus as claimed in claim 30, further comprising:
  a separating part configured to separate the original image into R, G and B components,
  said reducing part reducing the quantization rate only with respect to the B component.

43. The image compression apparatus as claimed in claim 30, further comprising:
  a separating part configured to separate the original image into Y, U and V components,
  said reducing part reducing the quantization rate only with respect to the Y component.

44. An image compression method comprising the steps of:
  dividing an original image into a plurality of tiles;
  interpolating data in a periphery of each of the tiles and carrying out a wavelet transform;
  quantizing transformed wavelet coefficient values to compress image data of the original image; and
  reducing a quantization rate of the wavelet coefficient values in a region in a vicinity of a tile boundary to a value lower than that of other regions.

45. A computer-readable storage medium which stores a program for causing a computer to carry out an image compression, said program comprising:
  a procedure causing the computer to divide an original image into a plurality of tiles;
  a procedure causing the computer to interpolate data in a periphery of each of the tiles and carrying out a wavelet transform;
  a procedure causing the computer to quantize transformed wavelet coefficient values to compress image data of the original image; and
  a procedure causing the computer to reduce a quantization rate of the wavelet coefficient values in a region in a vicinity of a tile boundary to a value lower than that of other regions.

* * * * *